(12) United States Patent
Sensui et al.

(10) Patent No.: US 12,491,442 B2
(45) Date of Patent: Dec. 9, 2025

(54) INFORMATION PROCESSING SYSTEM, INFORMATION PROCESSING APPARATUS, STORAGE MEDIUM AND INFORMATION PROCESSING METHOD FOR PERFORMANCE DISPLAY

(71) Applicant: Nintendo Co., Ltd., Kyoto (JP)

(72) Inventors: Kazuyoshi Sensui, Kyoto (JP); Masaki Yasuhara, Kyoto (JP); Junpei Horita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 320 days.

(21) Appl. No.: 18/158,784

(22) Filed: Jan. 24, 2023

(65) Prior Publication Data

US 2023/0233942 A1   Jul. 27, 2023

(30) Foreign Application Priority Data

Jan. 26, 2022   (JP) ................................. 2022-009917

(51) Int. Cl.
*G09G 5/377* (2006.01)
*A63F 13/52* (2014.01)
(Continued)

(52) U.S. Cl.
CPC .............. *A63F 13/65* (2014.09); *A63F 13/52* (2014.09); *G06F 3/011* (2013.01)

(58) Field of Classification Search
CPC ... A61B 5/02438; A61B 5/1118; A61B 5/222; A61B 5/742; A61B 5/7475; A61B 2503/10; A61B 2505/09; A63B 24/0062; A63B 2024/0056; A63B 2024/0068; A63B 2071/0694; A63B 2220/17; G16H 20/30; A63F 13/26; A63F 13/65; G06F 17/18; G06F 3/011; G06T 11/206; G06T 11/60;
(Continued)

(56) References Cited

U.S. PATENT DOCUMENTS 6,705,972 B1    3/2004  Takano et al.
2015/0057944 A1* 2/2015 White .................. A61B 5/4866
702/19

(Continued)

FOREIGN PATENT DOCUMENTS

JP   H1152834 A    2/1999
JP   2014223096 A  12/2014
(Continued)

*Primary Examiner* — Lawrence S Galka
(74) *Attorney, Agent, or Firm* — Scully, Scott, Murphy & Presser, P.C.

(57) ABSTRACT

A game apparatus functioning as a non-limiting example information processing apparatus includes a CPU, and the CPU performs processing of a virtual game. If a diary function is performed during play of a main game, a diary screen is displayed, and when a pasting condition is satisfied, a number-of-steps sticker is pasted. A size of the number-of-steps sticker is determined to one size out of three sizes according to the number of steps for a day. Moreover, a color of the number-of-steps sticker is determined to one color out of five colors according to accumulative number of steps for the current month including a day that the number-of-steps sticker is pasted. Moreover, the number-of-steps stickers are displayed with being arranged day by day.

16 Claims, 40 Drawing Sheets

(51) Int. Cl.
  *A63F 13/65*    (2014.01)
  *G06F 3/01*     (2006.01)
  *G06T 11/60*    (2006.01)
  *G09G 5/02*     (2006.01)

(58) Field of Classification Search
  CPC ............... G09B 19/0038; G09G 5/02; G09G 2340/145; G09G 2354/00; G09G 2380/08
  See application file for complete search history.

(56) References Cited

U.S. PATENT DOCUMENTS

| | | | |
|---|---|---|---|
| 2015/0130830 A1* | 5/2015 | Nagasaki | ............... G16H 20/60 |
| | | | 345/592 |
| 2017/0072263 A1* | 3/2017 | Laing | .................... G06V 40/23 |
| 2018/0140211 A1 | 5/2018 | Nakazawa et al. | |

FOREIGN PATENT DOCUMENTS

| | | |
|---|---|---|
| JP | 2015076032 A | 4/2015 |
| JP | 2018086240 A | 6/2018 |

* cited by examiner

FIG. 8    INDUCEMENT COMMENT TABLE

| TYPES | SELECTION TARGET CONDITION | CONTENT OF COMMENTS |
|---|---|---|
| NORMAL | MORNING | GOOD MORNING [PLAYER NAME] SAN, DID YOU SLEEP WELL? |
| | | ⋮ |
| | NOON | ⋮ |
| | EVENING | ⋮ |
| | NIGHT | GOOD EVENING, TODAY IS ALSO END, ISN'T IT? HOW WAS YOUR DAY? |
| | | ⋮ |
| | FRIDAY | IT'S FRIDAY, HOW WAS YOUR WEEK? |
| | | ⋮ |
| | ⋮ | ⋮ |
| | ANYTIME | HI! [PLAYER NAME] SAN, HOW ARE YOU? LET'S KNOW HOW YOU FEEL NOW BY PASTING STICKER. |
| | | ⋮ |
| CONTINUOUS INDUCEMENT | AFTER MOOD (POSITIVE) | WHAT KIND OF FUN DID YOU HAVE? |
| | | DID YOU GO OUT? |
| | | ⋮ |
| | AFTER MOOD (NEGATIVE) | ARE YOU FEELING NERVOUS TODAY? |
| | | ⋮ |
| | ⋮ | ⋮ |
| | AFTER GOING OUT | WHERE HAVE YOU BEEN? CHANGED YOUR MIND? |
| | | ⋮ |
| | ⋮ | ⋮ |
| BIRTHDAY | BIRTHDAY OF PLAYER | HAPPY BIRTHDAY [PLAYER NAME] SAN, HOW ARE YOUR FEELING? |
| | | ⋮ |
| NUMBER-OF-STEPS | SATISFYING CONDITION FOR FIRST NUMBER-OF-STEPS | YOU WALKED A LOT TODAY. DID YOU GO OUT? |
| | | ⋮ |
| | SATISFYING CONDITION FOR SECOND NUMBER-OF-STEPS | ⋮ |

FIG. 13

REACTION COMMENT TABLE

| TYPES | CONTENT OF COMMENTS |
|---|---|
| NORMAL | LET'S KNOW AGAIN BY PASTING STICKER. |
| | IT LOOKS LIKE YOU HAD FUN DAY! |
| | IT LOOKS LIKE YOU FEEL GOOD! |
| | IT LOOKS LIKE THERE WAS SOMETHING MAKING YOU DISGUSTFUL. |
| | DID YOU HAVE HARD TIME? |
| | SHOPPING IS FUN! |
| | ⋮ |
| FUTURE | LOOKING FORWARD IT. |
| | IS THERE ANYTHING GOOD? |
| | IS THERE ANYTHING YOU DON'T LIKE? |
| | IT'S DEPRESSING, ISN'T IT |
| | DO YOU GO OUT? |
| | ⋮ |
| EXCLUSIVE | IT LOOKS LIKE GOOD THING HAPPENED. ENVIABLE. |
| | IT LOOKS LIKE YOU HAVE SOMETHING TO LOOK FORWARD. EXCITING! |
| | SOMETIMES THINGS DON'T WORK OUT. YOU'RE TRYING HARD. |
| | IT LOOKS LIKE YOU HAD GREAT TIME. I'M SO HAPPY. |
| | [PLAYER NAME] SAN, THANK YOU FOR TEACHING. |
| | ⋮ |

FIG. 17

SHORT COMMENT TABLE

| IDENTIFICATION NUMBER | CONTENT OF COMMENTS |
|---|---|
| 1 | HI [PLAYER NAME] SAN! |
| 2 | I LIKE STICKER VERY MUCH. |
| 3 | WHAT GOOD THINGS CAN YOU DO TODAY? |
| 4 | HAVE YOU CHECKED SCHEDULE? |
| 5 | LET'S PASTE A LOT OF STICKERS TO MAKE DIARY CUTE. |
| 6 | STICKERS CAN BE REMOVED, SO TRY PASTING VARIOUS STICKERS. |
| 7 | I FEEL LIKE EATING CAKE. |
| 8 | IF YOU PASTE STICKERS ON YOUR SCHEDULE AND MEMORIES, IT WILL BEE FUN DIARY. |
| ⋮ | ⋮ |

FIG. 18

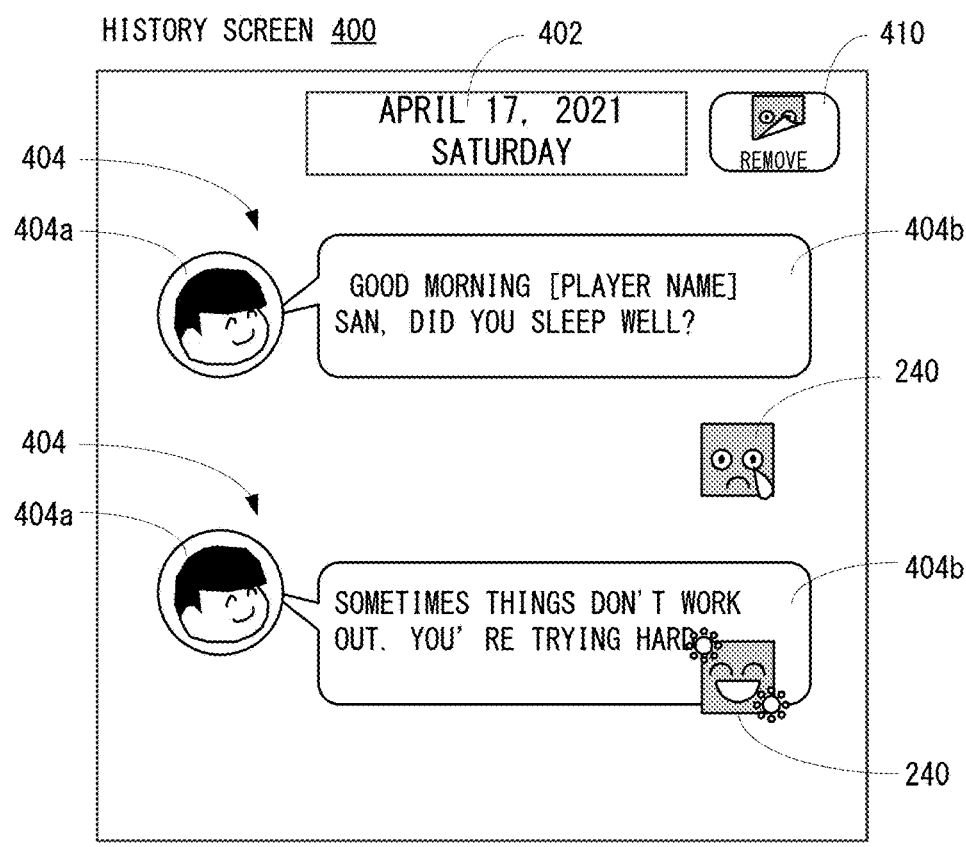

FIG. 21A
SIZE OF STEP COUNT STICKER
| STEP COUNT | 1-999 | 1000-9999 | 10000- |
|---|---|---|---|
| SIZE | SMALL | MEDIUM | LARGE |
| STICKER |  |  |  |
FIG. 21B
COLOR OF STEP COUNTER STICKER
| ORDER | 1 | 2 | 3 | 4 | 5 |
|---|---|---|---|---|---|
| COLOR | BLUE | YELLOW | GREEN | RED | PURPLE |
| STICKER |  |  |  |  |  |

INFORMATION PROCESSING SYSTEM, INFORMATION PROCESSING APPARATUS, STORAGE MEDIUM AND INFORMATION PROCESSING METHOD FOR PERFORMANCE DISPLAY

CROSS REFERENCE OF RELATED APPLICATION

This application claims a priority to Japanese Patent Application No. 2022-009917 filed on Jan. 26, 2022, and the entire contents of which are incorporated herein by reference.

FIELD

This application describes an information processing system, an information processing apparatus, a storage medium and an information processing method, in which an activity amount of a user is displayed to be visually confirmed.

SUMMARY

It is a primary object of an embodiment(s) to provide a novel information processing system, information processing apparatus, storage medium and information processing method.

Moreover, it is another object of the embodiment(s) to provide an information processing system, information processing apparatus, storage medium and information processing method, capable of improving at-a-glance visibility of an activity record of a user.

A first embodiment is an information processing system comprising one or more processors: the one or more processors execute: acquiring an activity amount of activity performed by a user; generating a figure having a first graphical feature that is determined according to the activity amount in a first unit time period and a second graphical feature that is determined according to the activity amount in a second unit time period including the first unit time period and different from the first graphical feature; and displaying a plurality of figures each generated for each first unit time period to be arranged in a time series order.

According to the first embodiment, it is possible to improve at-a-glance visibility of an activity amount.

A second embodiment is the information processing system according to the first embodiment, wherein the one or more processors executes maintaining, after the first graphical feature is determined for a figure, the determined first graphical feature even if the activity amount in the first unit time period changes.

According to the second embodiment, by maintaining the figure having been displayed, it is possible to see the same figure at each time of confirmation. Therefore, whenever it may check, it is possible to see, at each time of confirmation, the activity amount at the time that the figure is firstly displayed for the first time.

A third embodiment is the information processing system according to the first embodiment, wherein the one or more processors execute maintaining, after the second graphical feature is determined for a figure, the determined second graphical feature even if the activity amount in the second unit time period changes.

According to the third embodiment, similar to the second embodiment, it is possible to see the same figure at each time of confirmation. Therefore, whenever it may check, it is possible to see the activity amount at the time that the figure is displayed for the first time.

A fourth embodiment is the information processing system according to the first embodiment, wherein each of the first graphical feature and the second graphical feature is at least one of a color, a form, a size and a pattern.

A fifth embodiment is the information processing system according to the first embodiment, wherein the one or more processors execute calculating the activity amount in the second unit time period based on activity amounts in a plurality of first unit time periods.

According to the fifth embodiment, even if the activity amount in the second unit time period cannot be acquired, the same can be calculated based on the activity amount in the first unit time period.

A sixth embodiment is the information processing system according to the first embodiment, wherein the one or more processors execute: determining the second graphical feature to one candidate from a plurality of candidates; and changing, when the activity amount reaches a predetermined value, the candidate to another candidate in a predetermined order.

According to the sixth embodiment, since the second graphical feature is determined to one candidate from a plurality of predetermined candidates, it is possible to easily know a change of the activity amount in the second unit time period.

A seventh embodiment is the information processing system according to the sixth embodiment, wherein the predetermined order of changing the candidate of the second graphical feature to another candidate is returned to the first from the last.

According to the seventh embodiment, since the order of changing to another candidate is looped, the second graphical feature can change without an upper limit within a limited expression method.

An eighth embodiment is the information processing system according to the first embodiment, wherein the one or more processors execute displaying the activity amount with a numeral value in addition to the first graphical feature and the second graphical feature.

According to the eighth embodiment, since the activity amount is displayed as a numeral value, it is possible to correctly confirm the activity amount in addition to the graphical features.

A ninth embodiment is the information processing system according to the first embodiment, wherein the activity amount is at least one of a number of steps, a walking distance and a walking time.

A tenth embodiment is the information processing system according to the first embodiment, wherein the first graphical feature is a size and the second graphical feature is a color, and the one or more processors execute: generating the first graphical feature so that the size is made larger according to a magnitude of the activity amount of one day; and generating the second graphical feature so that the color of the second graphical feature is changed according to an accumulative magnitude of the activity amount for each week, month or year.

The eleventh embodiment is the information processing system according to the first embodiment, wherein a start time of the second unit time period is fixed.

According to the eleventh embodiment, since the start time of the second unit time period is fixed, it is possible to easily know how much time period elapsed.

A twelfth embodiment is the information processing system according to the first embodiment, wherein the figure is a bar graph, and the first graphical feature is a length of the bar graph.

A thirteenth embodiment is the information processing system according to the sixth embodiment, wherein an order of changing the candidate of the first graphical feature to another candidate is not returned to the first from the last.

According to the thirteenth embodiment, since the order of changing to another candidate is not looped, the same first graphical feature is not displayed when the activity amount is high and when the activity amount is low, and thus, it is possible to prevent a user from being confused.

A fourteenth embodiment is an information processing apparatus comprising one or more processors: the one or more processors execute: acquiring an activity amount of activity performed by a user; generating a figure having a first graphical feature that is determined according to the activity amount in a first unit time period and a second graphical feature that is determined according to the activity amount in a second unit time period including the first unit time period and different from the first graphical feature; and displaying a plurality of figures each generated for each first unit time period to be arranged in a time series order.

A fifteenth embodiment is a non-transitory computer-readable storage medium storing an information processing program executable by an information processing apparatus comprising one or more processors, wherein the information processing program causes the one or more processors to execute: acquiring an activity amount of activity performed by a user; generating a figure having a first graphical feature that is determined according to the activity amount in a first unit time period and a second graphical feature that is determined according to the activity amount in a second unit time period including the first unit time period and different from the first graphical feature; and displaying a plurality of figures each generated for each first unit time period to be arranged in a time series order.

A sixteenth embodiment is an information processing method including: acquiring an activity amount of activity performed by a user; generating a figure having a first graphical feature that is determined according to the activity amount in a first unit time period and a second graphical feature that is determined according to the activity amount in a second unit time period including the first unit time period and different from the first graphical feature; and displaying a plurality of figures each generated for each first unit time period to be arranged in a time series order.

In each of the fourteenth embodiment to the sixteenth embodiment, similar to the first embodiment, it is possible to improve at-a-glance visibility of an activity record The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 8 is a view showing a non-limiting example inducement comment table of this embodiment.

FIG. 13 is a view showing a non-limiting example reaction comment table of this embodiment.

FIG. 17 is a view showing a non-limiting example short comment table of this embodiment.

FIG. 18 is a view showing a non-limiting example history screen displayed on the display shown in FIG. 2.

FIG. 21A is a view showing a non-limiting example change of a size of a number-of-steps sticker, and FIG. 21B is a view showing a non-limiting example change of a color of the number-of-steps sticker.

DETAILED DESCRIPTION OF NON-LIMITING EXAMPLE EMBODIMENTS

Figure 1:
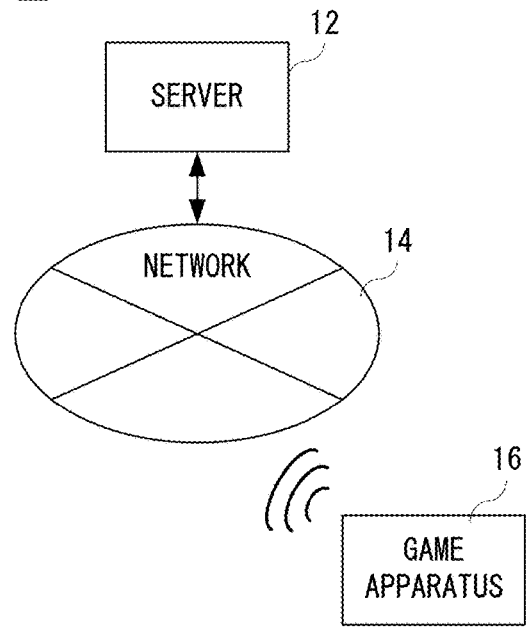
FIG. 1 is a view showing a non-limiting example information processing system.

With reference to FIG. 1, a non-limiting example information processing system 10 comprises a server 12, and the server 12 is communicably connected to a game apparatus 16 via a network 14 such as an internet.

The server 12 is a general-purpose server, and comprises circuit components, such as a CPU, a memory (HDD, ROM, RAM, etc.) and a communication module(s). The server 12 stores (manages) game data (player data 504c shown in FIG. 24) of a virtual game that is playable on the game apparatus 16 according to this embodiment, in an internal memory or a data base connected to an exterior, in association with information of the game apparatus 16 (or a user or player).

The game apparatus 16 is an example of an information processing apparatus, and may be not only a game dedicated apparatus but various types of electronic device equipped with a game function. In this embodiment, such an electric device is a portable device, and may be a smartphone, a cellular phone (feature phone), a tablet PC, a laptop PC, etc.

Figure 2:
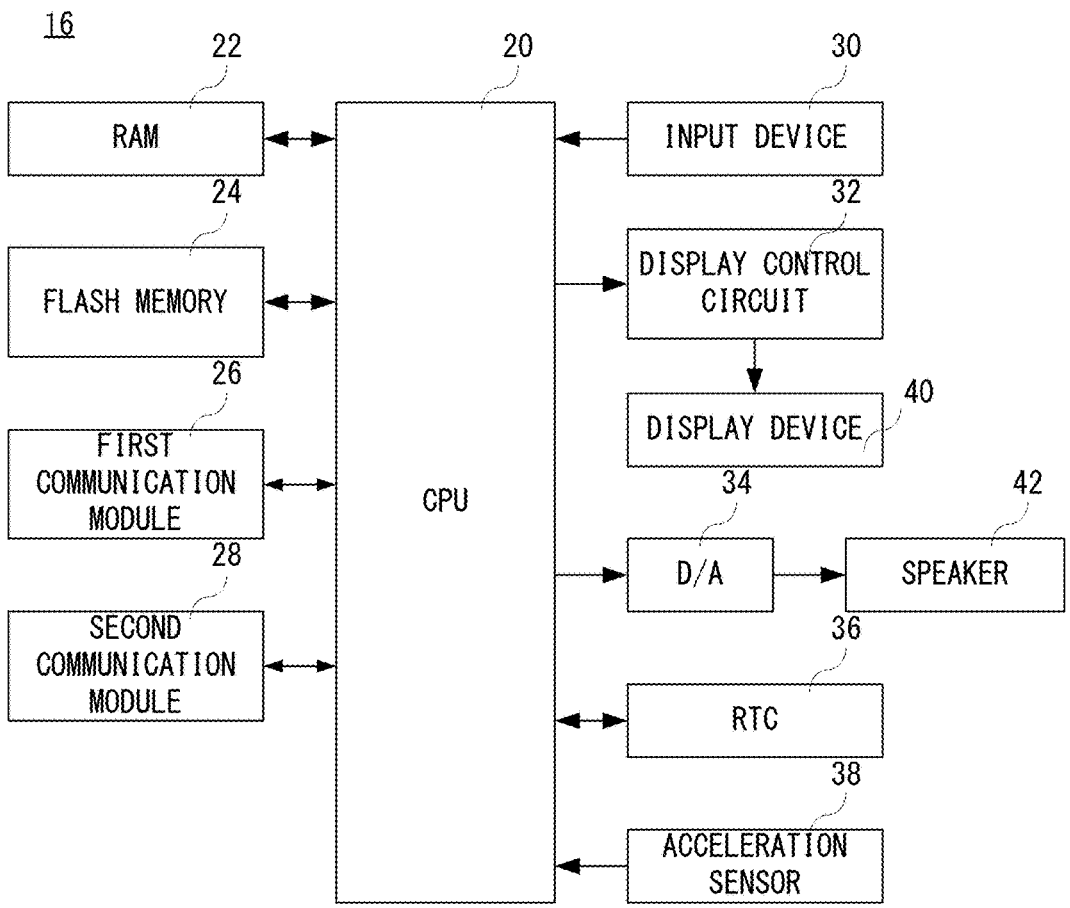
FIG. 2 is a block diagram showing non-limiting example electric structure of a game apparatus shown in FIG. 1.

FIG. 2 is a block diagram showing non-limiting example electric structure of the game apparatus 16 shown in FIG. 1. As shown in FIG. 2, the game apparatus 16 includes a CPU 20, and the CPU 20 is connected with a RAM 22, a flash memory 24, a first communication module 26, a second communication module 28, an input device 30, a display control circuit 32, a D/A converter 34, an RTC 36 and an acceleration sensor 38. Moreover, a display 40 is connected to the display control circuit 32, and a speaker 42 is connected to the D/A converter 34.

The CPU 20 is in charge of overall control of the game apparatus 16. The RAM 22 is a volatile storage medium, and is used as a working memory and a buffer memory for the CPU 20. The flash memory 24 is a nonvolatile storage medium, and used in order to store various types of application programs including a game application, and to store or save various kinds of data.

However, in addition to the game application, as various types of applications, a health care administration application, a document creation application, an email application, a drawing application, a character practice application, a language training application, a learning application, etc. correspond.

The first communication module 26 has a function for accessing a wireless LAN by a system conforming to the standard of IEEE 802.11.b/g, for example. Therefore, for example, the CPU 20 transmits or receives data to or from further devices via an access point and the internet (network) with using the first communication module 26. In this embodiment, the further devices mean the server 12 and/or a further game apparatus, etc. The same applies hereinafter. However, it is also possible to transmit or receive data to or from other equipment devices directly with using the communication module 26.

The second communication module 28 may have a function of performing a short-distance wireless communications. Specifically, the second communication module 28 has a function to transmit or receive an infrared signal to or from further devices (here, further game apparatuses, etc.) with a predetermined communication system (infrared system, for example), and a function to perform wireless communication with the same or similar type of game apparatus according to a predetermined communication protocol (multilink protocol, for example). Therefore, for example, the CPU 20 can transmit or receive data to or from the same or similar type of further game apparatuses directly using the second communication module 28. However, instead of the short-distance wireless communication of the infrared system, a short-distance wireless communication according to other wireless-communication standards such as Bluetooth (registered trademark) may be performed.

The input device 30 may be various types of push buttons or switches provided on the game apparatus 16, and is used by a user or player (hereinafter, simply referred to as "player") for various types of operations such as menu selection, game operation, etc. However, as the input device 30, a pointing device such as a touch panel, an input means such as a microphone, a camera, etc. may be provided instead of the push buttons or switches, or in addition to the push buttons or switches. Moreover, a touch panel may be integrally incorporated within the display 40 described later. The display 40 in this case is a touch panel integrated type display.

The display control circuit 32 includes a GPU, a VRAM, etc., and generates image data for displaying various kinds of screens on the display 40 under the control by the CPU 20 using the image generation data 504*b* (see FIG. 24) stored in the RAM 22.

The D/A converter 34 converts sound data applied from the CPU 20 into an analog game sound so as to output to the speaker 42. However, the game sound means a sound necessary for a game, such as voices of game characters or objects, sound effects, music (BGM).

The RTC 36 is a clock circuit that counts time information, that is, year, month, day and time (i.e., hour, minute, second). The CPU 20 acquires the time information from the RTC 36 as necessary.

The acceleration sensor 38 detects the magnitude of acceleration along predetermined three axial directions set in the game device 16. As an example, the predetermined three axial directions are vertical and horizontal directions of a display surface of display 40 provided in game device 16 and a direction perpendicular to the display surface of display 40. A detection result of the acceleration sensor 38 is output to the CPU 20. The CPU 20 can calculate information on a motion and/or attitude of the game apparatus 16 based on the detection result of the acceleration sensor 38.

In addition, the electric structure of the game apparatus 16 shown in FIG. 2 is a mere example, and does not need to be limited to this. For example, the second communication module 28 may be dispensed with. Moreover, the game apparatus 16 may be provided with a GPS (Global Positioning System) function.

Figure 3:
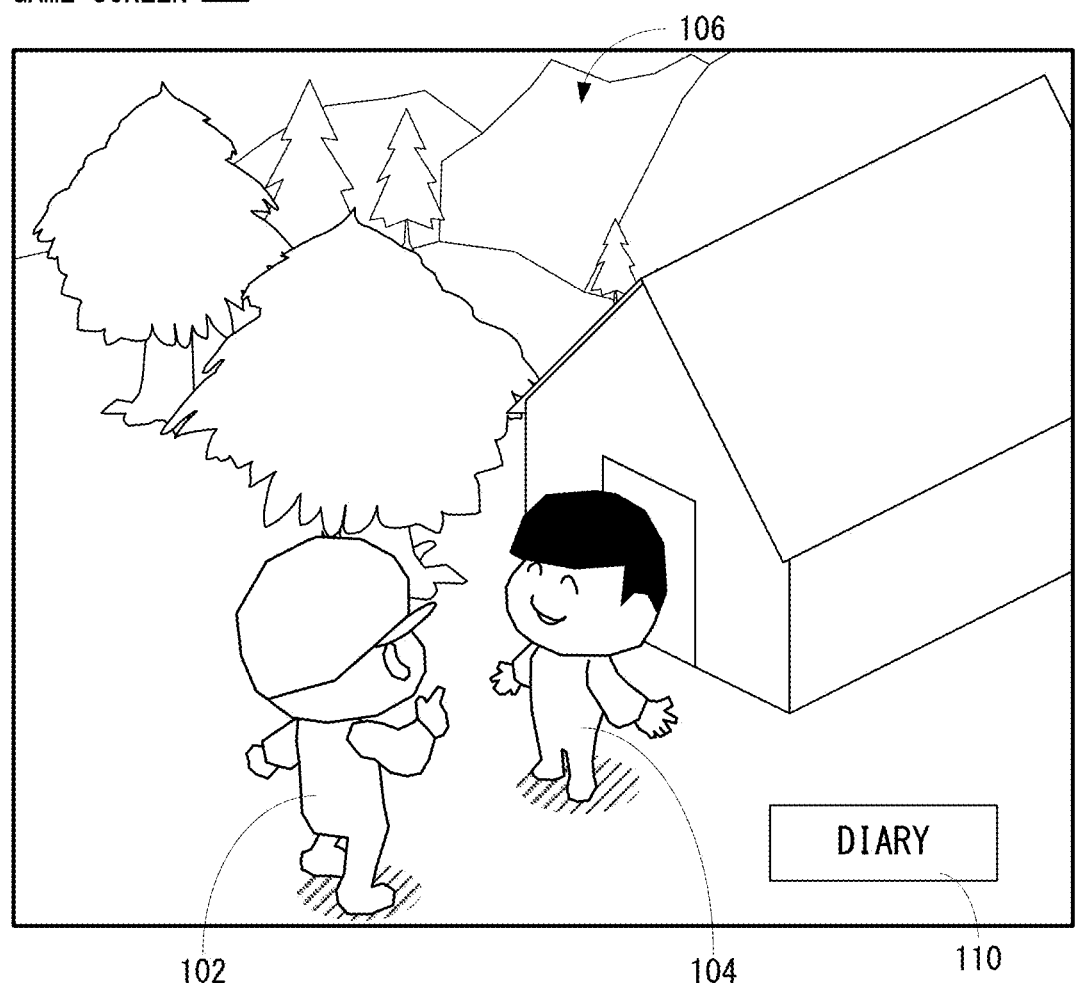
FIG. 3 is a view showing a non-limiting example game screen displayed on a display shown in FIG. 2.

FIG. 3 is a view showing a non-limiting example game screen 100 displayed on the display 40 when the virtual game application that is played with the game apparatus 16 shown in FIG. 1 is performed. As shown in FIG. 3, the game screen 100 includes a player character (hereinafter, referred to as "PC") 102 and a non-player character (hereinafter, referred to as "NPC") 104, and further includes a plurality of background objects 106.

The PC 102 is an object or character whose action or motion is controllable by a player. In this embodiment, the PC 102 is a character imitating a human being. As the motion or action of the PC 102, moving, acquiring an item, passing an item to the NPC 104, talking with the NPC 104, etc. correspond in a virtual place or virtual space. However, in this example, movement means walking, running, sliding, climbing, descending, getting on, getting off or jumping. Moreover, in this embodiment, the item includes not only tools used by the PC 102 or the NPC(s) (104, etc.) use but various display objects used or possessed by the PC 102 or the NPC (104, etc.), such as vegetables, flowers, nuts (or fruits), seeds of flowers and vegetables, insects, fishes, shells, treasure, stickers, objects worn by the PC 102 (e.g. clothing, shoes, hats and caps and accessories), money, etc.

Moreover, a plurality of NPCs including the NPC 104 are objects or characters whose actions or motions are respectively controlled by a computer (the CPU 20 in FIG. 2) rather than by the player. In this embodiment, the NPC is a character imitating a human being as similar to the PC 102. As the action or motion of the NPC, moving, acquiring an item, etc. correspond.

The background object 106 is a terrain object arranged in the virtual space. In this embodiment, the terrain means the ground (including roads, flower fields, farmlands), slopes, floors, trees, grass, flowers, buildings, stairs, caves, cliffs, walls (steps), etc.

The game apparatus 16 functions also as an image processing apparatus, and generates and outputs (displays) image data corresponding to various screens such as the game screen 100. In brief, the GPU incorporated in the display control circuit 32 performs modeling of various types of objects or characters in a three-dimensional virtual space under instructions of the CPU 20. That is, various types of objects or characters are created or arranged in the virtual space, whereby a certain sight or scene can be generated. An image that this scene is imaged by a virtual camera (viewed from a viewpoint) is displayed on the display 40. Describing specific image processing, a certain scene is first generated in the three-dimensional (or a world coordinates system) virtual space, and then, the scene generated in the virtual space is converted into a coordinates system viewed by the virtual camera (i.e., camera coordinates system). For example, an image viewed from a viewpoint is perspective-projected on a virtual screen. Next, clipping and hidden surface removal processing are performed. Subsequently, brightness (shade) on an object surface is expressed by performing shading. Furthermore, shadows caused by the object are expressed by performing shadowing (i.e., shadow attachment). Then, texture mapping is performed. A two-dimensional image of the scene generated in the three-dimensional virtual space is thus generated (drawn), and two-dimensional image data corresponding to the generated two-dimensional image is output to the display 40. Although the three-dimensional image viewing the virtual space from the viewpoint is converted into the two-dimensional image so as to display various screens on the display 40 in this embodiment, as described later, in order to distinguish from a case of generating (drawing) a two-dimensional game image in the virtual space, an image that the objects or characters look in three-dimensions like the game screen 100 is referred to as a "three-dimensional game image".

In addition, in generating a three-dimensional image, instead of performing shadowing, a shadow texture having a simple shape (for example, a circle, an ellipse, a triangle or a rectangle) may be pasted.

In the virtual game of this embodiment, there are provided with a plurality of places (virtual spaces), and in each of the places, the player can make the PC 102 act, and acquire an item. The PC 102 acquires (i.e., buys) an object worn by the PC 102, an appreciation object or furniture, etc. by using the acquired item. Moreover, by using the acquired item, the PC 102 can make an appreciation object or furniture. However, it may be the NPC requested by the PC 102 to make the appreciation object or furniture. The PC 102 can wear and change acquired clothing or the like according to an operation by the player. Moreover, the PC 102 can arrange in a residence of the PC 102 or the like the appreciation object or furniture made or bought according to an operation by the player. Moreover, in the respective places, the player can increase an intimacy degree with an NPC by causing the PC 102 to act, to talk with the encountered NPC and to solve a task submitted by an NPC. The intimacy degree is set with a numeral value more than 0 (zero) for each NPC. When the PC 102 has never encountered (i.e., never met) an NPC, the intimacy degree with the NPC is 0 (zero), and if the PC 102 meets once with an NPC to have a conversation or if the PC 102 solve a ask submitted by the NPC, the intimacy degree of the PC 102 with the NPC is increase to 1 (one). Thereafter, when solving a task submitted by the NPC by the number that is set in each intimacy degree, the intimacy degree with the NPC is increased by one step.

Here, a task submitted by an NPC is, in other words, a request to the PC 102, and requesting the PC 102 to hand over the item that the NPC wants, requesting answer by the PC 102 to a question of the NPC, etc. correspond.

However, an item that the NPC wants is obtainable in each place of the virtual space (or in a virtual space of each place), and vegetables, flowers, nuts (or fruits), insects, fishes, shells, treasure, etc. correspond. However, an item that the NPC wants does not need to be limited to these.

Moreover, to a question of the NPC, the player can answer by selecting an option out of options prepared in advance, for example, a hairstyle or clothing that suits the NPC is selected from the options, or an answer to a worry of the NPC is selected from the options. In addition, there may be a question from NPC about the favorite food or hobby of the player.

In order to distinguish from a virtual diary described later, such a virtual game is referred to as "main game". Moreover, control processing of the main game is referred to as "game control processing of the main game".

Figure 4:
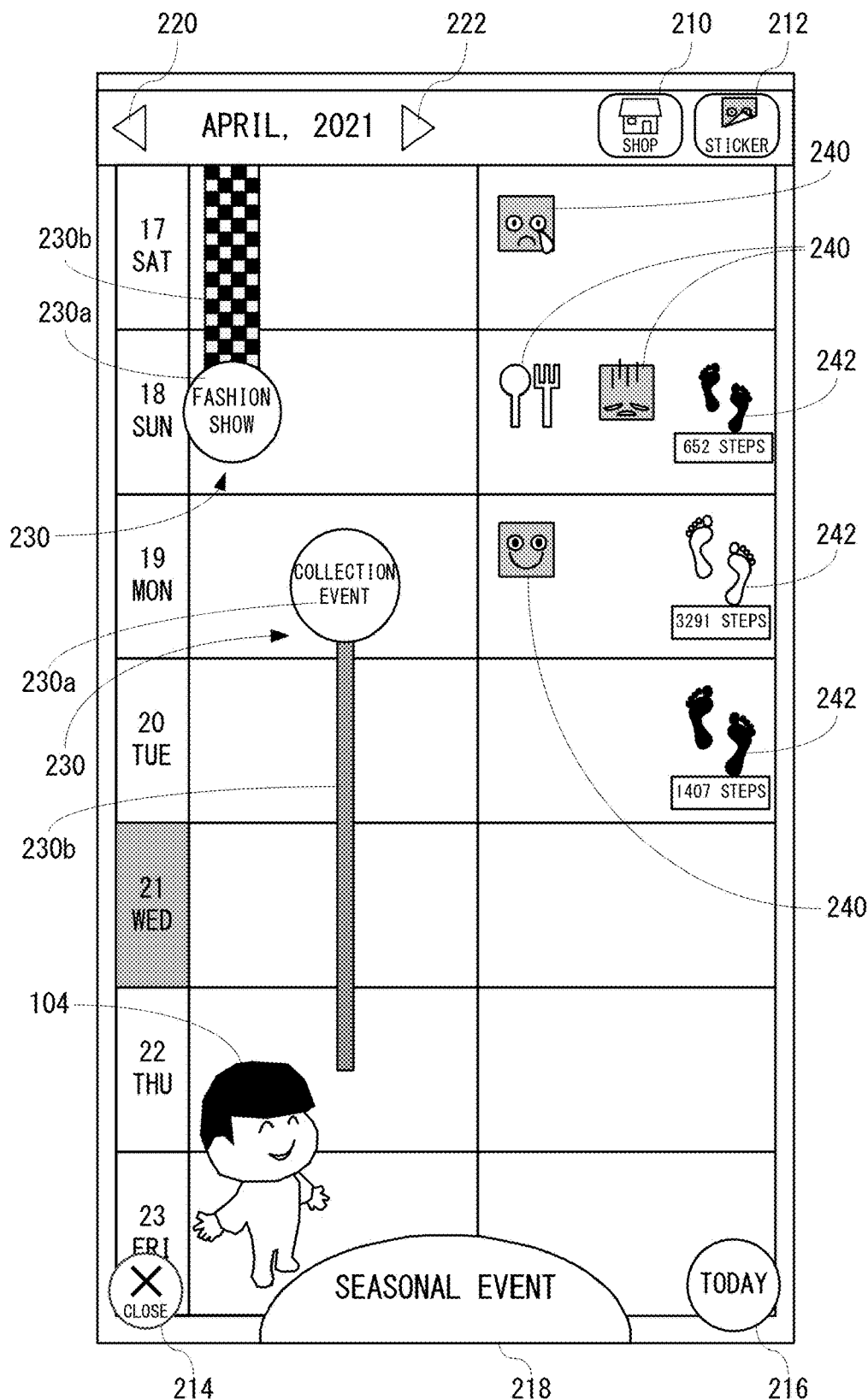
FIG. 4 is a view showing a first non-limiting example diary screen displayed on the display shown in FIG. 2.

FIG. 4 is a view showing a non-limiting example diary screen 200. If operating the button 110 in the game screen 100 shown in FIG. 3, a diary function is performed, and the diary screen 200 of a virtual diary is displayed on the display 40 instead of the game screen 100.

Figure 5:
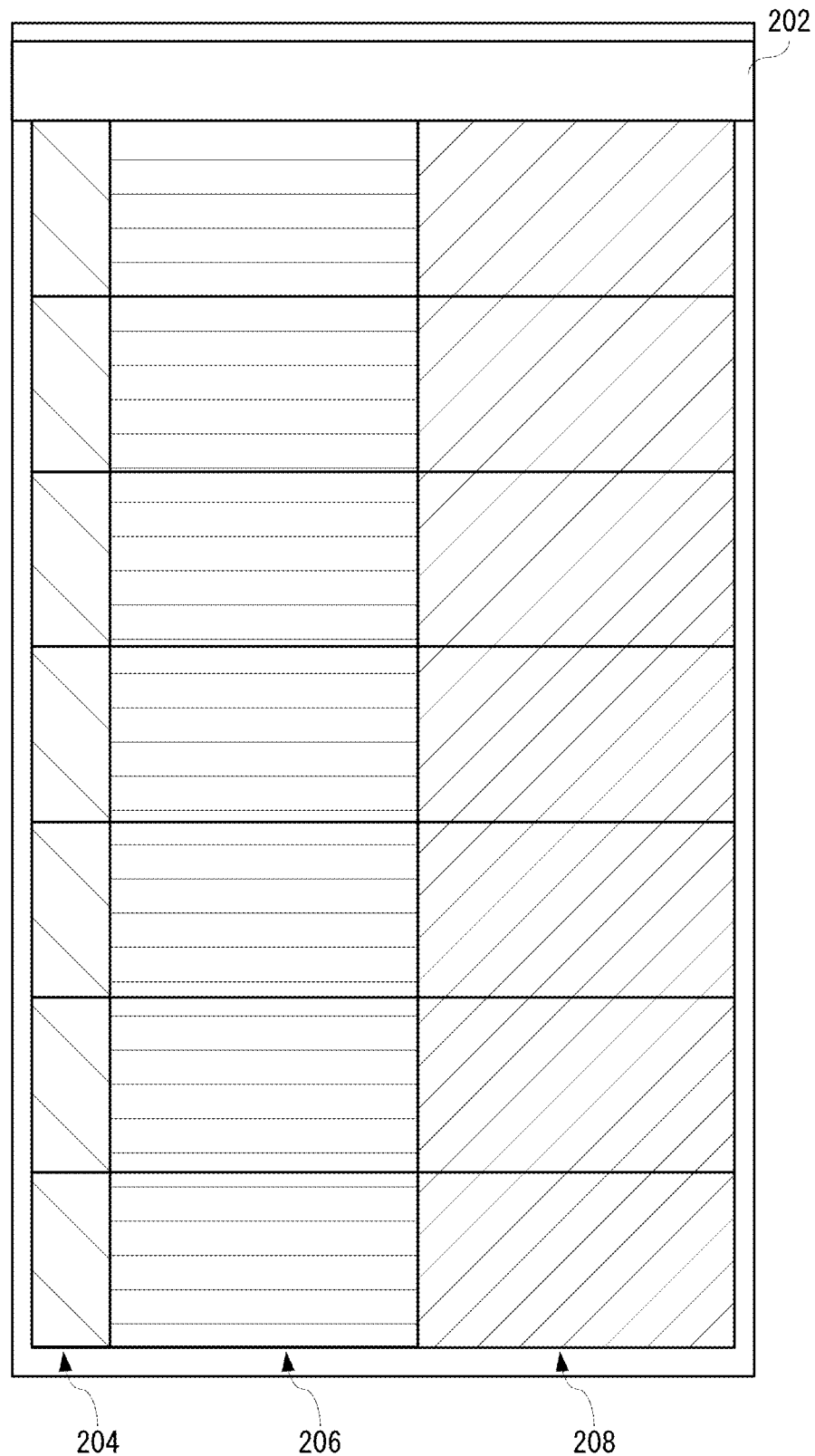
FIG. 5 is a view showing a non-limiting example display area of the diary screen of this embodiment.

Moreover, as shown in FIG. 5, the diary screen 200 includes display areas 202, 204, 206 and 208, and a single virtual area or a plurality of virtual areas corresponding to the display areas 202, 204, 206 and 208 are provided in the virtual space. In FIG. 5, in order to show respective display areas 202-208 intelligibly, slant lined in different directions and horizontal stripes pattern are attached thereto, but the slant lines and the horizontal stripes pattern are not attached in the actual diary screen 200.

As can be seen with reference to FIG. 4 and FIG. 5, the display area 202 is an area for displaying the year and month. In an example shown in FIG. 4, it is displayed as April 2021. The display area 204 is an area for displaying the date and the day of week. The display area 206 is an area for displaying information of events in the main game. The display area 208 is an area for displaying or arranging a sticker.

In addition, in this embodiment, the sticker is pasted in the display area 208 as an example of the display object, but instead of the sticker, a stamp may be applied or a text may be entered. In this case, a stamp or a text is arranged to a virtual area corresponding to the display area 208.

The display areas 204, 206 and 208 are segmented by day. In the embodiment, areas corresponding to seven days are displayed in the display areas 204, 206 and 208. Moreover, in the display area 204, the day and the day of week are displayed in each area so that an area for today is the third area from the bottom. However, if the player performs a scroll operation, the diary screen 200 is scrolled. Therefore, a page (or display position) of the diary screen 200 is moved to an earlier date or to a later date.

Moreover, the area for today in the display area 204 is colored differently from the other areas. However, this is an example, and another method may be used to make the area for today be visibly confirmed. A color and/or thickness of characters for the date and the day of week of today may be made to be different from those of other dates and days of week. Moreover, an image serving as a mark may be displayed in the area for the date and the day of week of today.

In addition, in this embodiment, frame lines are indicated in order to show intelligibly that the display areas 204-208 are segmented by day, but if knowing that it is segmented by day, it is not necessary to segment all of the display areas 204-208 with frame lines. As an example, in the display area 204, only lines segmenting areas by day may be displayed.

Moreover, in this embodiment, although each of the display areas 204-208 is segmented by day, may be segmented by hour, by week or by month.

Information on an event in the main game, that is, an image for displaying a content and a time period (or schedule) of the event (hereinafter, referred to as "event image") 230 is displayed in the display area 206. The event image 230 includes a first image 230a that displays the content of the event in the main game and a second image 230b that displays the time period that the event is performed in the main game. The first image 230a is a circle image, and a character string indicating the content of the event is displayed inside the circle. The second image 230b is a strip-formed image that has a length corresponding to the time period that the event is performed, and is applied with a different color or pattern for each event. However, the second image 230b is not displayed when the event in the main game is scheduled for only one day.

Since the information of the event in the main game is displayed, the schedule of the event can be intelligibly indicated to the player, so that it is possible to check events that are currently performed and events that will be performed in the future, and it is also possible to have the player look back on events that have been performed in the past.

In this embodiment, although the information of an event is displayed, the sales day of the item that can be used in the main game may also be displayed.

An image of the sticker that the player acquired is displayed on the display area 208, the sticker may be acquired by being distributed from the server 12, being given by an NPC in the main game, or buying at a virtual shop. In an example shown in FIG. 4, an image of a normal sticker (hereinafter, simply referred to as "normal sticker") 240 and an image of a number-of-steps sticker (hereinafter, simply referred to as "number-of-steps sticker") 242 are displayed.

The normal stickers 240 are images expressing moods (positive, negative, normal, in this embodiment), work, refreshing, eating and going out. For example, the normal sticker 240 is an image representing a smiling face, a crying face, an angry face, a depressed face, an expressionless face, tableware, food, a computer, an office building, a hot spring mark, a hotel, a car, a train, an airplane or the like.

The number-of-steps sticker 242 is an image that includes an image representing the number of steps (in this embodiment, a figure of footprints) and a display frame that displays the number of steps. Although omitted in FIG. 4, there are also a sticker 244 for decoration (hereinafter, referred to as "decoration sticker"), a special sticker and a sticker of a figure of the PC 102 in addition to the normal sticker 240 and the number-of-steps sticker 242.

The decoration sticker 244 is a sticker used in order to decorate a diary. As an example, the decoration sticker is an image representing a star, a heart, a rhombus, a shooting star or the like.

The special sticker is an image representing a birthday and a memorial day of the player. The sticker of the figure of the PC 102 is an image showing the figure of the PC 102 in the main game, and a coordination of the PC 102 at the time of sticker creation is reflected. Although a detailed description is omitted, it is possible to leave a record of the coordination of the PC 102 by pasting the sticker of the figure of the PC 102.

Since various types of stickers are thus provided, the player can enjoy the various display objects by seeing the diary screen 200 or pasting a sticker on the diary screen 200. However, the number-of-steps sticker 242 is automatically pasted as described later. Hereinafter, in this specification, when there is no necessity of distinguishing the normal sticker 240, the decoration sticker 244, the special sticker and the sticker of the figure of the PC 102 from each other, simply referred to as "sticker".

Figure 6:
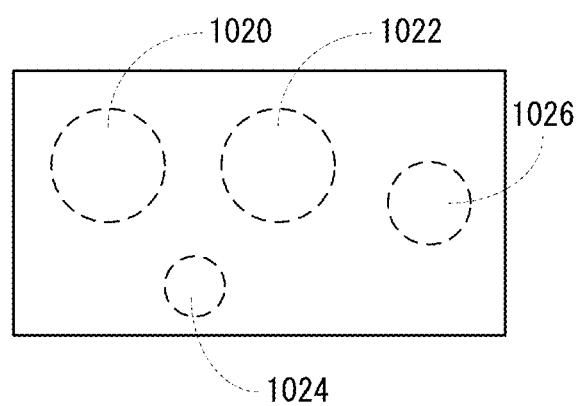
FIG. 6 is a view showing a non-limiting example one day area in a sticker display area shown in FIG. 5.

Moreover, as shown in FIG. 6, there are provided in each of the areas that the display area 208 is segmented by day, two sticker frames (hereinafter, conveniently referred to as "inducement sticker frame") 1020 and 1022 for pasting a sticker according to an inducement by the NPC, or for pasting by the player a sticker freely. An operation of pasting a sticker corresponds to an operation or an input for displaying or arranging the sticker (equivalent to a "arrangement input"). Moreover, there is provided in each of the areas that the display area 208 is segmented by day a sticker frame (hereinafter, referred to as "decoration sticker frame") 1024 for the player to paste the decoration sticker 244. Furthermore, there is provided in each of the areas that the display area 208 is segmented by day a sticker frame (hereinafter, referred to as "number-of-steps sticker frame") 1026 for automatically pasting the number-of-steps sticker 242.

However, it is also possible to paste the decoration sticker 244 on the inducement sticker frames 1020 and 1022, and to paste the normal sticker 240 on the decoration sticker frame 1024. Moreover, freely pasting by the player a sticker means pasting a sticker without responding to an inducement of the NPC, and pasting a sticker without inducement of the NPC. Furthermore, the number-of-steps sticker 242 may be pasted by the player.

Although omitted on the diary screen 200 in FIG. 4 etc., the inducement sticker frames 1020 and 1022, the decoration sticker frame 1024 and the number-of-steps sticker frame 1026 are each displayed as a circle of a thin gray dotted line. That is, a location that the sticker is to be pasted is shown intelligibly. As shown in FIG. 6, the inducement sticker frame 1020 and the inducement sticker frame 1022 are displayed along with right and left in the same size, and the decoration sticker frame 1024 is displayed below them. In this embodiment, a size of the decoration sticker frame 1024 is smaller than those of the inducement sticker frames 1020 and 1022. Moreover, the number-of-steps sticker frame 1026 is displayed at a right of the inducement sticker frames 1022 and 1024 and the decoration sticker frame 1024. A size of the number-of-steps sticker frame 1026 is smaller than those of the inducement sticker frames 1020 and 1022, and larger than that of the decoration sticker frame 1024. This is an example, the same size may be sufficient as the inducement sticker frames 1020 and 1022, the decoration sticker frame 1024 and the number-of-steps sticker frame 1026, and shapes may be different from each other. The sticker the inducement sticker frames 1020 and 1022, the decoration sticker frame 1024 and the number-of-steps sticker frame 1026 are respectively determined positions for pasting the stickers in advance. Therefore, it is possible to paste the stickers in line. However, the sticker may be pasted with being protruded or deviated from the inducement sticker frames 1020 and 1022 and the decoration sticker frame 1024.

Moreover, the diary screen 200 is provided with buttons 210, 212, 214, 216, 218, 220 and 222. The buttons 210 and 212 are arranged in the upper right portion of the diary screen 200, the button 214 is arranged at the lower left portion of the diary screen 200, and the button 216 is arranged at the lower right portion of the diary screen 200. Moreover, the button 220 is arranged at the upper left portion of the diary screen 200, and the button 222 is arranged on the right side of the button 220 with a character string of the year and month interposed therebetween.

Furthermore, an NPC (in FIG. 4, the NPC 104) is displayed on the right side of the button 214. The NPC is an NPC that appears in the main game, and is selected at random every time the diary function is performed or every predetermined time period (for example, one day). Therefore, even if the player does not perform an operation for changing an NPC, by performing the diary function, the player can contact and interact with various NPC(s). However, when the player has set a favorite NPC, the favorite NPC is displayed on the diary screen 200 each time. That is, the player can contact and interact with only the favorite NPC.

In the diary screen 200, the NPC performs reaction when a sticker is pasted. Moreover, if the NPC is tapped, when satisfying an inducement condition (for convenience of explanation, referred to as "inducement condition at time of tapping"), an inducement of pasting a sticker is performed. In this embodiment, the NPC emits a comment for inducing to paste a sticker (hereinafter, referred to as "inducement comment"). Moreover, the NPC performs a one-action when not satisfying the inducement condition at time of tapping. In this embodiment, the one-action means performing a predetermined action for a predetermined time period (for example, 2-3 seconds) or once. The predetermined action includes smiling, winking, clapping, dancing, jumping, etc.

The button 210 is a button for performing processing for buying a sticker at a virtual shop (hereinafter, referred to as "shop processing"). If the shop processing is performed, a shop screen (not shown) is displayed in front of the diary screen 200, so that it is possible to buy a sticker displayed in the shop screen. If the player buys a sticker, the bought sticker is added to the sticker the PC 102 possessed by the number of bought stickers. However, the player does not need to buy a sticker. If an outside of the shop screen is tapped, the shop processing is ended and the shop screen is hidden.

The button 212 is a button for performing processing for viewing (or reference) the sticker the PC 102 possesses (hereinafter, referred to as "possession sticker viewing processing"). If the button 212 is tapped, a possession sticker screen 300 (see FIG. 9) is displayed in front of the diary screen 200, so that the sticker the player or the PC 102 possesses can be viewed. Moreover, as described later, buying of the sticker is instructed in the possession sticker screen 300, sticker buying processing is performed. If the sticker buying processing is performed, a sticker buying confirmation screen (not shown) is displayed in front of the diary screen 200, and if confirmed by the player, the sticker buying processing is ended. However, the sticker buying processing may be ended by cancelling sticker buying. After the sticker buying processing is ended, returned to the possession sticker screen 300. That is, if the confirmation screen is hidden, the possession sticker screen 300 is displayed in front of the diary screen 200. If an outside of the possession sticker screen 300 is tapped, the possession sticker viewing processing is ended, and the possession sticker screen 300 is hidden.

The button 214 is a button for ending the diary function and returning to the main game. If the button 214 is tapped, the diary screen 200 is hidden, and the game screen 100 of the main game is displayed on the display 40.

The button 216 is a button for shifting the diary screen 200 to a position of today. That is, a page of the diary screen 200 is moved so that the date of today may become the third area from the bottom of the areas segmented by day of the display areas 204-208.

The button 218 is a button for confirming details and progress of a seasonal event that is currently performed in the main game. For example, the seasonal event is an event that a reward is obtainable when a plurality of predetermined items are acquired in the main game. Therefore, if the button 218 is turned on, it is possible to confirm types and/or number of the predetermined items to be acquired, types and/or number of the predetermined items having been acquired, and the obtainable reward. If the player performs an operation for ending confirmation of the details and the progress of the seasonal event, returned to the diary screen 200.

The button 220 is a button for shifting to a previous month, and the button 222 is a button for shifting to a next month. As an example, it is shifted to the first day (here, first date) of the previous month or the next month. However, the first day of the previous month or the next month is displayed in an upper most area in a case where the display areas 204-208 are segmented by day.

Moreover, in the diary screen 200, if a place where a sticker and a button are not displayed is touched, and subsequently, a vertical direction, that is, a display surface of the display 40 is slid or flicked upward or downward, that is, if a scroll operation is performed, the diary screen 200 is scrolled as described above.

In this embodiment, if the button 110 is tapped in the game screen 100, the diary function is performed and the diary screen 200 is displayed, when an inducement condition (for convenience of explanation, referred to as "inducement condition at start time") is satisfied, pasting a sticker is induced by the NPC.

The inducement condition at start time is that no sticker is pasted on both of the inducement sticker frames 1020 and 1022, for example. In this case, it is surely determined to perform an inducement. That is, it is determined with a probability of 100% (equivalent to a predetermined first probability). Moreover, when the sticker is pasted on either one of the inducement sticker frames 1020 and 1022, it means that a lottery for performing an inducement is drawn with a probability (equivalent to a predetermined third probability). If performing inducement is determined or drawn lots, a display frame 250 that an inducement comment having been drawn lots with the probability is indicated is displayed on the diary screen 200. Since an inducement by the NPC does not necessarily occur each time, there is pleasure of whether an inducement occurs.

However, when the stickers are pasted on both of the inducement sticker frames 1020 and 1022, no inducement is performed, the NPC performs a one-action, and a comment (hereinafter, referred to as "short comment") is emitted by drawing lots with a probability (corresponding to a predetermined second probability). The short comment (corresponding to a comment message) is mere speaking to the player. Moreover, since the short comment is not a comment to be emitted to the pasted sticker, no attribute described later is not set thereto. However, the NPC may necessarily emit a short comment.

Moreover, if the player pastes a sticker according to the inducement by the NPC, when satisfying a continuous inducement condition, a continuous inducement is generated by drawing lots with a probability. That is, a lottery for performing a continuous inducement is drawn lots. The continuous inducement will be described later.

When the player does not respond to an inducement by the NPC, the inducement comment having been drawn lots once is held during the time of activation of the game. However, the held inducement comment is erased when crossing a predetermined time (as an example, 5:00 am) or at the time of game end, and the diary function is performed at a next time, a lottery is drawn again on whether to perform an inducement. If a lottery for performing an inducement is again drawn, an inducement comment is drawn lots with a probability. In the following, the predetermined time is referred to as "re-lottery time".

Moreover, as described above, if the NPC is tapped, when an inducement condition at time of tapping is satisfied, an inducement of pasting a sticker is generated. The inducement condition at time of tapping is that one or more of the inducement sticker frames 1020 and 1022 are vacant.

When the inducement condition at time of tapping is not satisfied, no inducement is performed, the NPC performs a one-action. When the inducement condition at the time of tapping is satisfied, it is determined (i.e., settled) to perform an inducement, and it is determined whether the inducement comment is held. When the inducement comment is held, it is determined whether the current time is crossing the re-lottery time.

When the inducement comment is held and the current time is not crossing the re-lottery time, the held inducement comment is displayed again on the diary screen 200. However, when the inducement comment is not held, and when the current time is crossing the re-lottery time, an inducement comment is drawn lots again with a probability, and the inducement comment that is drawn lots again is displayed on the diary screen 200.

When there is an inducement by the NPC, the player can paste a sticker according to the inducement by the NPC, or can also paste a sticker without responding to the inducement by the NPC (i.e., ignoring an inducement). Moreover, when there is no inducement by the NPC, the player can also paste a sticker freely.

Moreover, when there is an inducement by the NPC, an act that the player pastes a sticker is an act according to an inducement of the NPC. That is, an exchange between the player and the NPC is performed. In this example, as described later, an inducement by the NPC is to emit a comment for inducing pasting a sticker (hereinafter, referred to as "inducement comment"). Moreover, a sticker is an image expressing a mood, an act, etc., and if a sticker is pasted to an inducement comment, a dialogue may be established by the mood, the act or the like expressed by the inducement comment and the image of the sticker.

In this embodiment, when there is an inducement by the NPC, a sticker is pasted according to this inducement by the NPC and a dialogue is established by such an exchange, it should be assumed that an act of the player pasting a sticker is performed in response to the inducement by the NPC.

On the other hand, when there is an inducement by the NPC, a sticker is pasted according to this inducement by the NPC but a dialogue is not established by such an exchange, it should be assumed that an act of the player pasting a sticker is not performed in response to the inducement by the NPC. Moreover, when there is an inducement by the NPC, but a sticker is pasted not according to this inducement by the NPC, it should be assumed that an act of the player pasting a sticker is not performed in response to the inducement by the NPC. When there is no inducement by the NPC, it should be assumed that an act of the player pasting a sticker is, of course, not performed in response to the inducement by the NPC.

Each of FIG. 7, FIG. 9-FIG. 12 and FIG. 14-FIG. 16 is a view showing further non-limiting example diary screen 200. FIG. 8 is a view showing a non-limiting example inducement comment table. FIG. 13 is a view showing a non-limiting example reaction table. With referring to FIG. 7-FIG. 16, a transition of the diary screen 200 and an exchange between the player and the NPC will be specifically described in a case where the diary function is performed or started in response to tapping of the button 110 provided in the game screen 100, an inducement is issued, and the player pastes a sticker in response thereto.

Figure 7:
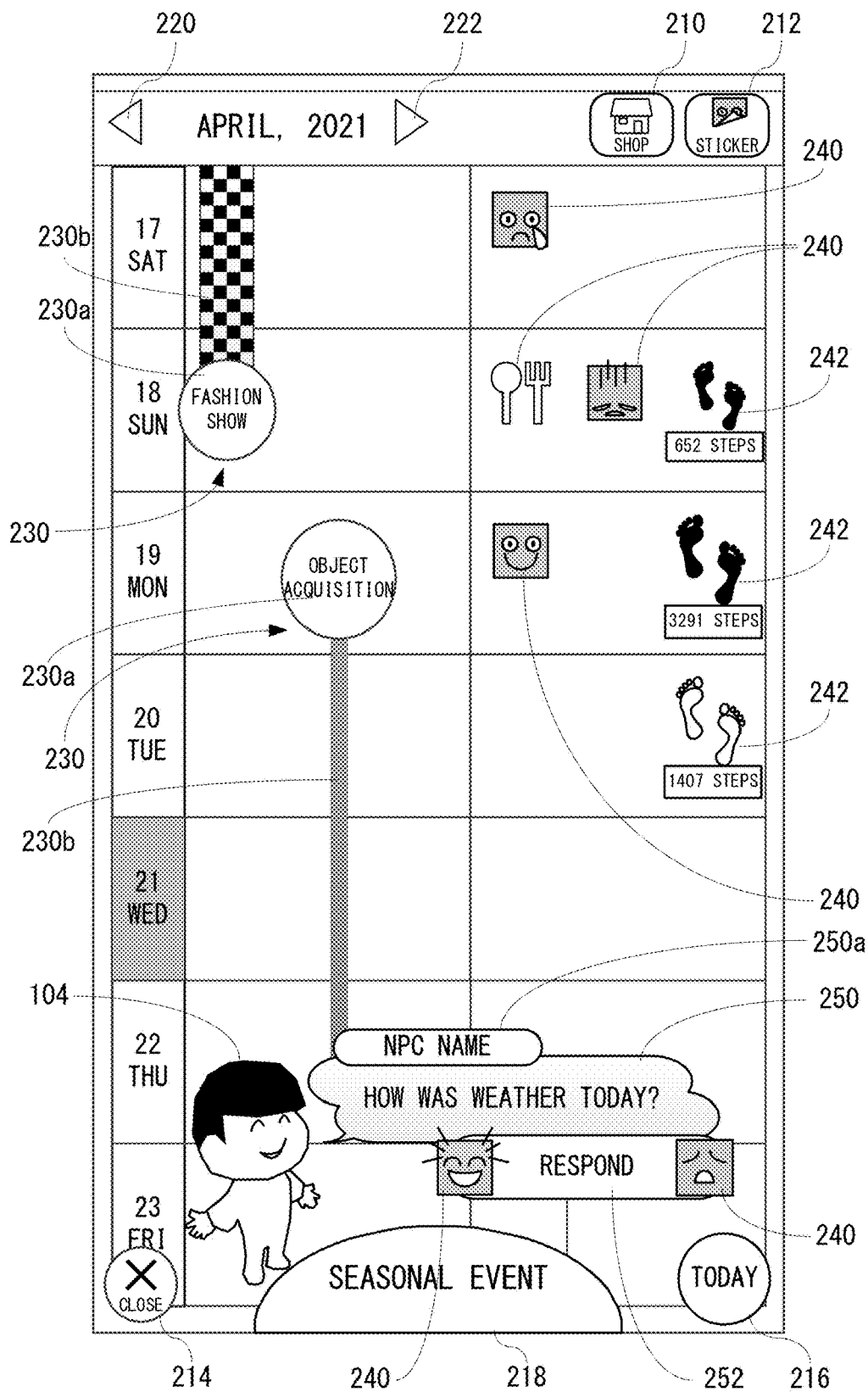
FIG. 7 is a view showing a second non-limiting example diary screen displayed on the display shown in FIG. 2.

As described above, an inducement is generated in the diary screen 200 shown in FIG. 7. That is, the NPC 104 is performing an inducement to paste a sticker. Specifically, the display frame 250 indicating an inducement comment (corresponding to a first message) emitted by the NPC 104 is displayed. The display frame 250 includes a display frame 250a indicating a name of the NPC 104, that is, an NPC name, and the display frame 250a is arranged at the upper left portion of the display frame 250. Furthermore, a button 252 for pasting a sticker according to an inducement is displayed below the display frame 250. Moreover, a sticker that the player or the PC 102 possesses or a sticker capable of being bought at a virtual shop is displayed on the both ends of the button 252.

In addition, although the button 252 is provided below the display frame 250, that is, adjacent to or close to the display frame 250 in this embodiment, the button 252 may be provided inside the display frame 250.

Each of the inducement comment and the sticker is assigned with an attribute, and each of the stickers displayed on the both ends of the button 252 is basically a sticker having the same attribute as that of the inducement comment out of the stickers that the player or the PC 102 possesses. This is to prevent unnatural presentation. In this embodiment, the attributes include a mood (positive), a mood (negative), a mood (normal), work, refreshment, eating, going out, a birthday, a memorial day, a decoration, coordination, and no attribute. Any one or two or more attributes are assigned to each sticker.

In this embodiment, when an attribute of the sticker is the same as an attribute of an inducement comment, a dialogue is established. That is, an attribute of the inducement comment is set according to an attribute of the sticker so that a dialogue may be established. This also applies to a reaction comment described later.

In an example shown in FIG. 7, an inducement comment is "How was weather today?", to which an attribute of mood is assigned. Therefore, out of the stickers that the player or the PC 102 possesses, two normal stickers 240 to which any one of the attributes of mood (positive), mood (negative) and mood (normal) is assigned are displayed on the both ends of the button 252.

However, when the player or the PC 102 does not possess the sticker of the same attribute as that of the inducement comment, the stickers having other attributes possessed by the player or the PC 102 are displayed on the both end of the button 252. Moreover, when the sticker that the player or the PC 102 possesses is less than two, a sticker capable of being bought at the virtual shop is displayed on the end of the button 252. As an example, a sticker of today is displayed. In this embodiment, the sticker of today means a sticker being sold today. That is, by buying at the virtual shop, a sticker that satisfies a predetermined acquisition condition and thus acquirable is displayed.

In addition, when the user does not possess a sticker and cannot buy a sticker at the virtual shop, no sticker is displayed on the end of the button 252.

In this embodiment, a plurality of inducement comments are prepared in advance, and are classified into four types, a normal inducement comment, a continuous inducement comment, a birthday inducement comment and a number-of-steps inducement comment. Moreover, a plurality of inducement comments are prepared for each type. As an example, as shown in FIG. 8, the inducement comment table is prepared and one inducement comment is selected from the inducement comment table at the time of generating an inducement. In this embodiment, the same probability is assigned to each of the plurality of inducement comments to be a selection target, and one inducement comment is drawn lots with a probability. That is, one inducement comment is selected from a plurality of candidates. However, a selection target condition is set for each inducement comment, and when not satisfying the selection target condition, such an inducement comment is excluded from the selection target. That is, an inducement comment that is not appropriate is excluded from the selection target. Therefore, an appropriate inducement fit to a situation is performed. For example, although it is appropriate to emit in the morning an inducement comment including "good morning", it is not appropriate to emit in the evening an inducement comment including "good morning".

As to the normal inducement comment, conditions of a selection target "morning". "daytime", "evening", "night", "a day of week (Friday in FIG. 8)" and "anytime" are indicated.

The inducement comments that the selection target condition is "morning" serves as a selection target when the current time at 6:00-9:00. The inducement comments that the selection target condition is "daytime" serves as a selection target when the current time at 11:00-13:00. The inducement comments that the selection target condition is "evening" serves as a selection target when the current time at 15:00-18:00. The inducement comments that the selection target condition is "night" serves as a selection target when the current time at 18:00-24:00. The inducement comments that the selection target condition is "day of week (Friday in FIG. 8)" serves as a selection target when the current day is a corresponding day of week, i.e., Friday. Although illustration is omitted, inducement comments for other days of week can also be provided, and the inducement comments for other days of week may serve as a selection target when the current day of week is the corresponding another day of week.

The inducement comments that the selection target condition is "anytime" serves as a selection target regardless the conditions of a selection target of the normal inducement comments, i.e., "morning", "daytime", "evening", "night" and "day of week".

In the inducement comment table, as a content of the comment in a case where the inducement comment is the normal inducement comment and the selection target condition is "morning", "Good morning [player name] san, did you sleep well?" or the like is indicated. However, the [player name] is a name of the player that the player set. The same applies hereinafter in this specification.

Moreover, in the inducement comment table, as a content of the comment in a case where the inducement comment is the normal inducement comment and the selection target condition is "night", "Good evening, today is also end, isn't it? How was your day?" or the like is indicated. Furthermore, as a content of the comment in a case where the inducement comment is the normal inducement comment and the selection target condition is "Friday", "It's Friday. How was your week?" or the like is indicated. Moreover, as a content of the comment in a case where the inducement comment is the normal inducement comment and the selection target condition is "anytime", "Hi! [player name] san, How are you? Let's know how you feel now by pasting sticker" or the like is indicated.

Moreover, in the inducement comment table, as to the conditions of a selection target to a continuous inducement comment, after mood (positive), after mood (negative), after mood (normal), after work, after refreshment, after eating, after going out, after birthday, after memorial day, after decoration, after coordination and after no attribute are indicated. However, in FIG. 8, after mood (positive), after mood (negative) and after going out are shown, and other conditions of a selection target are omitted.

That is, unlike the normal inducement comments, the inducement comment of the continuous inducement does not include the conditions of a selection target of "morning", "daytime", "evening", "night", and "day of week". That is, a candidate of the inducement comment is not changed according to time and day of week.

Moreover, although the continuous inducement will be described later, in this embodiment, the continuous inducement means that when pasting a sticker is induced by the NPC (i.e., first time inducement) and the player pastes a sticker in response thereto, pasting a sticker is further induced by the NPC (i.e., second time inducement).

The inducement comment that the selection target condition is "after mood (positive)" serves as a selection target when a sticker having an attribute of mood (positive) is pasted in response to the first time inducement. The inducement comment that the selection target condition is "after mood (negative)" serves as a selection target when a sticker having an attribute of mood (negative) is pasted according to the first time inducement. The inducement comment that the selection target condition is "after mood (normal)" serves as a selection target when a sticker having an attribute of mood (normal) is pasted in response to the first time inducement.

Moreover, the inducement comment that the selection target condition is "after work" serves as a selection target when a sticker having an attribute of work is pasted in response to the first time inducement. The inducement comment that the selection target condition is "after refreshment" serves as a selection target when a sticker having an attribute of refreshment is pasted in response to the first time inducement. The inducement comment that the selection target condition is "after eating" serves as a selection target when a sticker having an attribute of eating is pasted in response to the first time inducement.

Furthermore, the inducement comment that the selection target condition is "after going out" serves as a selection target when a sticker having an attribute of going out is pasted in response to the first time inducement. The inducement comment that the selection target condition is "after birthday" serves as a selection target when a sticker having an attribute of birthday is pasted in response to the first time inducement. The inducement comment that the selection target condition is "after memorial day" serves as a selection target when a sticker having an attribute of memorial day is pasted in response to the first time inducement.

Furthermore, the inducement comment that the selection target condition is "after decoration" serves as a selection target when a sticker having an attribute of decoration is pasted in response to the first time inducement. The inducement comment that the selection target condition is "after coordination" serves as a selection target when a sticker having an attribute of coordination is pasted in response to the first time inducement. The inducement comment that the selection target condition is "after no attribute" serves as a selection target when a sticker having an attribute of no attribute is pasted in response to the first time inducement.

In the inducement comment table, as a content of the comment in a case where the inducement comment is the continuous inducement comment and the selection target condition is "after mood (positive)", "What kind of fun did you have?" and "Did you go out?" or the like is indicated. Moreover, in the inducement comment table, as a content of the comment in a case where the inducement comment is the continuous inducement comment and the selection target condition is "after mood (negative)", "Are you feeling nervous today?" or the like is indicated. Furthermore, in the inducement comment table, as a content of the comment in a case where the inducement comment is the continuous inducement comment and the selection target condition is "after going out", "Where have you been? Changed your mind?" or the like is indicated.

Furthermore, in the inducement comment table, with respect to the inducement comment of a birthday, as the selection target condition, "birthday of player" is indicated, and with respect to the inducement comment of the number of steps, as the selection target condition, "satisfying condition for first number-of-steps" and "satisfying condition for the second number-of-steps" are indicated.

The inducement comment that the selection target condition is "birthday of player" serves as a selection target when the current day is a birthday of the player. The inducement comment that the selection target condition is "satisfying first condition for the number-of-steps" serves as a selection target when the number of steps today is the largest in the last five days and is more than 2 (two) times the number of steps on the day with the second largest number. The inducement comment that the selection target condition is "satisfying second condition for the number-of-steps" serves as a selection target when the number of steps today is the largest in the last five days and is less than 2 (two) times and more than 1.5 (one point five) times the number of steps on the day with the second largest number.

However, this is an example, and the first condition for the number of steps may be satisfied when the number of steps of the current day exceeds a first predetermined threshold value, and the second condition for the number of steps may be satisfied when the number of steps of the current day exceeds a second predetermined threshold value larger than the first predetermined threshold value.

In the inducement comment table, as a content of the comment in a case where the inducement comment is the inducement comment of birthday and the selection target condition is "birthday of player", "Happy birthday [player name] san, How are you feeling?" or the like is indicated. Moreover, in the inducement comment table, as a content of the comment in a case where the inducement comment is the inducement comment of the number of steps and the selection target condition is "satisfying first condition for the number-of-steps", "You walked a lot today. Did you go out?" or the like is indicated.

In addition, although a part of inducement comments are omitted in the inducement comment table of FIG. 8, two or more inducement comments are indicated for each selection target condition.

Moreover, even when the selection target conditions differ, the content of the comments of the inducement comment may include the same comment.

In this embodiment, although an inducement comment is selected from the inducement comment table, the inducement comment of a birthday and the inducement comment of the number of steps are preferentially selected from the normal inducement comment. Therefore, an inducement comment is selected from the normal inducement comment when the inducement comment of a birthday or the inducement comment of the number of steps does not satisfy the selection target condition. By emitting the inducement comment of a birthday or the inducement comment of the number of steps, the player can be made to have a sense of affinity with the NPC and to be motivated to promote the use of the diary function.

However, when a history of the exchange today (described later) is confirmed and the NPC has already emitted the inducement comment of a birthday, even if satisfying the selection target condition, the inducement comment of a birthday is not selected. This is the same also for the inducement comment of the number of steps.

Moreover, the NPC emits the inducement comment of a birthday when a date of today is a special day such as the birthday of the player in this embodiment; however, the special day may be a day that a predetermined number of days have passed since the player started playing the virtual game of this embodiment (e.g. the same day one year later). That is, when satisfying a time condition relevant to the player, the NPC emits an inducement comment according to the time condition.

Figure 9:
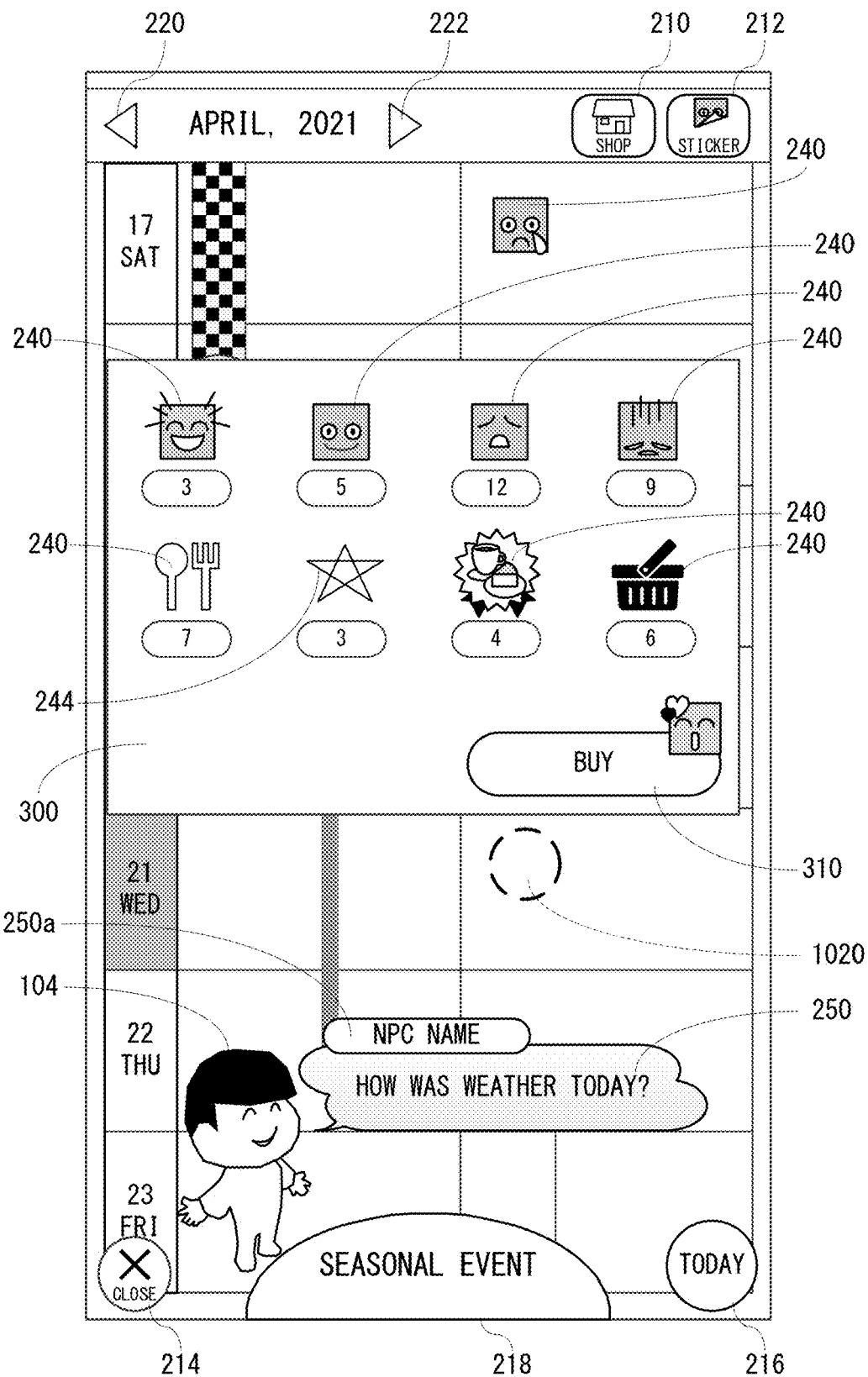
FIG. 9 is a view showing a third non-limiting example diary screen displayed on the display shown in FIG. 2.

Returning to FIG. 7, if the button 252 is tapped in the diary screen 200, that is, if pasting a sticker according to an inducement comment is selected, as shown in FIG. 9, a possession sticker screen 300 is displayed in front of the diary screen 200. Moreover, an inducement sticker frame 1020 (FIG. 6) is displayed with being emphasized. As an example, a gray dotted line indicating the inducement sticker frame 1020 in a left side is made into a black, and is thicken. That is, a frame (here, inducement sticker frame 1020) that functions as a guide for designating a candidate of a position where the display object is to be arranged is displayed. This is the same when an inducement sticker frame 1022 in a right side is displayed with being emphasized in a case of continuous inducement described later.

Moreover, when displaying the possession sticker screen 300, a responding button, i.e., a button 252 and stickers displayed on its both ends are hidden. However, an inducement comment, i.e., a display frame 250 remains displayed.

Seven types of the normal stickers 240 and one type of decoration sticker 244 are displayed in the possession sticker screen 300 shown in FIG. 9. Below each sticker, the possession number of the stickers is displayed. That is, the number of usable times of a sticker is finite, and decreased for each use, and increased for each acquisition. The possession number, i.e., the number of usable times of the stickers is controlled for each sticker.

Moreover, a button 310 is displayed on a lower right portion in the possession sticker screen 300. The button 310 has the same function as the button 210, and a button for buying a sticker. A today sticker is displayed on the upper right portion of the button 310. If the button 310 is tapped, sticker buying processing described above is performed.

In addition, when the number of types of the sticker that the player possesses is large, it is possible to see the sticker displayed on another page by scrolling the possession sticker screen 300.

If sticker is selected in the possession sticker screen 300, a selected sticker is displayed in the emphasized inducement sticker frame 1020. That is, the selected sticker is arranged to the display area 208. When the sticker is selected, the inducement comment, i.e., the display frame 250 and the possession sticker screen 300 are hidden. At this time, the possession number of the selected stickers is decremented by one (1). However, a sticker that the possession number is zero (0) cannot be selected. That is, the possession number of stickers is controlled and the use of the sticker is restricted.

Therefore, in comparison with a case where the same sticker can be used repeatedly many times, it is possible to make the player use various types of stickers. However, when the player acquires a sticker, the possession number of the stickers is increased by only the acquired number.

Moreover, also when an area except the possession sticker screen 300 is tapped without selecting a sticker, i.e., without pasting a sticker, the inducement comment, i.e., the display frame 250 and the possession sticker screen 300 are hidden. In this case, it is treated as if the inducement is ignored. Therefore, the diary screen 200 as shown in FIG. 4 is displayed on the display 40. At this time, the inducement comment having been indicated in the display frame 250 is held. The player can ignore the inducement by the NPC so as to perform a further operation in the diary screen 200. The further operation means an operation other than an operation of pasting a sticker according to an inducement.

Figure 10:
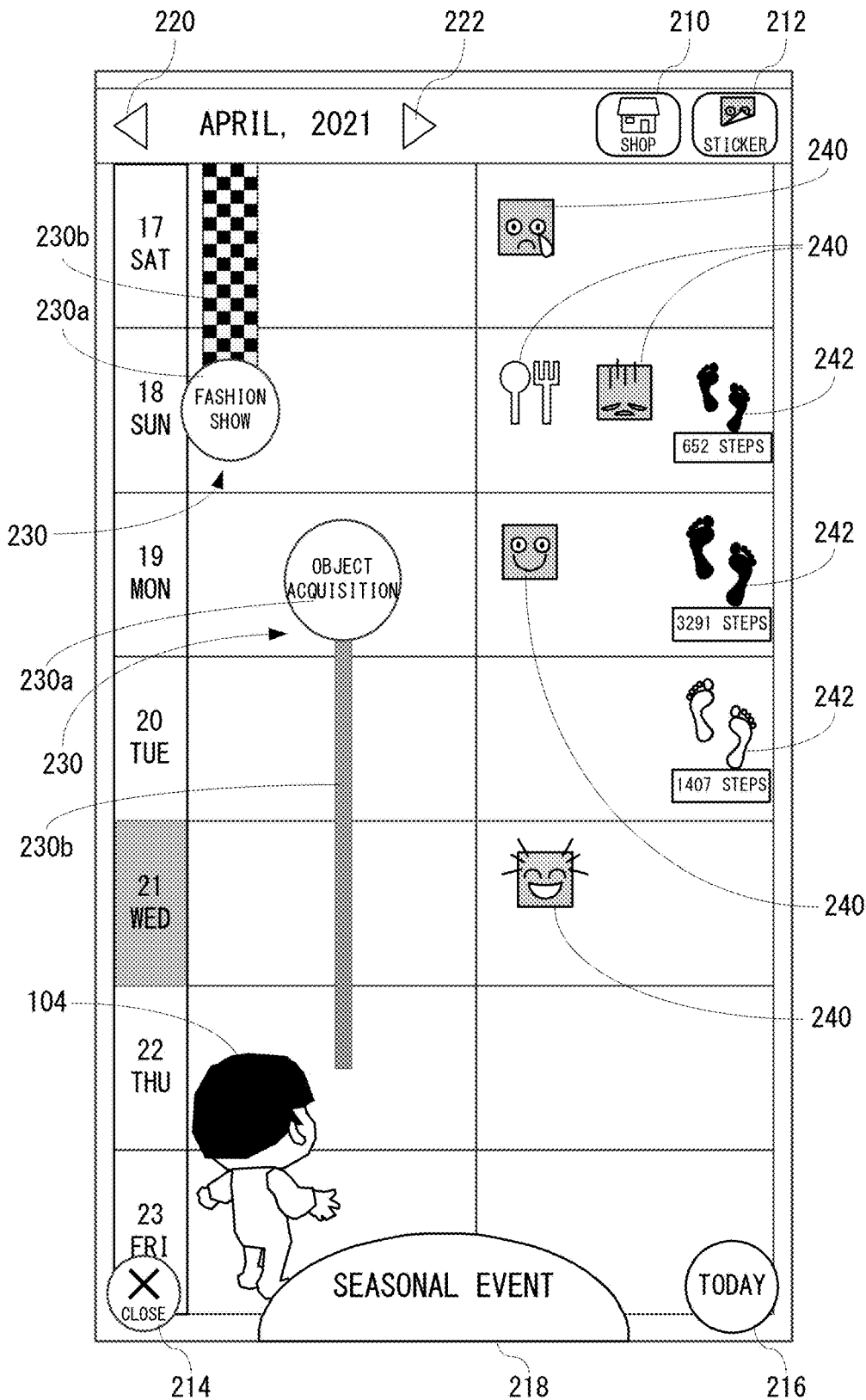
FIG. 10 is a view showing a fourth non-limiting example diary screen displayed on the display shown in FIG. 2.

FIG. 10 is the diary screen 200 in a state where the sticker selected in the possession sticker screen 300 shown in FIG. 9 is displayed. That is, in FIG. 9, in the display area 208, a normal sticker 240 is displayed in an area corresponding to Wednesday, April 21, and the NPC performs an action at the time of pasting a sticker. As for the action at the time of pasting a sticker, the NPC turns back so as to see the pasted sticker and then turns front. However, the NPC may be made to perform a one-action when it turns back. Since the NPC is thus made to perform an action at the time of pasting sticker, it is possible to more strengthen motivation to promote use of the diary function.

Figure 11:
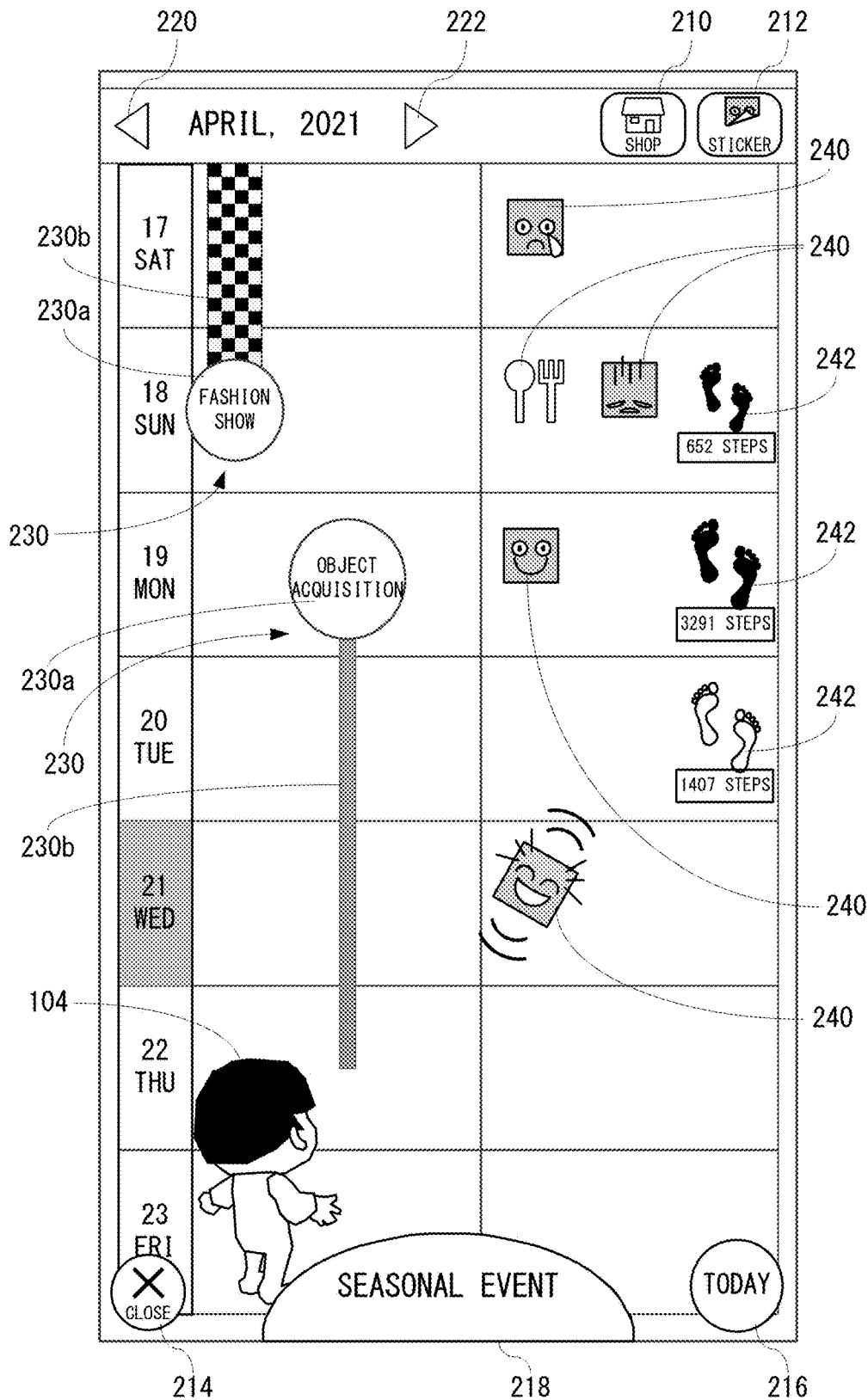
FIG. 11 is a view showing a fifth non-limiting example diary screen displayed on the display shown in FIG. 2.

Moreover, as shown in FIG. 11, the pasted normal sticker 240 is displayed to be enlarged and to be rotated and swung in the left-right direction (hereinafter, simply referred to as "swingable display"), and then, displayed statically with an original size. The attribute of the normal sticker 240 pasted here is mood (positive).

Figure 12:
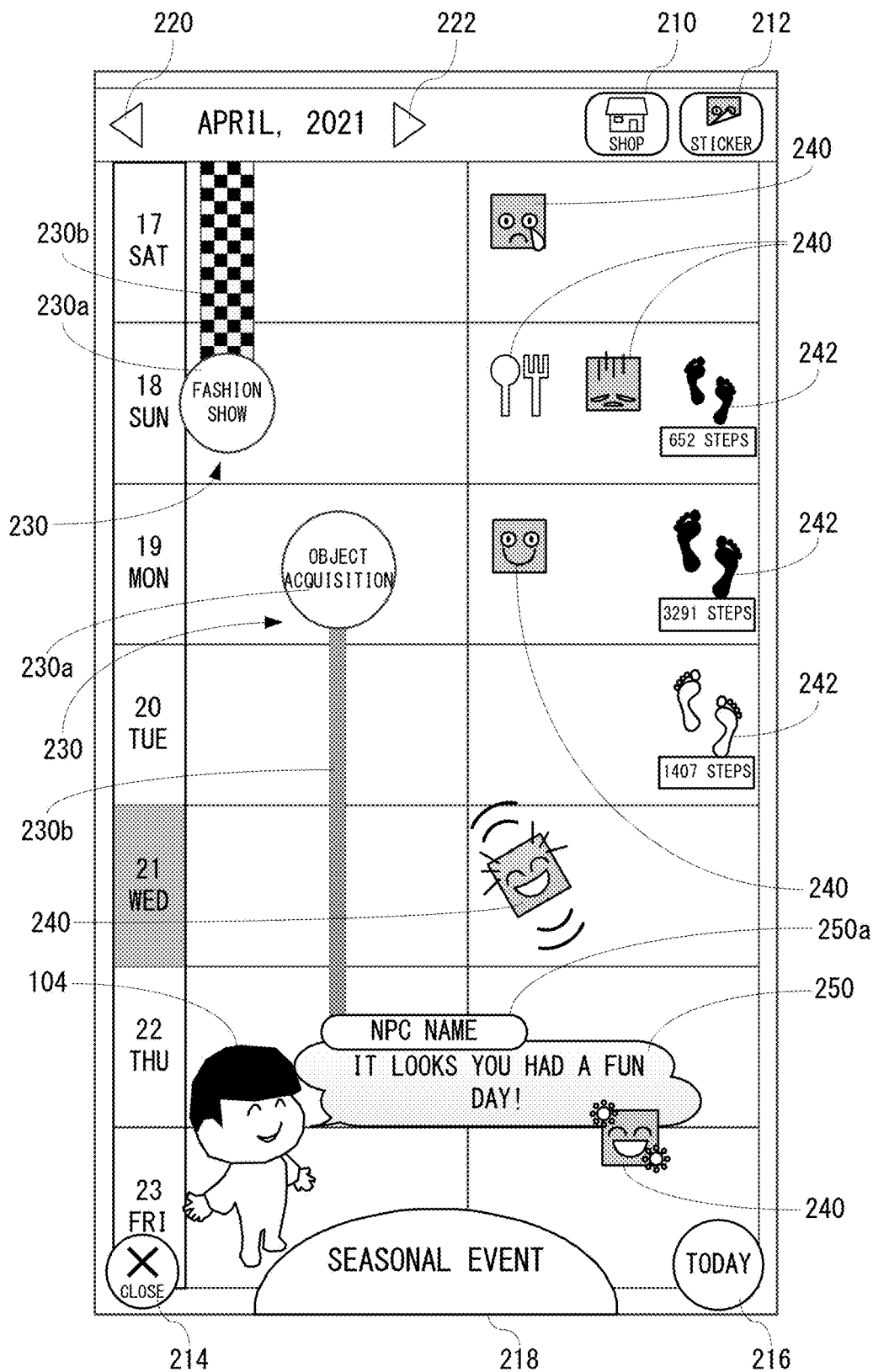
FIG. 12 is a view showing a sixth non-limiting example diary screen displayed on the display shown in FIG. 2.

Then, if the normal sticker 240 is pasted by the player in response to an inducement as shown in FIG. 12, according to the pasted normal sticker 240, the display frame 250 that indicates a reaction comment of the NPC is displayed. Reaction comments of the NPC are also assigned with attributes, respectively, and a reaction comment having the same attribute as the sticker pasted by the player is selected. In an example of FIG. 12, the display frame 250 that indicates a reaction comment "It looks you had a fun day!" is displayed. Moreover, a reaction sticker (in FIG. 12, a normal sticker 240 of a smiling face) is displayed on the lower right portion of the display frame 250. However, a reaction sticker is determined in advance according to the reaction comment of the NPC. In the following, the same applies to a case where the reaction comment is to be displayed.

In this embodiment, a plurality of reaction comments for the NPC are prepared in advance, and is classified into three types, a normal reaction comment, a future reaction comment and an exclusive reaction comment. However, the future reaction comment is a comment that is to be displayed when a sticker is pasted on the display area 208 corresponding to the date after today. Moreover, the exclusive reaction means a reaction that is to be performed when the player pastes a sticker having a content that the player responds to an inducement of or a continuous inducement of the NPC. The exclusive reaction comment may be displayed when the player pastes a sticker having a content that the player responds to an inducement of or a continuous inducement of the NPC, but the reaction comment is not necessarily displayed.

However, it is also possible to ensure the exclusive reaction comment is necessarily displayed when the player pastes a sticker having a content that the player respond to an inducement of or a continuous inducement of the NPC.

In addition, the normal reaction comments are comments except the future reaction comment and the exclusive reaction comment.

Moreover, a plurality of reaction comments are prepared for each type. As an example, as shown in FIG. 13, a table of comments for the reaction of the NPC at the time of pasting a sticker (referred to as "reaction comment table") is prepared, and a reaction comment of the NPC is selected, when generating a reaction, from the reaction comment table.

In the reaction table shown in FIG. 13, as contents of the normal reaction comment, there are indicated "Let's know again by pasting sticker", "It looks like you had fun day!", "It looks like you feel good!", "It looks like there was something making you disgustful", "Do you have hard time?". "Shopping is fun!", etc. Moreover, as contents of the future reaction comment, "Looking forward it", "Is there anything good?", "Is there anything you don't like?", "It's depressing", "Do you go out?", etc. are indicated. Furthermore, as contents of the exclusive reaction comment, "It looks like good thing happened. Enviable.", "It looks like you have something to look forward. Exciting!", "Sometimes things don't work out. You're trying hard". "It looks like you had great time. I'm so happy", "[Player Name] san, thank you for teaching.", etc. are indicated.

In this embodiment, when the player pastes a sticker of a content responding to the inducement comment of the NPC, one reaction comment (corresponding to a third message) is selected from the normal reaction comments and the exclusive reaction comments in the reaction comment table. However, one reaction comment may be selected from the exclusive reaction comments. When selecting a reaction comment, the same probability is set to a plurality of reaction comments that become a selection target, and one reaction comment is drawn lots with a probability. In the following, the same applies to a case where one reaction comment is to be selected. However, the probability that the exclusive reaction comment is drawn lots may be made higher than the probability that the normal reaction comment is selected. Moreover, a sticker having a content responding to the inducement comment by the NPC means a sticker having the same attribute as the attribute assigned to the inducement comment. Moreover, as described above, the reaction comment having the same attribute as the sticker pasted by the player is a selection target.

Moreover, when a sticker is pasted without an inducement of the NPC, or when the player pastes a sticker while ignoring the inducement comment of the NPC, one reaction comment is selected from the normal reaction comments (corresponding to a second message) in the reaction comment table. However, when the date that the sticker is pasted is after the next day, one (1) reaction comment (corresponding to the second message) is selected from the future reaction comments in the reaction comment table. For example, because when the normal sticker 240 of a smiling face is pasted on the date of tomorrow, it is unnatural to emit a reaction comment "It looks like you had fun day!".

However, a case of no inducement of the NPC means a case where the NPC does not emit the inducement comment, and when the diary function is performed, the diary screen 200 as shown in FIG. 4 is displayed on the display 40.

Moreover, a case where the sticker is pasted while ignoring the inducement comment of the NPC means a case where a sticker having a content not responding to the inducement comment of the NPC after tapping of the button 252 or a case where a sticker is pasted on the inducement sticker frame 1020 or 1022 or the decoration sticker frame 1024 without tapping of the button 252, that is, regardless of the inducement comment of the NPC.

When the sticker of the content not responding to the inducement comment of the NPC is pasted, one reaction comment is selected from candidates of a plurality of reaction comments that are different at least partially from a case where a sticker having a content responding to the inducement comment of the NPC.

Figure 14:
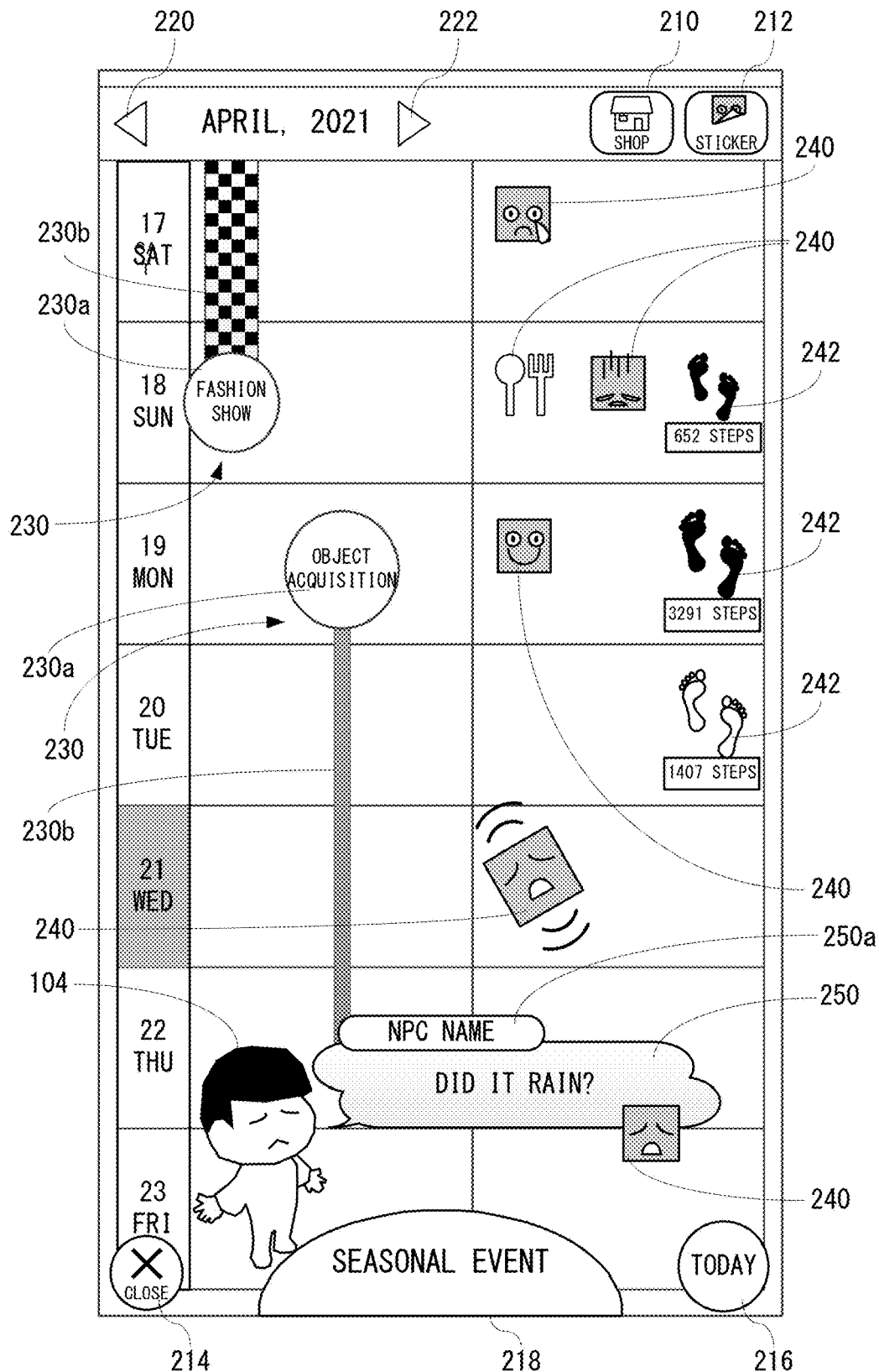
FIG. 14 is a view showing a seventh non-limiting example diary screen displayed on the display shown in FIG. 2.

In FIG. 14, a diary screen 200 in a case where in the diary screen 200 shown in FIG. 8, pasting a sticker is induced and the player pasted the normal sticker 240 having the attribute of mood (negative) according to the inducement is displayed.

A reaction comment of the attribute that is the same as the normal sticker that the player pasted is selected, and in an example shown in FIG. 14, the display frame 250 indicating a reaction comment "Did it rain?" is indicated is displayed. Moreover, the normal sticker 240 determined in advance according to this reaction comment is displayed on the lower right portion of the display frame 250.

In addition, since intermediate progress screens in which the inducement sticker frame 1020 is emphasized, the sticker to be pasted is selected, the NPC 104 looks back a manner that a sticker is pasted, and the pasted sticker is enlarged and swingably displayed are the same as those shown in FIG. 10-FIG. 12, omitted here. This is also the same as a case where the diary screen 200 shown in FIG. 15 will be described.

Figure 15:
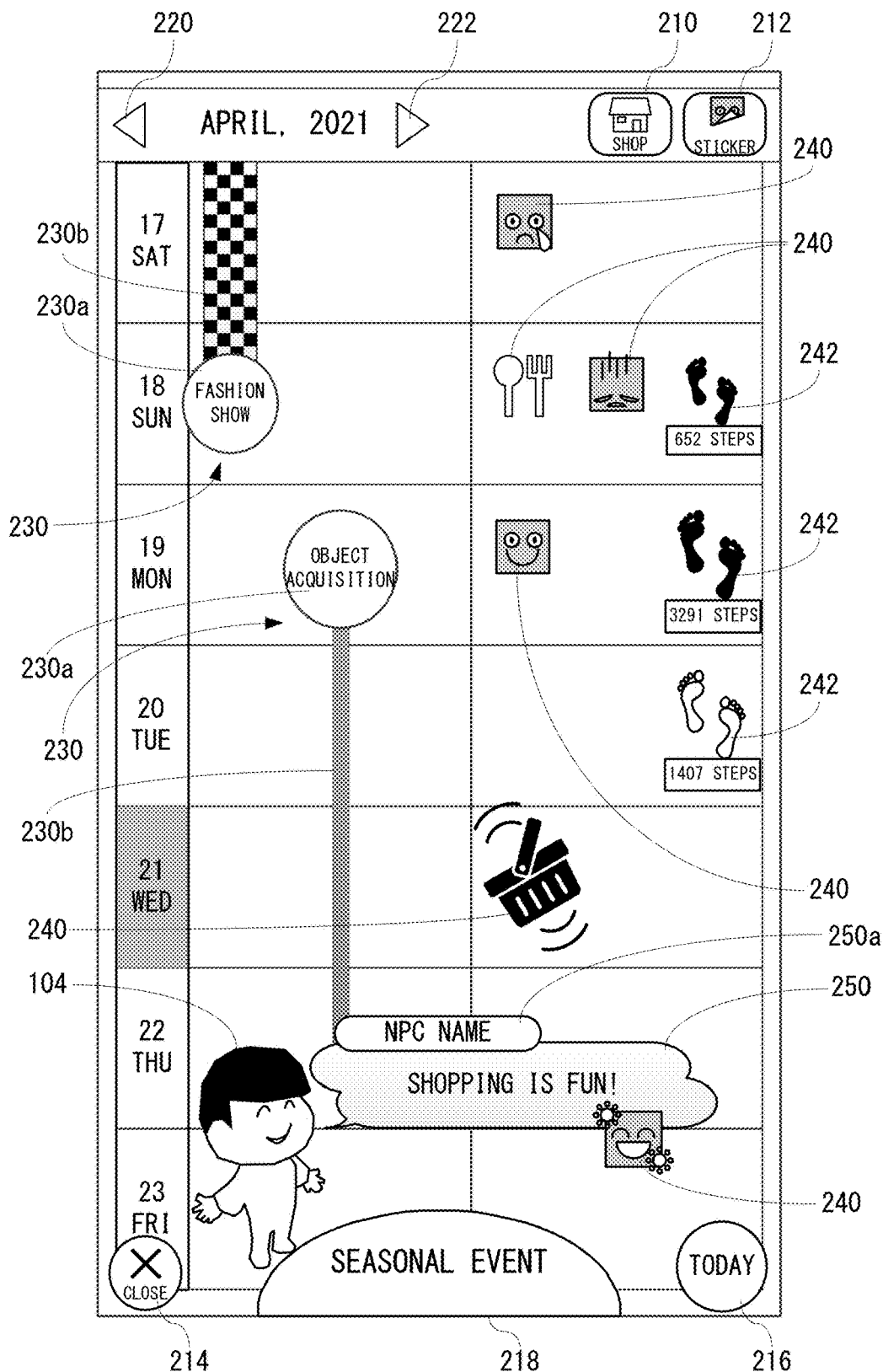
FIG. 15 is a view showing an eighth non-limiting example diary screen displayed on the display shown in FIG. 2.

Moreover, in FIG. 15, a diary screen 200 in a case where in the diary screen 200 shown in FIG. 8, pasting a sticker is induced and the player pasted the normal sticker 240 having the attribute of shopping according to the inducement is displayed.

A reaction comment of the attribute that is the same as the normal sticker that the player pasted is selected, and in an example shown in FIG. 15, a display frame 250 that a reaction comment "Shopping is fun!" is indicated is displayed. Moreover, the normal sticker 240 determined in advance according to this reaction comment is displayed on the lower right portion of the display frame 250.

Next, a continuous inducement will be described. As described above, when the player pastes, according to the first time inducement, the sticker of the content responding to the inducement comment of the NPC, that is, when a condition of the continuous inducement is satisfied, whether the continuous inducement is to be issued is drawn lots with a probability.

In the above-described example, the condition of the continuous inducement can be satisfied in a case where when the button 252 is tapped in the diary screen 200 shown in FIG. 7, the normal sticker 240 having the attribute of a mood (positive) is pasted as shown in FIG. 10-FIG. 12 or the normal sticker 240 having the attribute of a mood (negative)

is pasted as shown in FIG. 14, that is, when the sticker having the content responding to the inducement comment of the NPC is pasted.

On the other hands, the condition of the continuous inducement cannot be satisfied in a case where when the button 252 is tapped in the diary screen 200 shown in FIG. 7, the normal sticker 240 having the attribute of shopping is pasted as shown in FIG. 15, that is, when the sticker having the content not responding to the inducement comment of the NPC is pasted. Moreover, the condition of the continuous inducement cannot be satisfied also in a case where a sticker is pasted on the inducement sticker frame 1020 or 1022 or the decoration sticker frame 1024 without tapping of the button 252 in the diary screen 200 shown in the FIG. 7, that is, regardless of the inducement comment of the NPC.

As described above, when the condition of the continuous inducement is satisfied, whether the continuous inducement is to be issued is drawn lots with a probability, and the continuous inducement is to be issued, an inducement comment is selected from an inducement comment table. However, one (1) inducement comment that is an inducement comment that the selection target condition is "continuous inducement" and has an attribute that the same as the attribute assigned to the sticker pasted by the player in response to the first time inducement comment is selected out of the normal inducement comments.

Figure 16:
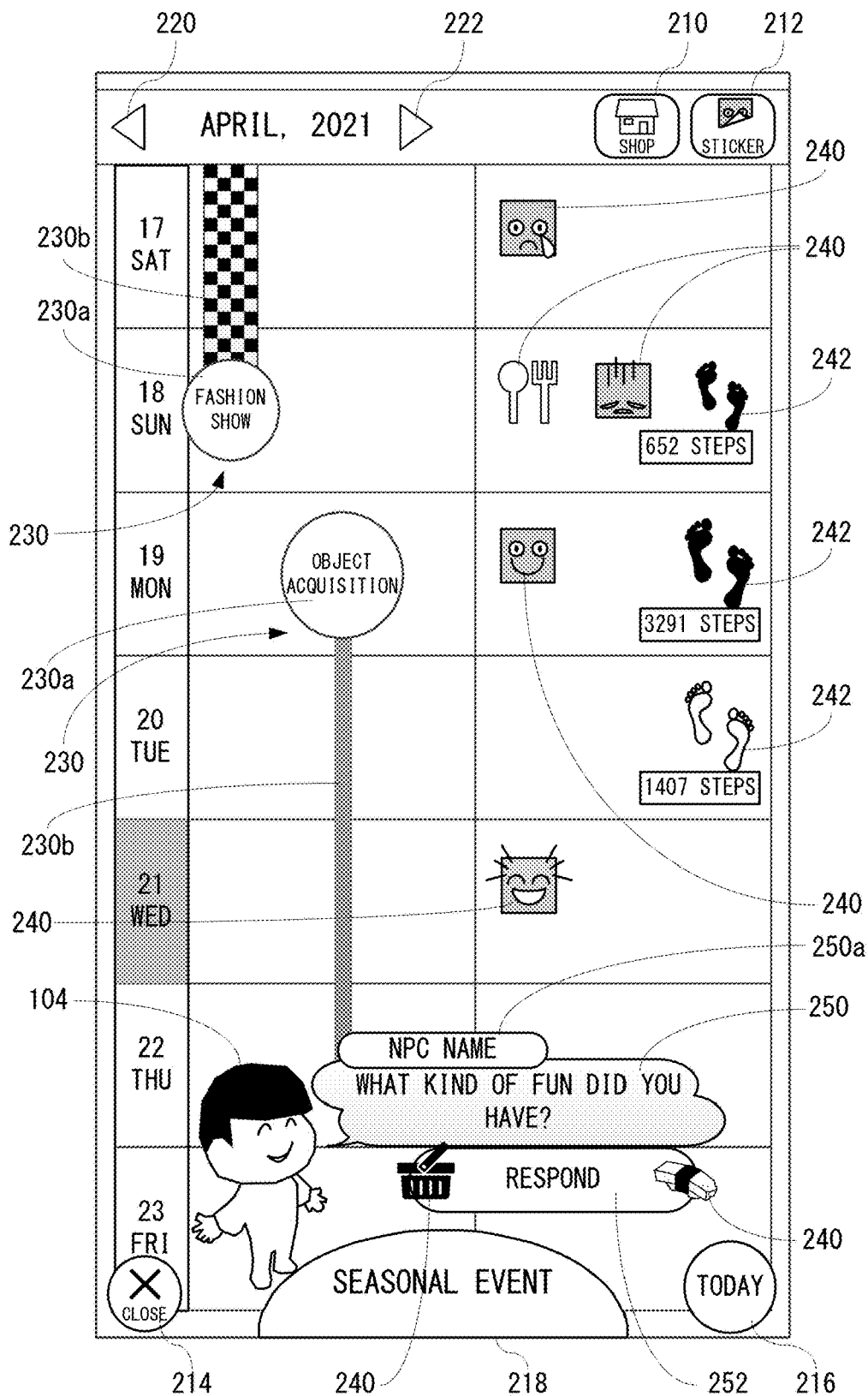
FIG. 16 is a view showing a ninth non-limiting example diary screen displayed on the display shown in FIG. 2.

FIG. 16 is a view showing another non-limiting example diary screen 200. When the diary screen 200 shown in FIG. 12 is displayed and issuing the continuous inducement is selected by a lottery, the diary screen 200 of FIG. 16 is displayed on the display 40.

An inducement comment of the continuous inducement (corresponding to a fourth message) is selected so that the directionality of the sticker pasted responding to the first time inducement and the reaction comment responding to the pasted sticker are connected, that is, the exchange between the player and the NPC becomes natural flow. Therefore, in the inducement comment table, as to the inducement comment of the continuous inducement, as the conditions of a selection target, after mood (positive), after mood (negative), after mood (normal), after work, after refreshment, after eating, after going out, after birthday, after memorial day, after decoration, after coordination and after no attribute are indicated.

As described above, the player pastes the normal sticker 240 having the attribute of a mood (positive) (for convenience of description, may be referred to as "first sticker") responding to the first time inducement, and responding thereto, the reaction comment having the attribute of a mood (positive) is displayed. Therefore, the inducement comment of the continuous inducement is drawn lots by a probability from the inducement comment that after mood (positive) is indicated as the condition of the selection target. In an example shown in FIG. 16, the display frame 250 that the inducement comment "What kind of fun did you have?" is indicated is displayed in the diary screen 200. That is, the second time inducement is issued. Moreover, the button 252 is displayed on the lower portion of the display frame 250.

If the button 252 is tapped in the diary screen 200 shown in FIG. 16, i.e., the diary screen 200 that the inducement comment of the continuous inducement is displayed, similar to the first time inducement, i.e., similar to a case shown in FIG. 9, the responding button, i.e., the button 252 and stickers displayed on its both ends are hidden, and the possession sticker screen 300 is displayed in front of the diary screen 200, and at this time, the inducement sticker frame 1022 on a right side is displayed with being emphasized. Moreover, similar to the first time inducement, if a sticker is selected in the possession sticker screen 300 and the selected sticker (for convenience of description, may be referred to as "second sticker") is pasted, as shown in each of FIG. 12-FIG. 14, a reaction comment having an attribute that is the same as the attribute of the pasted sticker (for convenience of description, may be referred to as "second time reaction comment") and a sticker responding to the second reaction comment are selected and displayed.

However, when the second sticker is pasted responding to the second time inducement of the NPC, one (1) reaction comment (corresponding to a sixth message) is selected from the normal reaction comment and the exclusive reaction comment in the reaction comment table. Moreover, when the second sticker is pasted without responding to the second time inducement of the NPC, one (1) reaction comment (corresponding to a fifth message) is selected from the normal reaction comment or the future reaction comment in the reaction comment table.

Moreover, as described above, when the button 110 is tapped in the game screen 100, and the diary function is performed and the diary screen 200 is displayed on the display 40, if the stickers are pasted on both of inducement sticker frames 1020 and 1022, the NPC emits a short comment by drawing lots by a probability. As an example, as shown in FIG. 17, a table related to the short comment to be emitted by the NPC (hereinafter, referred to as "short comment table") is prepared in advance, and a short comment that the NPC emits is drawn lots by a probability from a plurality of short comments described on this short comment table. However, the probability is equal.

In the short comment table shown in FIG. 17, corresponding to an identification number, a content of comment is indicated. The identification number is information for identifying the content of comment. However, instead of the identification number, an alphabetic character string or a symbol that people cannot decipher may be used. According to an order of the identification number indicated, the contents of comments are as follows: "Hi, [Player Name] san!", "I like sticker very much", "What good things can you do today?", "Have you checked schedule?", "Let's paste a lot of stickers to make diary cute", "Stickers can be removed, so try pasting various stickers", "I feel like eating cake", "It you paste stickers on your schedule and memories, it will been fun diary", etc.

Moreover, by tapping the pasted sticker, it is possible to see a history of the exchange between the player and the NPC, and also remove the sticker.

The history of the exchange is a history of an exchange between the player and the NPC when the player pastes a sticker. When the NPC emits the inducement comment, the inducement comment, the sticker pasted according to the inducement comment, and the reaction comment and the reaction sticker with respect to the pasted sticker are stored as a history corresponding to the pasted sticker and the date that its sticker is pasted. However, the history also includes information of a position the sticker is pasted, and the identification information (name of the NPC etc.) of the NPC that the exchange is performed.

When the continuous inducement is generated, a history is also stored for each sticker pasted by the player. That is, a first time inducement comment, a first sticker pasted according to the first time inducement comment, and a first time reaction comment and a first time reaction sticker with respect to the pasted first sticker are stored as a history corresponding to the pasted first sticker and the date that its first sticker is pasted. Moreover, a second time inducement comment, a second sticker pasted according to the second time inducement comment, and a second time reaction comment and a second time reaction sticker with respect to the pasted second sticker are stored as a history corresponding to the pasted second sticker and the date that its second sticker is pasted.

However, when the continuous inducement is generated, a single history may be stored for two stickers pasted by the player. In this case, a first time inducement comment, a first sticker pasted according to the first time inducement comment, and a first time reaction comment and a first time reaction sticker with respect to the pasted first sticker, a second time inducement comment, a second sticker pasted according to the second time inducement comment, and a second time reaction comment and a second time reaction sticker with respect to the pasted second sticker are stored as a history corresponding to the pasted first sticker and the pasted second sticker and the dates that the two stickers are pasted.

Moreover, in a case where there is no inducement by the NPC or in a case where the inducement of the NPC is ignored, a pasted sticker, and a reaction comment and a reaction sticker with respect to the pasted sticker are stored as a history corresponding to the pasted sticker and the date that its sticker is pasted.

In addition, even if the diary function is ended in the middle of the exchange, if the player pastes the sticker, the exchange between the player and the NPC is stored as a history.

However, the exchange between the player and the NPC may be erased without being stored as a history when the diary function is ended in the middle of the exchange. In this case, the sticker pasted by the player is removed and is returned to a possession sticker.

FIG. 18 is a view showing a non-limiting example history screen 400. For example, if tapping the normal sticker 240 pasted on the area corresponding to April 17 of the display areas 208 in the diary screen 200 shown in FIG. 16, a history screen 400 as shown in FIG. 18 is displayed. As an example, the history screen 400 is displayed in front of the diary screen 200.

As shown in FIG. 18, in the history screen 400, a display frame 402 is provided in an upper portion, and a comment image 404 of the NPC and the sticker pasted by the player are displayed vertically along with a time series below the display frame 402. The date (including A.D.) and day of week that the sticker tapped in the diary screen 200 is pasted are displayed in the display frame 402. Moreover, the comment image 404 of the NPC includes a display frame 404a displaying a face image of the NPC (here, NPC 104), and a display frame 404b displaying a content of the comment of the NPC.

In an example shown in FIG. 18, "2021 Apr. 17 Saturday" is indicated in the display frame 402. Moreover, the comment image 404 in an upper side includes the face image of the NPC 104 that emitted an inducement comment, and the content of comment of the inducement comment. The comment image 404 in a lower side includes the face image of the NPC 104 that emitted a reaction comment, and the content of comment of the reaction comment. A sticker pasted by the player (here, normal sticker 240) is displayed between the comment image 404 in an upper side and the comment image 404 in a lower side.

Moreover, a button 410 is provided in the history screen 400. The button 410 is a button for removing the sticker that is tapped in the diary screen 200. If a sticker is removed, one (1) is added to the number of the stickers concerned of the possession stickers. That is, the removed sticker is returned to the possession sticker. Therefore, it is possible to reuse a sticker erroneously removed. However, if a sticker is removed, the history of the exchange corresponding to this sticker is erased.

As described above, when the continuous inducement is generated, the histories are stored respectively for the first sticker and the second sticker that are pasted by the player, and therefore, the history screen 400 as shown in FIG. 18 is displayed for each of the histories. Therefore, when the history screen 400 for the first sticker is being displayed, it is not possible to see the history for the second sticker. Moreover, when the history screen 400 for the second sticker is being displayed, it is not possible to see the history for the first sticker.

However, as described above, when a continuous inducement is generated, one history may be stored for two stickers pasted by the player. In this case, in the history screen 400 as shown in FIG. 18, the comment image 404 indicating the inducement comment of the continuous inducement, the sticker pasted according to the inducement comment of the continuous inducement, and the comment image 404 indicating the reaction comment in response to pasting of the sticker are further displayed below the image 404 of a lower side vertically located in a line.

Moreover, although illustration is omitted, when the inducement of the NPC is not generated, the comment image 404 of an upper side is not displayed in the history screen 400 as shown in FIG. 18.

Moreover, if the button 410 is tapped and the sticker is removed, or the area except the history screen 400 is tapped, the history screen 400 is hidden.

Next, the number-of-steps sticker 242 and pasting of the number-of-steps sticker 242 will be described. The diary function is performed by operating the button 110 in the game screen 100 shown in FIG. 3, and the diary screen 200 is displayed on the display 40 instead of the game screen 100. If conditions for pasting of the number-of-steps sticker 242 (hereinafter, simply referred to as "pasting condition") are satisfied at this time, the number-of-steps sticker 242 is pasted in the number-of-steps sticker frame 1026 corresponding to today or yesterday of the diary screen 200.

In this embodiment, a first pasting condition is that the number of steps is acquired in conjunction with an application program of health care administration, and a second pasting condition is that there is a vacancy in the number-of-steps sticker frame 1026 for the date of today or yesterday that one or more steps have been obtained. In this embodiment, when the diary function is performed, the numbers of steps of yesterday and today counted by the application program of health care administration, and the accumulative number of steps up to yesterday in the current month and the accumulative number of steps up to today in the current month are acquired. However, since the accumulative number of steps of the current month can be obtained by adding the daily number of steps if the daily number of steps is acquirable, the accumulative number of steps of the current month does not need to be counted by the application program of health care administration.

However, if the game apparatus 16 is equipped with a function for counting the number of steps (here, referred to as "number-of-steps count function"), the number of steps counted by the number-of-steps count function may be acquired without being in conjunction with the application program of health care administration. Moreover, the number of steps may be acquired from a pedometer that is communicable with the game apparatus 16.

Moreover, a reason of limiting to today or yesterday in the second pasting condition is for avoiding that the number-of-steps sticker 242 of two or more days ago is pasted automatically. However, the second pasting condition may be that there is a vacancy in the number-of-steps sticker frame 1026 before today that one or more number of steps is acquirable.

Figure 19:
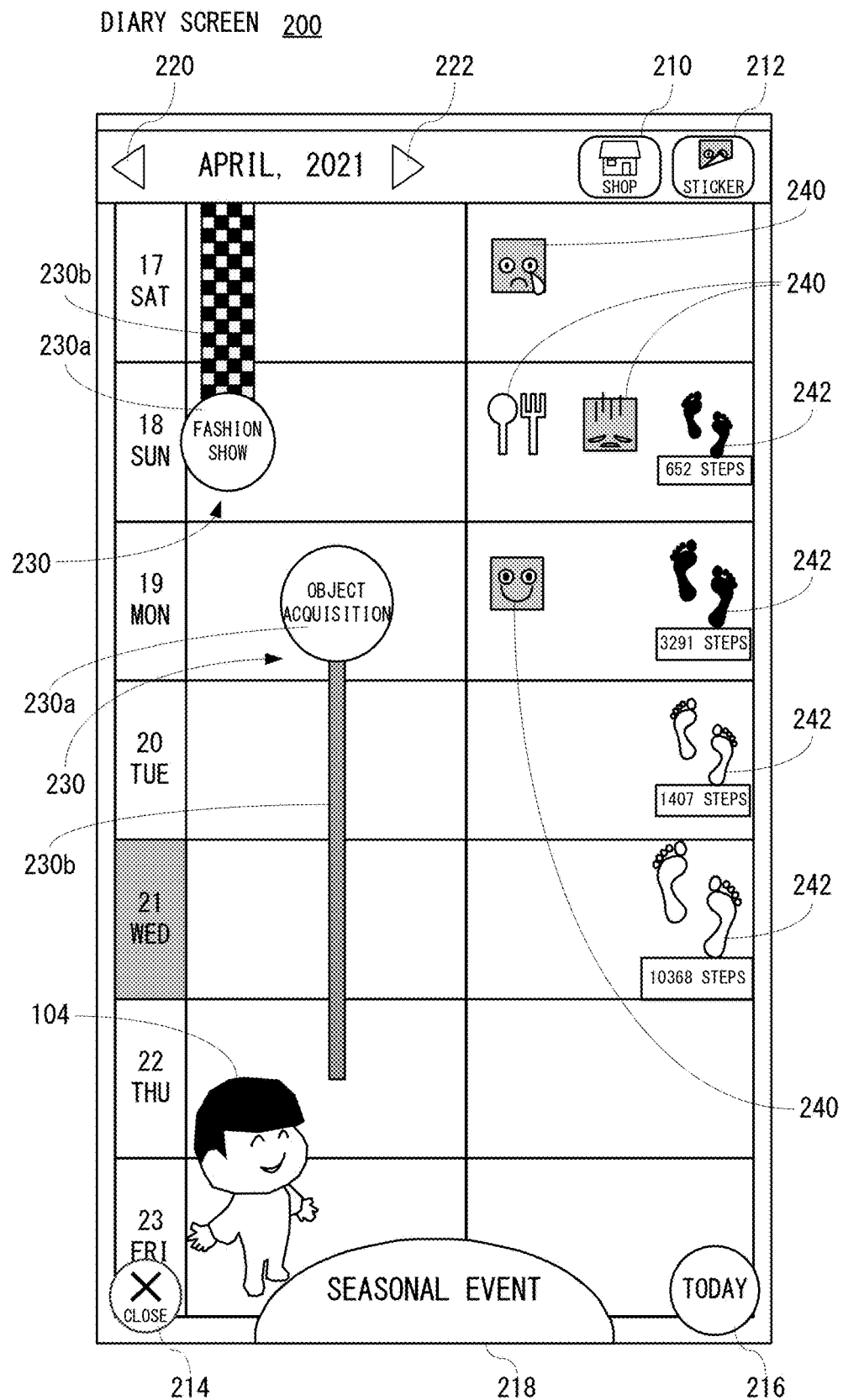
FIG. 19 is a view showing a tenth non-limiting example diary screen displayed on the display shown in FIG. 2.
Figure 20:
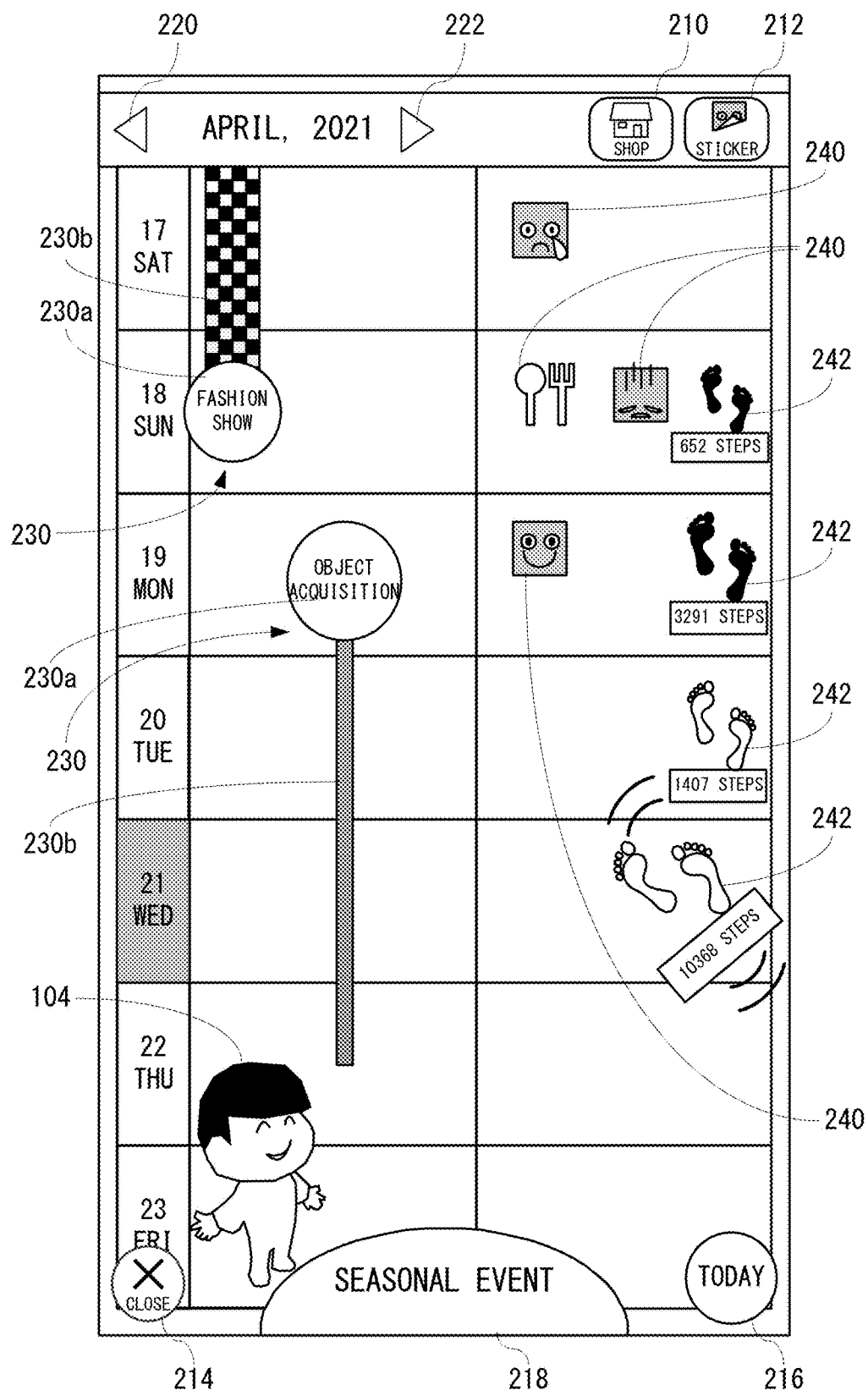
FIG. 20 is a view showing an eleventh non-limiting example diary screen displayed on the display shown in FIG. 2.

FIG. 19 is a view showing another non-limiting example diary screen 200. In an example shown in FIG. 19, the diary screen 200 in a state where the number-of-steps sticker 242 is pasted in the number-of-steps sticker frame 1026 corresponding to the date of today (i.e., Apr. 21, 2021) is displayed on the display 40. If the number-of-steps sticker 242 is pasted, as shown in FIG. 20, the pasted number-of-steps sticker 242 is swingably displayed, and then, stationally displayed.

In this embodiment, when the number-of-steps sticker 242 is pasted, the number of steps of a day that the number-of-steps sticker 242 is pasted and the accumulative number of steps of a month including the day that the number-of-steps sticker 242 is pasted are acquired from the application program of health care administration, and the number of steps of the day that the number-of-steps sticker 242 is pasted is displayed in the frame of the number-of-steps sticker frame 242.

In this embodiment, it is possible to record an activity amount in the diary almost every day by setting the activity that is a part of lifestyle like a walking as a record target.

However, when the diary function is performed, if the number-of-steps sticker 242 is pasted in the number-of-steps sticker frame 1026 of today, the number of steps of a day that the number-of-steps sticker 242 is pasted is acquired and the number of steps having been updated is displayed (updated) in the frame of the number-of-steps sticker frame 242. However, the number of steps displayed in the display frame of the number-of-steps sticker 242 does not need to be updated. A reason why the number of steps, that is, a numeral indicated in the display frame of the number-of-steps sticker 242 that has been pasted once is changed is that there is a possibility of giving a sense of incongruity to the player.

Moreover, a size of the number-of-steps sticker 242 is determined according to the number of steps of the day that the same is pasted, and a color of the number-of-steps sticker 242 is determined according to the accumulative number of steps of the month including that day. That is, the size of the number-of-steps sticker 242 is determined by the number of steps for one day that is a first unit period, and the color of the number-of-steps sticker 242 is determined by the accumulative number of steps for one month that is a second unit period including the first unit period. However, the number of steps for one day and the accumulative number of steps for one month are the number of steps and the accumulative number of steps counted by the time that the number-of-steps sticker 242 is pasted. That is, the number of steps for one day means the number of steps counted from the time that the date changes until the time that the number-of-steps sticker 242 is pasted when a day that the number-of-steps sticker 242 is pasted is today. Moreover, the accumulative number of steps for one month is an accumulative number of steps from the first date of the current month including the date of the day (in this embodiment, yesterday or today) that the number-of-steps sticker 242 is pasted until the day that the number-of-steps sticker 242 is pasted. Thus, since the start of the second unit period is fixed, when viewing the diary screen 200, it is possible to easily know what day of the second unit period, that is, how long the period passed by looking at the date that the number-of-steps sticker 242 is pasted.

However, when the display areas 204-208 are segmented with a unit period that is shorter than day, then first unit period may be set as a unit period of hours.

FIG. 21A is a view showing a non-limiting example change in the size of the number-of-steps sticker 242. FIG. 21B is a view showing a non-limiting example change in the color of the number-of-steps sticker 242.

As shown in FIG. 21A, the size of the number-of-steps sticker 242 is indicated with three steps of sizes, and the size of the number-of-steps sticker 242 in a case where the number of steps of the day that the number-of-steps sticker 242 is pasted is 1 to 999 steps is set as a small size, the size of the number-of-steps sticker 242 in a case of being 1000 to 9999 steps is set as a medium size, and the size of the number-of-steps sticker 242 in a case of being 10000 steps or more is set as a large size. That is, according to the number of steps for one day, one size candidate is determined from the three size candidates. This is an example, and the size of the number-of-steps sticker 242 may be set two steps or four or more steps.

However, even if the number of steps exceeds a threshold value is changed after pasting, that is, even if a range of the number of steps is changed after pasting, the size of the number-of-steps sticker 242 is not changed when displaying the diary screen 200 is displayed. That is, the size of the number-of-steps sticker 242 is determined by the number of steps detected by the time that the number-of-steps sticker 242 is pasted. This is because a change in the size of the number-of-steps sticker 242 that has been pasted once may give a sense of incongruity to the player. This is the same also about the color of the number-of-steps sticker 242 described later.

That is, by maintaining a figure already displayed, the same figure can be seen every time to be checked. Therefore, whenever it is checked, it is possible to see the activity amount (in this embodiment, the number of steps) at the time that the figure is firstly displayed.

Alternately, if the number of steps exceeds a threshold value after pasting, that is, if a range of the number of steps is changed after pasting, the number-of-steps sticker 242 may be changed in size when displaying the diary screen 200 is displayed.

As shown in FIG. 21B, the number-of-steps sticker 242 is expressed in five colors, and a color is changed in an order. In this embodiment, the color is changed
in an order of blue, yellow, green, red and purple for each time that the accumulative number of steps of the current month exceeds 30000 steps. That is, according to the accumulative number of steps for one month, one color candidate is determined from five color candidates. However, this is an example, and the color of the number-of-steps sticker 242 may be set by two to four colors or by six or more colors. In this embodiment, the color that is applied according to the accumulative number of steps is a color of an image of the both feet, and has nothing to do with a color applied to the display frame for displaying the number of steps. The color applied to the display frame for displaying the number of steps may be changed similarly. Moreover, the color is returned to the blue that is the first color after the purple that is fifth color. That is, the colors are looped, with the order returning to the first color after the last color. Therefore, it is possible to express the degree of the accumulative number of steps with no upper limit with a limited expression method like five colors. Moreover, the accumulative number of steps is never reduced, even if the colors are looped, it is possible to understand that the accumulative number of steps of the current month is changed from the time that the number-of-steps sticker 242 is pasted on the former date. Therefore, there is no problem such as confusion in knowing that the accumulative number of steps of the current month exceeds the threshold value due to the number of steps of today.

However, even if the accumulative number of steps of the current month exceeds the threshold value after pasting, that is, even if the accumulative number of steps of the current month exceeds N times (N is an integer, one (1) or more) of 30000 steps after pasting, the color of the number-of-steps sticker 242 is not changed in displaying the diary screen 200. That is, the color of the number-of-steps sticker 242 is determined according to the accumulative number of steps detected by the time that the number-of-steps sticker 242 is pasted.

Alternately, if the accumulative number of steps exceeds the threshold value of the current month after pasting the number-of-steps sticker 242, that is, if the accumulative number of steps of the current month exceeds the N times of 3000 steps, the number-of-steps sticker 242 may be changed into a color corresponding to the accumulative number of steps of the current month in displaying the diary screen 200.

In addition, in FIG. 21B, the differences in a color are expressed by applying a black color, a white color, a slant-line pattern, a horizontal line pattern and a gray color to the image of a foot. This is the same also for the diary screen 200 shown in each of FIG. 19 and FIG. 20.

Moreover, since the size of the above-described number-of-steps sticker 242 is determined by the number of steps for one day, even if the number of steps exceeds a larger threshold value than 10000 steps, the size is made not to be looped the large size to the small size. This is because it is not known whether the number of steps on the day that the number-of-steps sticker 242 is pasted is large or small.

Thus, by pasting the number-of-steps stickers 242 of different sizes and colors, it is possible to intuitively know the number of steps for one day and the accumulative number of steps for one month. Moreover, as described above, since the number of steps for one day is indicated in the display frame in the number-of-steps sticker 242, it is possible to know the number of steps correctly numerically aside from the size of the number-of-steps sticker 242, that is, aside from the graphical feature.

Moreover, in this embodiment, the size of the image of the feet included in the number-of-steps sticker 242 according to the number of steps for one day is made to be set and the color of the image of the feet included in the number-of-steps sticker 242 according to the accumulative number of steps for one month is made to be set; however, this is an example and should not be limited. The color of the image of the feet included in the number-of-steps sticker 242 according to the number of steps for one day may be made to be set, and the size of the image of the feet included in the number-of-steps sticker 242 according to the accumulative number of steps for one month may be made to be set. Moreover, although the number of steps for one day and the accumulative number of steps for one month are expressed using the feature related to the figure (referred to as "graphical feature") such as a color and a size of the image of the feet included in the number-of-steps sticker 242, as other graphical features, patterns and/or shapes can be used. However, the graphical feature of the number-of-steps sticker 242 set according to the number of steps for one day (corresponding to a first graphical feature) and the graphical feature of the number-of-steps sticker 242 set according to the accumulative number of steps for one month (corresponding to a second graphical feature) are different from each other.

Moreover, the figure of the footprint included in the number-of-steps sticker 242 is an example, and an image of other figures, i.e., other shapes may be sufficient. For example, it may be a figure imitating a person wearing a hat and shoes while walking. In such a case, a size of the hat may be set according to the number of steps for one day, and a color of the shoes may be set according to the accumulative number of steps for one month. However, a color of the hat may be set according to the number of steps for one day, and a size of the shoes may be set according to the accumulative number of steps for one month. Moreover, the graphical feature may be patterns and/or shapes. That is, one of two graphical features included in the number-of-steps sticker 242 may be set by the number of steps for one day, and the other may be set by the accumulative number of steps for one month.

Figure 22:
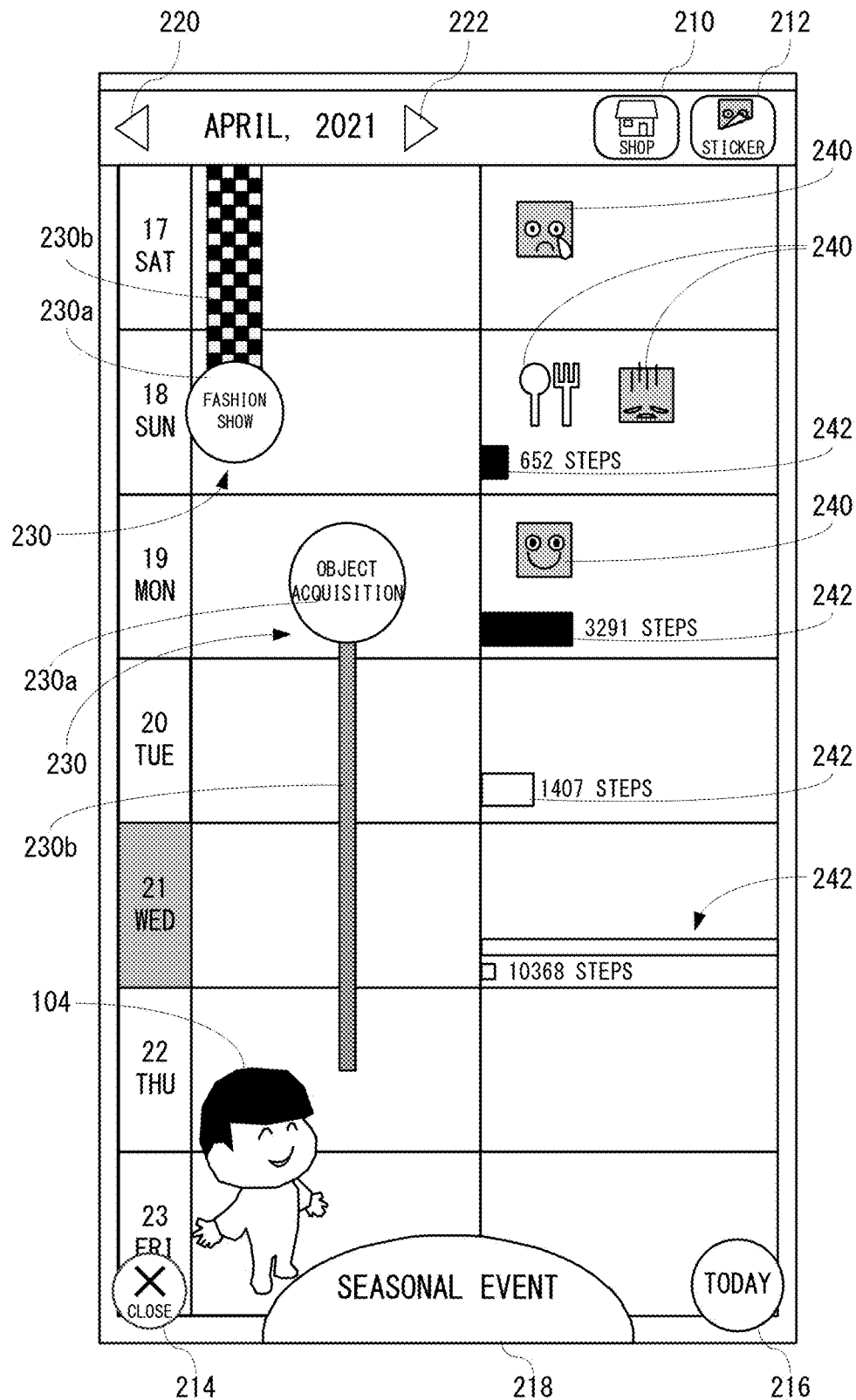
FIG. 22 is a view showing a twelfth non-limiting example diary screen displayed on the display shown in FIG. 2.

Moreover, instead of the number-of-steps sticker 242, an image such as a bar graph may be displayed. FIG. 22 is a view showing another non-limiting example diary screen 200. In FIG. 22, instead of the number-of-steps sticker 242, a horizontally long bar-shaped (or strip-shaped) image is displayed. Moreover, the number of steps for one day is displayed beside (in FIG. 22, right side) the bar-shaped image. However, the number of steps may be displayed above or below the bar-shaped image, or superposed on the bar-shaped image. A length of the bar-shaped image is set according to the number of steps for one day. That is, a size of the bar-shaped image is set according to the number of steps for one day. As an example, a length corresponding to a width of the display area 208 (FIG. 5) is a maximum length of the bar-shaped image, and the number of steps at the maximum length is 10000 steps. Therefore, the length of the bar-shaped image corresponding to the number of steps for one day is determined by multiplying the maximum length by the ratio of the number of steps for one day to 10000 steps.

However, if the number of steps for one day exceeds 10000 steps, for example, for the number of steps exceeding 10000 steps, another bar-shaped image may be displayed side by side on the lower side. That is, for each time of exceeding 10000 steps, a bar-shaped image may be added. In this case, only the bar-shaped image is divided and displayed, and the size of the bar-shaped image is set according to the number of steps. In addition, in adding the bar-shaped image, the width of the bar-shaped image should be narrowed.

Moreover, similar to a case of the number-of-steps sticker 242, the length of the bar-shaped image may be set with three steps and displayed with the length according to the number of steps for one day.

Moreover, a color of the bar-shaped image is set in five steps, and the color is set according to the accumulative number of steps for one month. Thus, even if the bar-shaped image having different lengths and colors is pasted instead of the number-of-steps sticker 242, it is possible to know intuitively the number of steps for one day and the accumulative number of steps for one month. However, the length of the bar-shaped image may be set in four or more steps. As to a modification of the graphical feature on the bar-shaped image, the above-described contents are employable.

Furthermore, although the number of steps is acquired as an example of the activity amount of activity performed by the player and the number-of-steps sticker 242 is pasted in this embodiment, instead of the number of steps of the walking by the player that is the activity that is a part of lifestyle, stickers indicating other activity amounts, such as walking distance, walking time and calories consumed by various activities during a day may be pasted. Since the walking distance and the walking time are also measured in the application program of health care administration, it is possible to acquire the walking distance and the walking time. Moreover, as other activity amounts, the number of times of a push-up or the number of times of a squat corresponds.

Figure 23:
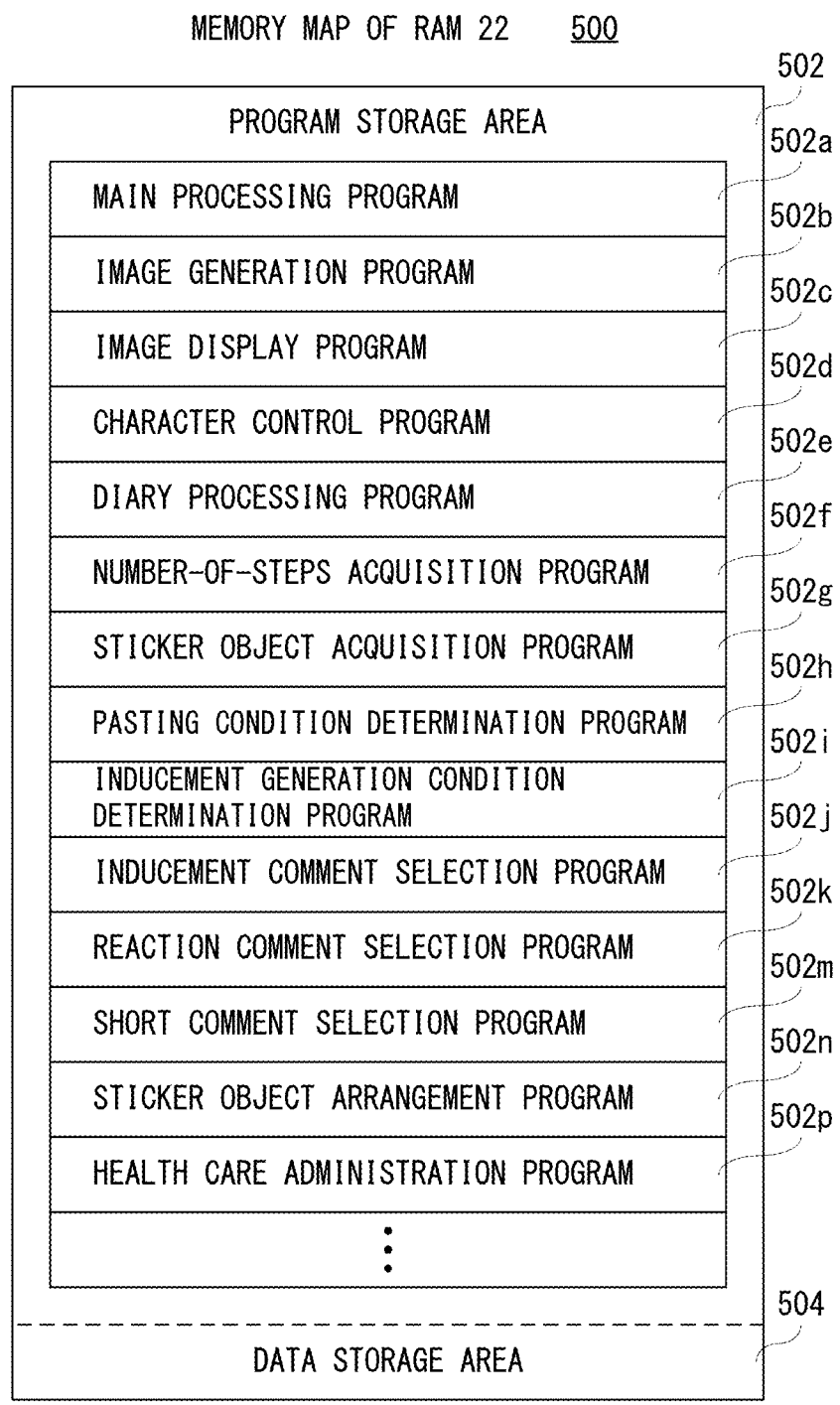
FIG. 23 is a view showing a non-limiting example memory map of a RAM shown in FIG. 2.

FIG. 23 is an illustration view showing a non-limiting example memory map 500 of the RAM 22 of the game apparatus 16 shown in FIG. 2. As shown in FIG. 23, the RAM 22 includes a program storage area 502 and a data storage area 504. The program storage area 502 is stored with an information processing program such as an application program of a virtual game of this embodiment, and the information processing program includes a main processing program 502a, an image generation program 502b, an image display program 502c, a character control program 502d, a diary processing program 502e, a number-of-steps acquisition program 502f, a sticker object acquisition program 502g, a pasting condition determination program 502h, an inducement generation condition determination program 502i, an inducement comment selection program 502j, a reaction comment selection program 502k, a short comment selection program 502m, a sticker object arrangement program 502n, a health care administration program 502p, etc.

The main processing program 502a is a program for executing processing of a main routine (overall game processing) of the game application according to this embodiment. The image generation program 502b is a program for generating, using image generation data 504b and referring to player data 504c as needed, data of a three-dimensional game image (the above-described screen 100, etc.) and a two-dimensional game image (above-described screens 200, 300, 400, etc.) (hereinafter, referred to as "game image data"). The image display program 502c is a program for outputting the game image data generated according to the image generation program 502b to the display 40. Therefore, the three-dimensional game image or the two-dimensional game image corresponding to the game image data is displayed on the display 40.

The character control program 502d is a program for controlling an action or motion of the PC 102 according to an operation of the player, and for controlling an action or motion of the NPC not according to an operation of the player. The diary processing program 502e is a program for performing processing in the diary function. The number-of-steps acquisition program 502f is a program for acquiring the number of steps counted by a health care administration program 502p described later.

The sticker object acquisition program 502g is a program for acquiring a sticker by receiving a sticker that is distributed from the server 12 or given by the NPC by in the main game, or by buying a sticker sold at the virtual shop.

The pasting condition determination program 502h is a program for determining whether a condition(s) for pasting the number-of-steps sticker 242 are satisfied. The inducement generation condition determination program 502i is a program for determining a condition(s) for generating the inducement or continuous inducement by the NPC are satisfied.

The inducement comment selection program 502j is a program for selecting an inducement comment to be emitted by the NPC from the inducement comment table. The reaction comment selection program 502k is a program for selecting a reaction comment to be emitted by the NPC from the reaction comment table. The short comment selection program 502m is a program for selecting a short comment to be emitted by the NPC from the short comment table.

The sticker object arrangement program 502n is a program for arranging a sticker in response to a pasting operation of the player or automatically to an area provided in the virtual space. The health care administration program 502p is a program of a health care administration provided as an application program of a smart phone, and is an application program such as a health care or Google Fit (registered trademark) as an example. The health care administration program 502p counts the number of steps based on an output of the acceleration sensor 38. However, the health care administration program 502p can also measure a time period counting the number of steps as a walking time, other than the number of steps. Moreover, when the game apparatus 16 is provided with the global positioning system (GPS), a distance that the game apparatus 16 is moved during a time period counting the number of steps can be measured as the walking distance.

Although illustration is omitted, the program storage area 502 is stored with other programs such as a communication program for performing communication with the server 12 and the further game apparatuses, a program for saving (storing) the player data 504c (game data) in the flash memory 24, a sound output program for generating and outputting a sound required for the game, a shop processing program, a possession sticker viewing processing program, an item appearance or arrangement program, etc.

Figure 24:
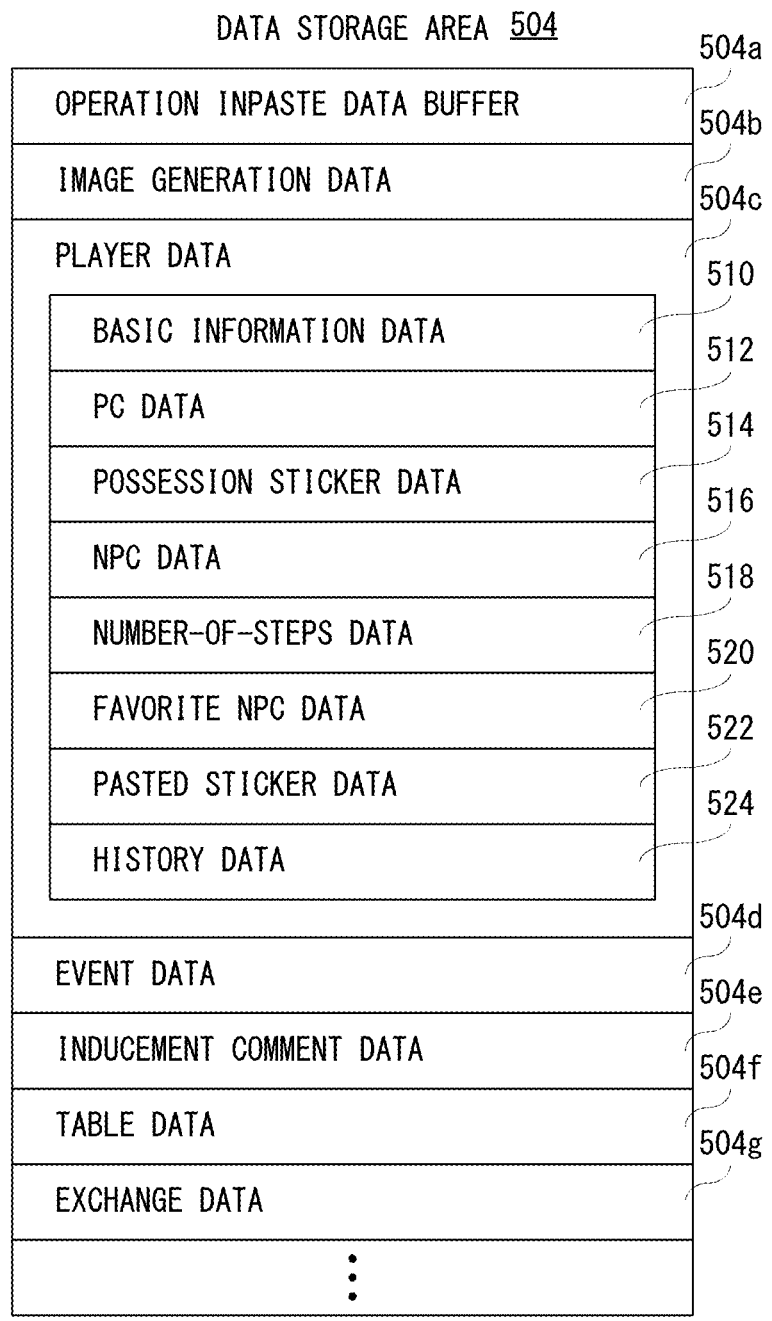
FIG. 24 is a view showing non-limiting example contents of a data storage area of the RAM shown in FIG. 23.

FIG. 24 is an illustration view showing non-limiting example specific contents of the data storage area 504 shown in FIG. 23. As shown in FIG. 24, an operation input data buffer 504a is provided in the data storage area 504. Moreover, the data storage area 504 is stored with data such as the image generation data 504b, player data 504c, event data 504d, inducement comment data 504e, table data 504f, exchange data 504g, etc.

The operation input data buffer 504a is an area for temporarily storing operation data from the input device 50. When received by the CPU 20, the operation data is stored in the operation input data buffer 504a according to a time series, and if the operation data is used for the processing of the CPU 20, it will be deleted.

The image generation data 504b includes data for generating the game image data, such as polygon data, texture data, two-dimensional image data, etc. However, the two-dimensional image data is image data such as images of buttons, sticker images, text images, etc. used in generating two-dimensional game image data.

The player data 504c is data (game data) on the player of the virtual game of this embodiment, and includes basic information data 510, PC data 512, possession sticker data 514, NPC data 516, number-of-steps data 518, favorite NPC data 520, pasted sticker data 522 and history data 524.

The basic information data 510 is data on basic information of the player. The basic information of the player is a player name, a birthday, sex, etc. The PC data 512 includes an appearance including clothes of the PC 102 used by the player, coordinate data of the current position of the PC 102 in the virtual space, and data of a level in the virtual game of the PC 102 (or player). The possession sticker data 514 is data on types and the number of items including stickers that the PC 102 (or player) possesses.

Figure 25:
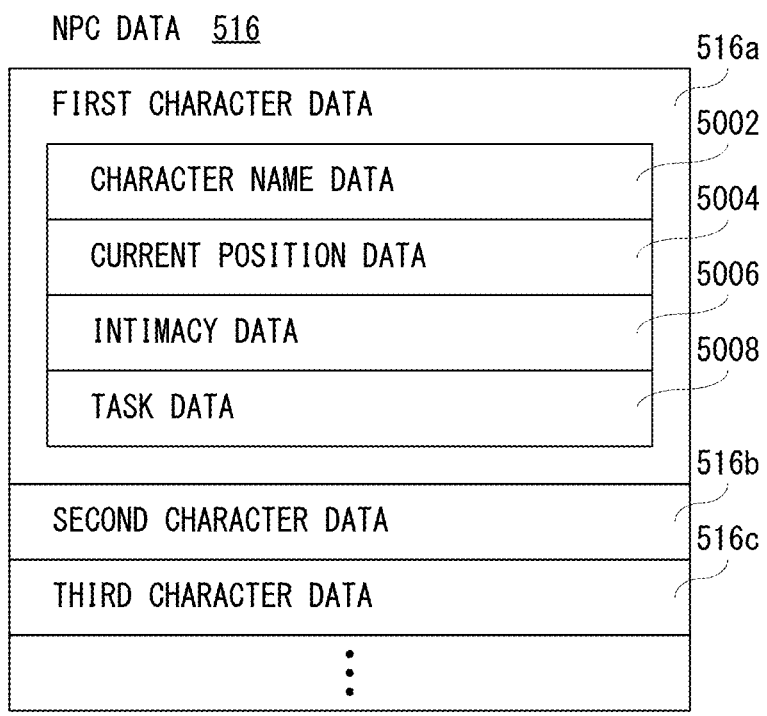
FIG. 25 is a view showing non-limiting example contents of NPC data shown in FIG. 24.

The NPC data 516 is data on an NPC that may issue a task to the PC 102, that is, an NPC appearing in the virtual space. As shown in FIG. 25, the NPC data 516 includes data on each NPC (here, a first character, a second character, a third character,—). That is, the NPC data 516 includes first character data 516*a*, second character data 516*b*, third character data 516*c*,—.

The first character data 516*a* includes character name data 5002, current position data 5004, intimacy degree data 5006 and task data 5008. The character name data 5002 is data of a name of the NPC corresponding to the first character data 516*a*. The current position data 5004 is current position coordinate data of the NPC corresponding to the first character data 516*a* in the virtual space. However, when an NPC is not arranged in the virtual space, the current position data 5004 is not stored, or data (for example, null data) indicating that an NPC is not arranged in the virtual space is stored. The intimacy degree data 5006 is numeral data indicating the intimacy degree between the PC 102 and the NPC corresponding to the first character data 516*a*. The task data 5008 is data on the identification information of a task solved by the PC 102 and the identification information of the task currently assigned to the NPC corresponding to the first character data 516*a* out of tasks issued to the PC 102 by the NPC corresponding to the first character data 516*a*. However, when a task is not assigned currently, assigned identification information is not included.

Although illustration is omitted, the second character data 516*b*, the third character data 516*c*,—are the same as the first character data 516*a*.

Returning to FIG. 24, the number-of-steps data 518 is data including the numbers of steps of yesterday and today counted by the health care administration program 502*p* and the accumulative number of steps of the current month by yesterday and the accumulative number of steps of the current month by today, and is acquired when performing the diary function.

The favorite NPC data 520 is data of the identification information (name of NPC, etc.) of the NPC that the player registers as a favorite NPC.

The pasted sticker data 522 is data including types and pasted positions of the normal sticker 240, the number-of-steps sticker 242, the decoration sticker 244, the special sticker, and sticker of a figure of the PC 102 that are pasted on the display area 208 of the diary screen 200. However, the data of the number-of-steps sticker 242 includes the data of the size, the color and the number of steps of the number-of-steps sticker 242. The history data 524 is data on the exchange between the player and the NPC corresponding to the sticker pasted in the diary screen 200 and the date that the sticker is pasted, and is stored identifiably for each sticker pasted on the diary screen 200.

The event data 504*d* is data on the identification information of an event generated in the main game, and generated according to the progress of the main game at the time of the start of the game application or generated according to a notice from the server 12.

The inducement comment data 504*e* is data of the inducement comment being held. The table data 504*f* is data for each of the inducement comment table, the reaction table and the short comment table.

The exchange data 504*g* is data on the exchange currently performed between the player and the NPC, and includes the inducement comment and the reaction comment that are emitted by the NPC and data that the stickers that the player pasted are arranged in the time series. However, an inducement comment may not be included.

Although illustration is omitted, the data storage area is stored with other data, and is provided with a flag(s) and counter(s) (timer(s)) necessary for overall game processing (information processing).

FIG. 26-FIG. 37 are flowcharts showing non-limiting example overall game processing of the CPU 20 shown in FIG. 2. For example, this overall game processing is started according to an instruction by the player to execute a program of a game application that is an example of information processing. Moreover, although illustration is omitted, processing of detecting an operation input by the player is performed in parallel with the overall game processing, and if the operation input of the player is detected, corresponding operation data is stored in the data storage area 504. However, the operation data is eliminated after being used for processing of the CPU 20.

Although the overall game processing will be described in the following, a duplicate description for the same processing is omitted.

Figure 26:
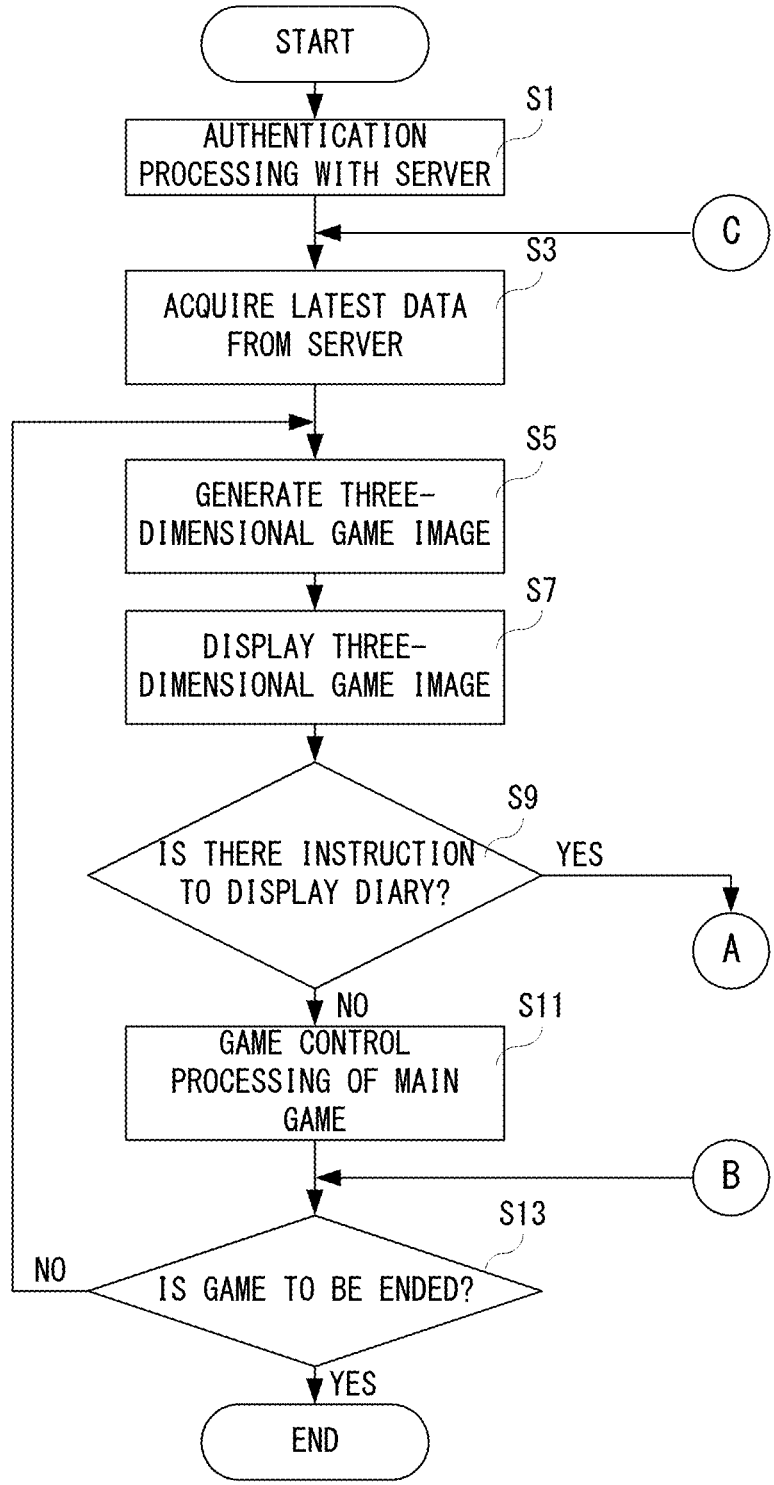
FIG. 26 is a flowchart showing a first part of non-limiting example overall game processing of a CPU incorporated within the game apparatus shown in FIG. 2.

As shown in FIG. 26, if the overall game processing is started, the CPU 20 executes, in a step S1, authentication processing with the servers 12. Here, the CPU 20 is communicably connected to the server 12 via the network 14 using the first communication module 26, and the CPU 20 transmits information of the game apparatus 16 or player and the player data 504*c* to the server 12.

When receiving the information of the game apparatus 16 or player and the player data 504*c*, the server 12 reads the player data that the server 12 manages corresponding to the information of the game apparatus 16 or the player, and confirms whether the received player data 504*c* corresponds to the read player data.

When the received player data 504*c* and the read player data correspond to each other, the authentication is successful, and this is transmitted to the game apparatus 16, whereby the game is continued. On the other hand, when the received player data 504*c* and the read player data do not correspond to each other, there is a possibility that the player data 504*c* (game data) is altered, and therefore, the authentication is not successful, and this is transmitted to the game apparatus 16. Although illustration is omitted, when the authentication is not successful, the overall game processing is forcibly terminated.

In a next step S3, the latest data is acquired from the server 12. The latest data includes data of a new item(s), data of an update program of the game program, etc. However, when there is no latest data, no data is acquired by game apparatus 16 (or CPU 20).

In a subsequent step S5, a three-dimensional game image is generated. However, the game image is an image that the PC 102, the NPC(s) and the background object 106 of the place where the PC 102 currently exists are drawn three-dimensionally in the three-dimensional virtual space. In a next step S7, the three-dimensional game image is displayed. Therefore, the game screen 100 as shown in FIG. 3 is displayed on the display 40.

In a next step S9, it is determined whether there is any display instruction of a diary. The CPU 20 determines, based on the operation input data stored in the operation input data buffer 504*a* of the data storage area 504, whether the button 110 of the game screen 100 shown in FIG. 3 is tapped. Hereinafter, this is the same when determining whether various buttons and objects are tapped.

Figure 27:
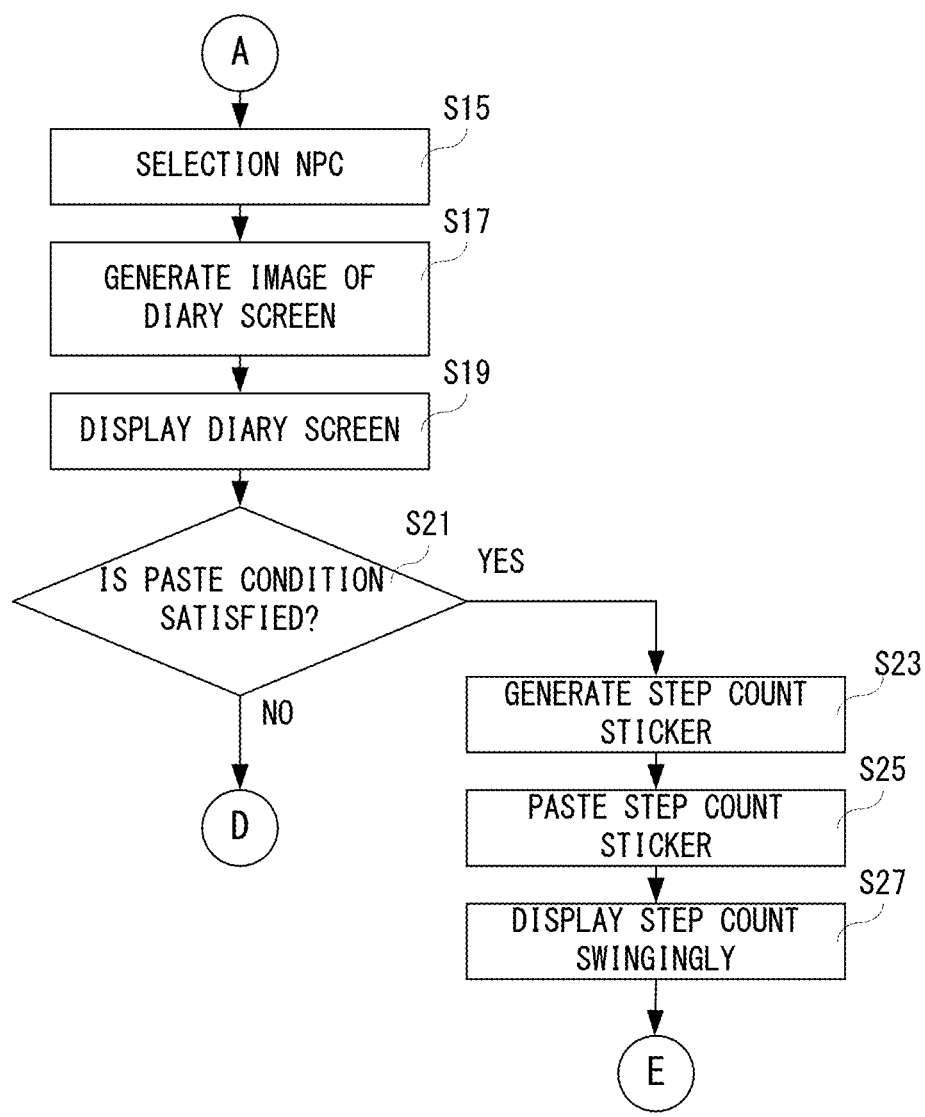
FIG. 27 is a flowchart showing a second part of the non-limiting example overall game processing of the CPU incorporated within the game apparatus shown in FIG. 2, following FIG. 26.

If "YES" is determined in the step S9, that is, if there is the display instruction of a diary, the process proceeds to a step S15 of FIG. 27. On the other hand, if "NO" is determined in the step S9, that is, if there is no display instruction of a diary, game control processing of the main game as described above is performed in a step S11, and then, the process proceeds to a step S13. A description of details of the game control processing of the main game is omitted.

In a step S13, it is determined whether it is an end of the game. Here, the CPU 20 determines whether an end of the game is instructed by the player. If "NO" is determined in the step S13, that is, if it is not an end of the game, the process returns to the step S5. On the other hand, if "YES" is determined in the step S13, that is, if it is an end of the game, the overall game processing is ended.

In a step S15 shown in FIG. 27, one NPC to be displayed in the diary screen 200 is selected out of a plurality of NPCs appearing in the main game. However, when the player has registered favorite NPC, this NPC is selected. As for the favorite NPC, it is possible to know by referring to the favorite NPC data 520 included in the player data 504c.

In a subsequent step S17, an image of a diary screen 200 is generated, and the diary screen 200 is displayed on the display 40 in a step S19. The diary screen 200 is displayed instead of the game screen 100. However, the diary screen 200 may be displayed in front of the game screen 100. When displaying the diary screen 200, the CPU 20 arranges an event image 230 in a virtual area corresponding to the display area 206 by referring to the event data 504d and the pasted ticker data 522, and arranges one or more stickers pasted in the past in a virtual area corresponding to the display area 208. Moreover, when displaying the diary screen 200, the CPU 20 acquires time information from the RTC 36, and determines a displaying position so that the date of today is displayed in a third area from the bottom when segmenting the display areas 204-208 day by day.

Subsequently, in a step S21, it is determined whether a pasting condition is satisfied. Although illustration is omitted, after the display instruction of a diary is input until processing of the step S21 is executed, the numbers of steps of yesterday and today counted by the health care administration program 502p and the accumulative number of steps by yesterday of the current month and the accumulative number of steps by today of the current month are acquired.

If "YES" is determined in the step S21, that is, if the pasting condition is satisfied, a number-of-steps sticker 242 is generated in a step S23. Here, the CPU 20 generates a number-of-steps sticker 242 that the number of steps is indicated in the display frame with a size according to the number of steps while being applied with a color according to the accumulative number of steps of the current month. However, the CPU 20 generates the number-of-steps stickers 242 of yesterday and/or today. The number-of-steps sticker 242 of yesterday can be generated when the number-of-steps sticker 242 of yesterday is not pasted in the sticker frame 1026 and the number-of-steps sticker 242 of yesterday satisfies the pasting condition. Similarly, the number-of-steps sticker 242 of today can be generated when the number-of-steps sticker 242 of today is not pasted in the sticker frame 1026 and the number of steps of today satisfies the pasting condition.

In a next step S25, the number-of-steps sticker 242 generated in the step S23 is pasted in the number-of-steps sticker frame 1026. However, the number-of-steps sticker 242 of yesterday is pasted in the number-of-steps sticker frame 1026 of yesterday, and the number-of-steps sticker 242 of today is pasted in the number-of-steps sticker frame 1026 of today. If the number-of-steps sticker 242 is pasted, data of a type, a pasted position, a size, a color and the number of steps of the number-of-steps sticker 242 is stored (or added) as the pasted sticker data 522. Then, the pasted sticker 242 is swingably displayed in a step S27, and then, the process proceeds to a step S191 shown in FIG. 36.

Figure 28:
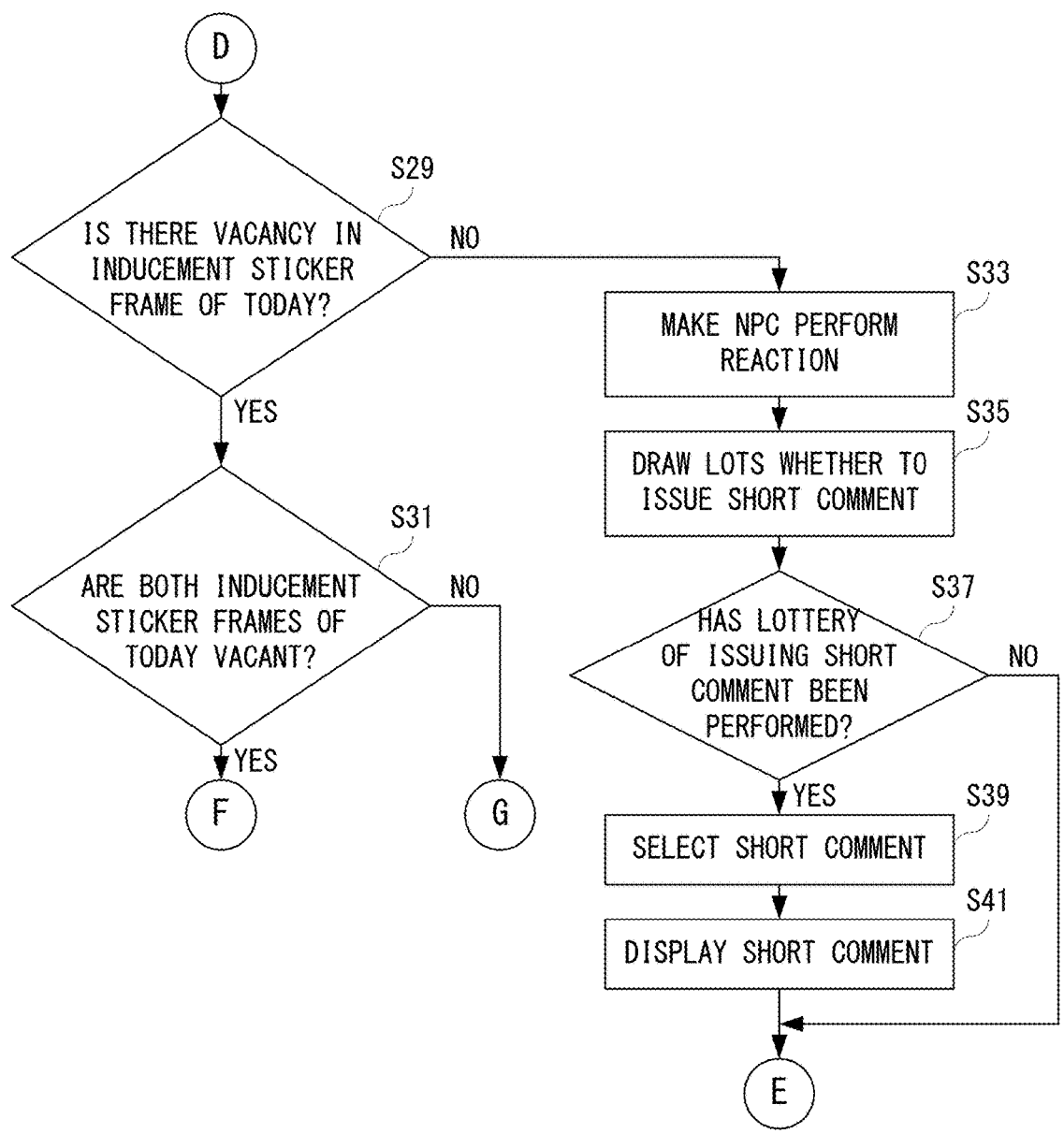
FIG. 28 is a flowchart showing a third part of the non-limiting example overall game processing of the CPU incorporated within the game apparatus shown in FIG. 2, following FIG. 27.

On the other hand, if "NO" is determined in the step S21, that is, if the pasting condition is not satisfied, it is determined, in a step S29 shown in FIG. 28, whether there is a vacancy in the inducement sticker frame 1020 and/or 1022. The CPU 20 determines whether at least one of the inducement sticker frame 1020 and the inducement sticker frame 1022 is vacant with reference to the pasted sticker data 522 included in the player data 504c.

Although illustration is omitted, if "NO" is determined in the step S21, the CPU 20 updates, when the number-of-steps sticker 242 is pasted on the number-of-steps sticker frame 1026 of today, the number of steps displayed in the display frame of this number-of-steps sticker 242. At this time, the CPU 20 also updates the data of the number of steps for an applicable number-of-steps sticker 242 in the pasted sticker data 522.

If "YES" is determined in the step S29, that is, if there is a vacancy in the inducement sticker frame 1020 and/or the inducement sticker frame 1022 of today, it is determined, in a step S31, whether both of the inducement sticker frames 1020 and 1022 of today are vacant.

Figure 29:
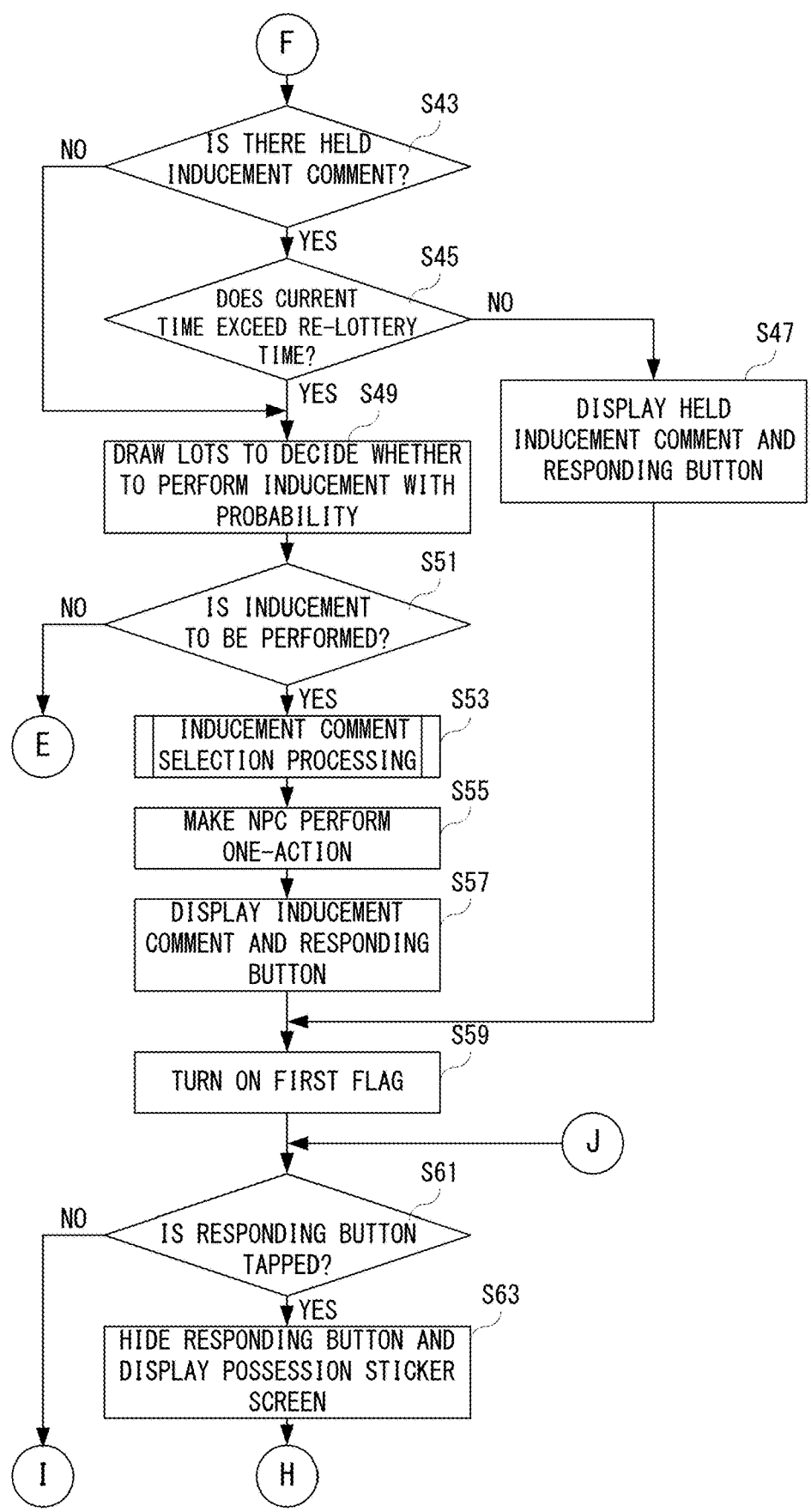
FIG. 29 is a flowchart showing a fourth part of the non-limiting example overall game processing of the CPU incorporated within the game apparatus shown in FIG. 2, following FIG. 28.

If "YES" is determined in the step S31, that is, if both of the inducement sticker frames 1020 and 1022 of today are vacant, the process proceeds to a step S43 shown in FIG. 29. On the other hand, if "NO" is determined in the step S31, that is, if either of the inducement sticker frames 1020 and 1022 of today is vacant, the process proceeds to a step S131 shown in FIG. 33.

Moreover, if "NO" is determined in the step S29, that is, if both of the inducement sticker frames 1020 and 1022 of today are not vacant, the CPU 20 makes the NPC perform the one-action in a step S33, and in a step S35, it is drawn lots on whether the short comment is to be emitted. As described above, in this embodiment, the lottery is drawn with a probability of 50%.

In a next step S37, it is determined whether it has been drawn lots on whether the short comment is to be emitted. If "NO" is determined in the step S37, that is, if it has not been drawn lots on that the short comment is to be emitted, the process proceeds to the S191. On the other hand, if "YES" is determined in the step S37, that is, if it has been drawn lots on that the short comment is to be emitted, in a step S39, one short comment is drawn lots with a probability in the short comment table shown in FIG. 17. Then, a short comment that is drawn is displayed in a step S41, and the process proceeds to the step S191.

As described above, if both of the inducement sticker frames 1020 and 1022 of today are vacant, it is determined, in the step S43 shown in FIG. 29, whether there is any inducement comment being held. Here, the CPU 20 determines whether the inducement comment data 504c is stored in the data storage area 504.

If "NO" is determined in the step S43, that is, if there is no inducement comment being held, the process proceeds to a step S49. On the other hand, if "YES" is determined in the step S43, that is, if there is an inducement comment being held, it is determined, in a step S45, whether the current time is crossing the re-lottery time. Here, the CPU 20 determines whether the re-lottery time (in this embodiment, 5:00 am) is between the time that the inducement comment is stored and the current time.

If "NO" is determined in the step S45, that is, if the current time is not crossing the re-lottery time, in a step S47, the inducement comment being held and the responding button are displayed. That is, as shown in FIG. 7, the display frame 250 and the button 252 are displayed in the diary screen 200. However, a name of the NPC is displayed in the display frame 250a provided in the upper left portion of the display frame 250, and the inducement comment being held is indicated in the display frame 250. Moreover, the stickers that the player possesses out of the stickers having the same attribute as the inducement comment are displayed on the both ends of the button 252. However, if not possessing two or more stickers having the same attribute as the inducement comment, a sticker that the player possesses and has another attribute is displayed. Moreover, if the possession number of the stickers that the player possesses is less than two (2), a sticker (in this embodiment, a sticker of today) that can be bought in the virtual shop may be displayed.

In addition, as described above, when the player possess no sticker, no sticker is displayed on the both ends of the button 252.

Moreover, at this time, the data of the inducement comment or its identification information is stored as the exchange data 504g. In the following, the same applies to a case of displaying the inducement comment and the responding button.

On the other hand, if "YES" is determined in the step S45, that is, if the current time is crossing the re-lottery time, it is drawn lots on whether the inducement is to be performed with by a probability in the step S49. In a next step S51, it is drawn by lottery whether the inducement is to be performed. If "NO" is determined in the step S51, that is, if the inducement is not to be performed, the process proceeds to the step S191. On the other hand, if "YES" is determined in the step S51, that is, if the inducement is to be performed, inducement comment selection processing (see FIG. 42) described later is performed in a step S53, and the NPC is made to perform the one-action in a step S55, and then, in a step S57, the inducement comment and the responding button are displayed.

As described above, if both of the inducement sticker frames 1020 and 1022 of today are vacant, in the step S49, it is drawn lots to perform the inducement with a probability of 100%. Therefore, "YES" is determined in the step S51. Accordingly, it may be possible to omit the step S49 and the step S51.

Subsequently, a first flag is turned on in a step S59. The first flag is a flag indicating that the first time inducement is performed when both of the inducement sticker frames 1020 and 1022 of today are vacant at the time that the diary function is performed in the game screen 100 and thus the diary screen 200 is opened.

In a next step S61, it is determined whether the responding button, i.e., the button 252 is tapped. If "NO" is determined in the step S61, that is, if the responding button is not tapped, the process proceeds to a step S179. On the other hand, if "YES" is determined in the step S61, that is, if the responding button is tapped, the responding button, i.e., the button 252 and the stickers at both ends thereof are hidden in a step S63, and the possession sticker screen 300 is displayed in front of the diary screen 200, and the process proceeds to a step S65 shown in FIG. 30.

Figure 30:
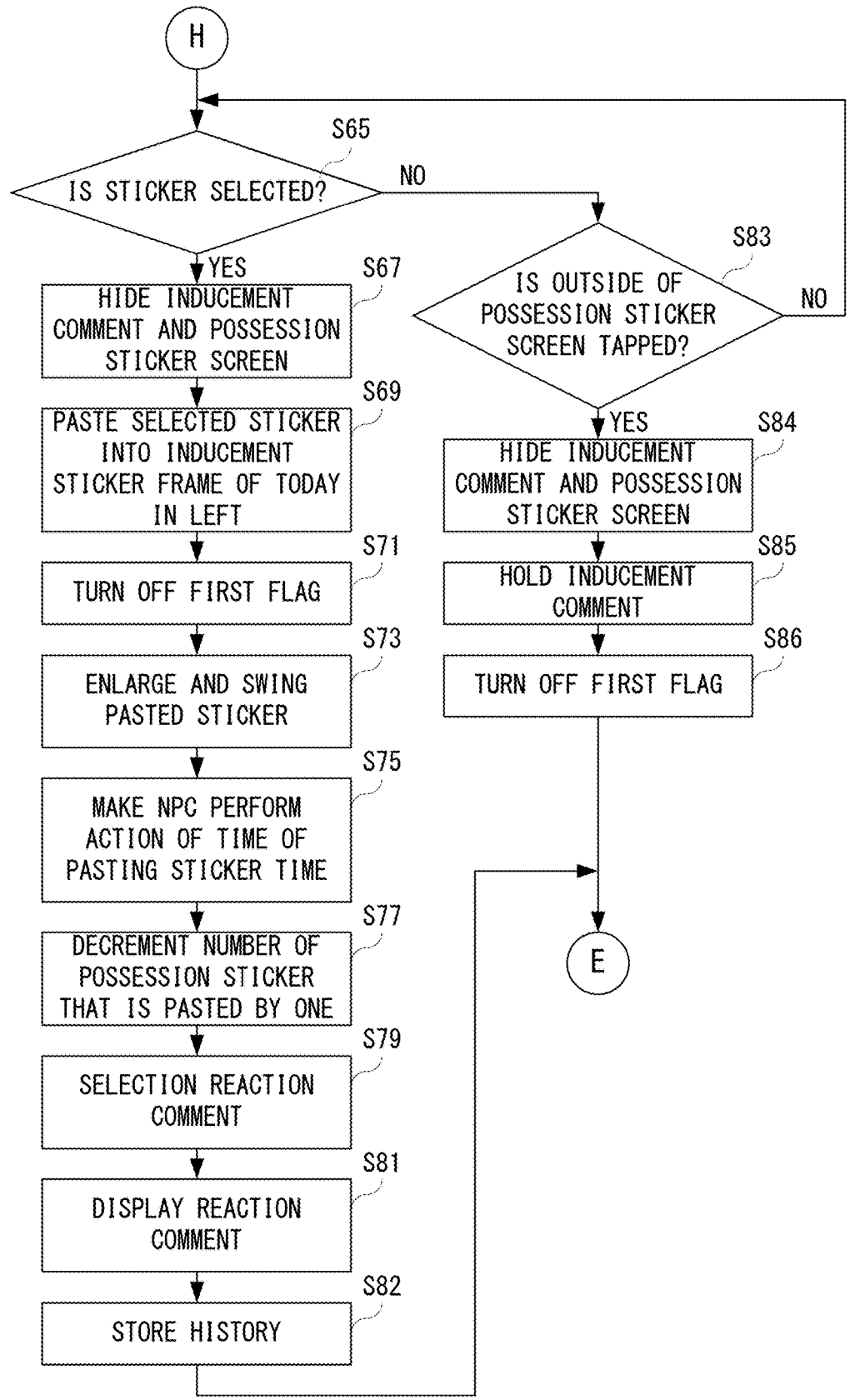
FIG. 30 is a flowchart showing a fifth part of the non-limiting example overall game processing of the CPU incorporated within the game apparatus shown in FIG. 2, following FIG. 29.

In the step S65 shown in FIG. 30, it is determined whether a sticker is selected in in the possession sticker screen 300. If "YES" is determined in the step S65, that is, if a sticker is selected in the possession sticker screen 300, the inducement comment, i.e., display frame 250 and the possession sticker screen 300 are hidden in a step S67, and the selected sticker is pasted in the inducement sticker frame 1020 of today (at the left side) in a step S69, and the first flag is turned off in a step 71.

However, if the sticker is pasted in the step S69, the CPU 20 stores (or adds) the data related to the type and the pasted position of the pasted sticker as the pasted sticker data 522. Moreover, if the sticker is pasted in the step S69, the CPU 20 stores (or adds) the data related to the pasted sticker or its identification information in a time series as the exchange data 504g. These are the same in pasting the sticker.

In a subsequent step S73, the pasted sticker is enlarged and swingably displayed. Moreover, the CPU 20 makes the NPC perform an action at the time of pasting sticker in a step S75. In a next step S77, the possession number of pasted stickers is decremented by one (1).

Subsequently, a reaction comment is selected in a step S79. Here, the CPU 20 selects one reaction comment by drawing lots with a probability from a plurality of reaction comments having the same attribute as the pasted sticker with referring to the reaction comment table as shown in FIG. 13.

Figure 31:
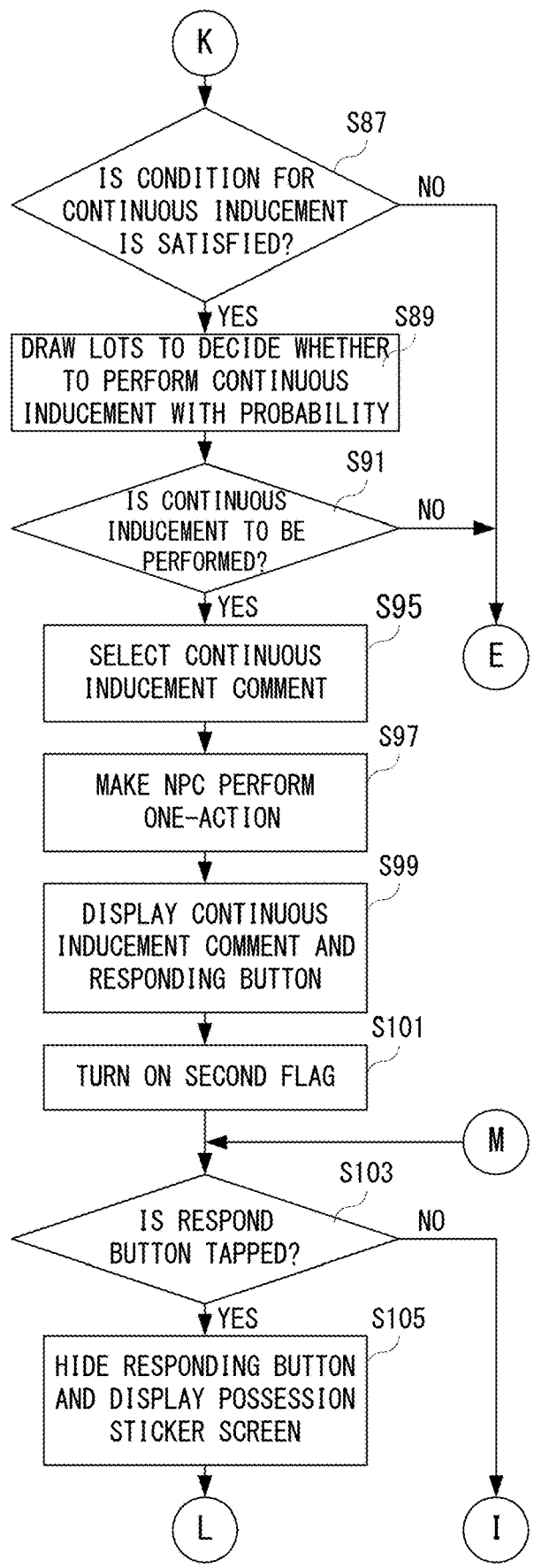
FIG. 31 is a flowchart showing a sixth part of the non-limiting example overall game processing of the CPU incorporated within the game apparatus shown in FIG. 2, following FIG. 30.

Then, the reaction comment selected in the step S79 is displayed in a step S81, and the history is stored in a step S82, and then, the process proceeds to a step S87 shown in FIG. 31. In the step S81, the CPU 20 displays the display frame 250 that the reaction comment as shown in FIG. 12, FIG. 14 and FIG. 15 is indicated, and displays on the lower right portion of the display frame 250 the sticker having the same attribute as the attribute set in the reaction comment. Moreover, in the step S81, the reaction comment or the data of the identification information thereof is stored (or added) as the exchange data 504g. In the following, the same applies to a case of displaying the reaction comment.

Moreover, in a step S82, the CPU 20 adds the data on the information of the NPC that performed the exchange with the player and the date of the exchange to the exchange data 504g so as to store (or add) the history data 524. In the following, the same applies to a case of storing the history.

Moreover, if "NO" is determined in the step S65 described above, that is, if a sticker is not selected, it is determined, in a step S83, whether the outside of the possession sticker screen 300 is tapped. If "NO" is determined in the step S83, that is, if the outside of the possession sticker screen 300 is not tapped, the process returns to the step S65.

In addition, although the process returns to the step S65 when "NO" is determined in the step S83, as described above, if the buying of a sticker is instructed in the possession sticker screen 300, the buying processing of the sticker is performed, and when the buying processing of the sticker is ended, a display is returned to the possession sticker screen 300. This is the same also for a case where "NO" is determined in a step S127, a case where "NO" is determined in a step S173, a case where "NO" is determined in a step S213 and "NO" is determined in a step S283, all described later.

On the other hand, if "YES" is determined in the step S83, that is, if the outside of the possession sticker screen 300 is tapped, the inducement comment and the possession sticker screen 300 are hidden in a step S84, the inducement comment is held in a step S85, and the first flag is turned off in a step S86, and then, the process proceeds to the step S191. In the step S85, the CPU 20 stores the inducement comment data 504e for the inducement comment indicated in the display frame 250 in the data storage area 504. Hereinafter, the same applies to a case of holding the inducement comment.

As described above, if the history is stored in the step S82 shown in FIG. 30, it is determined, in a step S87 shown in FIG. 31, whether the conditions of the continuous inducement are satisfied. If "NO" is determined in the step S87, that is, if the conditions of the continuous inducement are not satisfied, the process proceeds to the step S191. On the other hand, if "YES" is determined in the step S87, that is, if the conditions of the continuous inducement are satisfied, in a step S89, it is drawn lots on whether the continuous inducement is to be performed with a probability.

Subsequently, it is determined, in a step S91, whether a lottery is drawn to perform the continuous inducement. If "NO" is determined in the step S91, that is, if a lottery is not drawn to perform the continuous inducement, the process proceeds to the step S191. On the other hand, if "YES" is determined in the step S91, that is, if a lottery is drawn to perform the continuous inducement, in a step S95, the inducement comment of the continuous inducement is selected. Here, the CPU 20 draws lots with a probability to select one inducement comment from a plurality of inducement comments satisfying the conditions for selection target of the inducement comment of the continuous inducement with referring to the inducement comment table shown in FIG. 8. However, according to the attribute of the sticker pasted in the step S69 to the first time inducement, any one of a plurality of conditions for the selection target with respect to the inducement comment of the continuous inducement is satisfied.

In a next step S97, the CPU 20 makes the NPC perform the one-action, and in a step S99, displays the inducement comment of the continuous inducement and the responding button. Furthermore, a second flag is tuned on in a step S101. The second flag is a flag indicating that the continuous inducement is generated.

Then, it is determined, in a step S103, whether the responding button is tapped. If "NO" is determined in the step S103, the process proceeds to a step S179. On the other hand, if "YES" is determined in the step S103, as shown in FIG. 9, in a step S105, the responding button is hidden and the possession sticker screen 300 is displayed in front of the diary screen 200.

Figure 32:
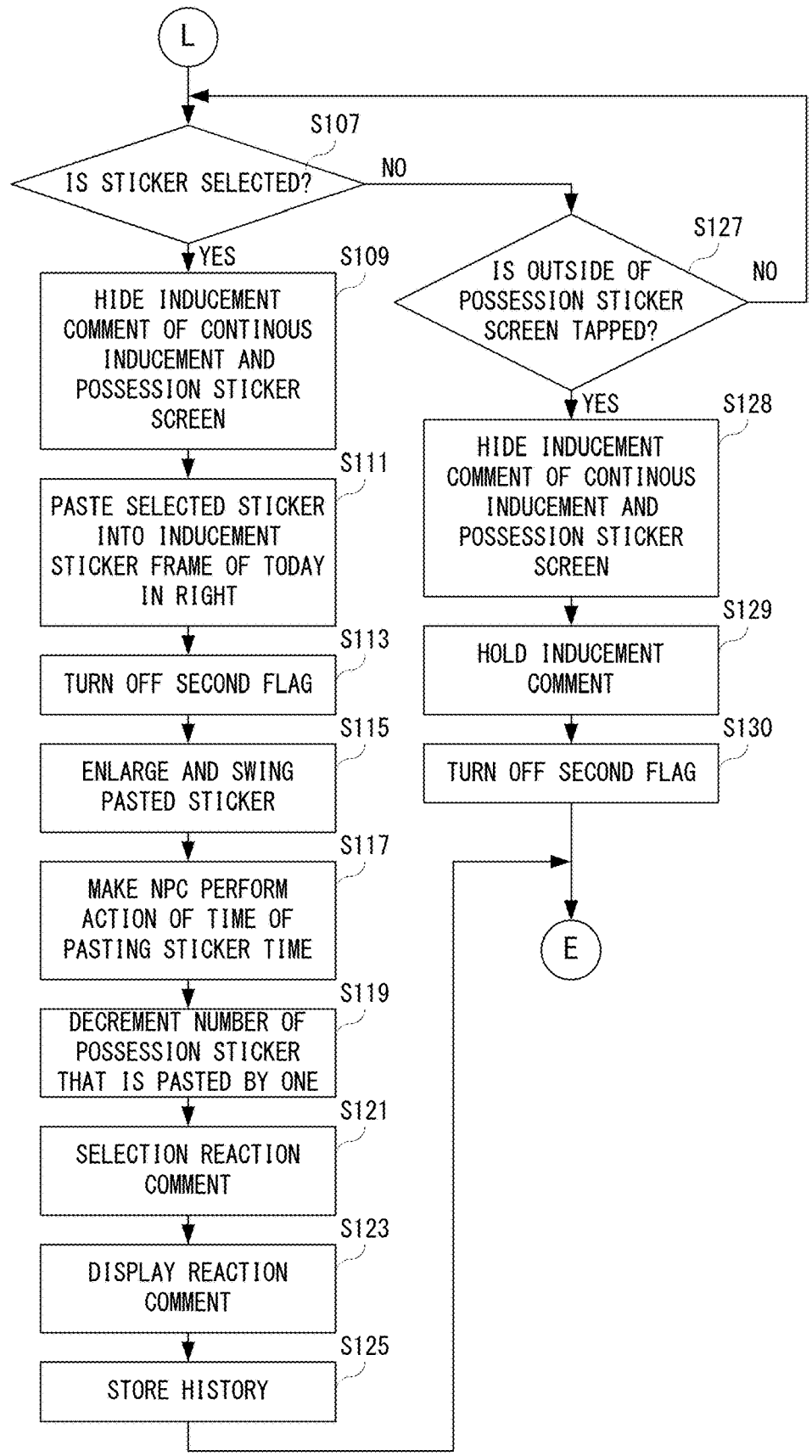
FIG. 32 is a flowchart showing a seventh part of the non-limiting example overall game processing of the CPU incorporated within the game apparatus shown in FIG. 2, following FIG. 31.

Subsequently, it is determined, in a step S107 shown in FIG. 32, whether a sticker is selected in the possession sticker screen 300. If "YES" is determined in the step S107, the inducement comment of the continuous inducement, i.e., the display frame 250 and the possession sticker screen 300 are hidden in a step S109, the selected sticker is pasted in the inducement sticker frame 1022 of today on the right side in a step S111, and the second flag is turned off in a step S113.

In a subsequent step S115, the pasted sticker is enlarged and swingably displayed. Moreover, the CPU 20 makes the NPC perform an action at the time of sticker pasting in a step S117. In a next step S119, the possession number of the pasted sticker is decremented by one (1).

Subsequently, the reaction comment is selected in a step S121, the reaction comment selected in the step S121 is displayed in a step S123, and the history is stored in a step S125, and then, the process proceeds to the step S191.

Moreover, if "NO" is determined in the above-described step S107, it is determined, in a step S127, whether the outside of the possession sticker screen 300 is tapped. If "NO" is determined in the step S127, the process returns to the step S107. On the other hand, if "YES" is determined in the step S127, the inducement comment of the continuous inducement and the possession sticker screen 300 are hidden in a step S128, and the inducement comment is held in a step S129, the second flag is turned off in a step S130, and then, the process proceeds to the step S191.

Figure 33:
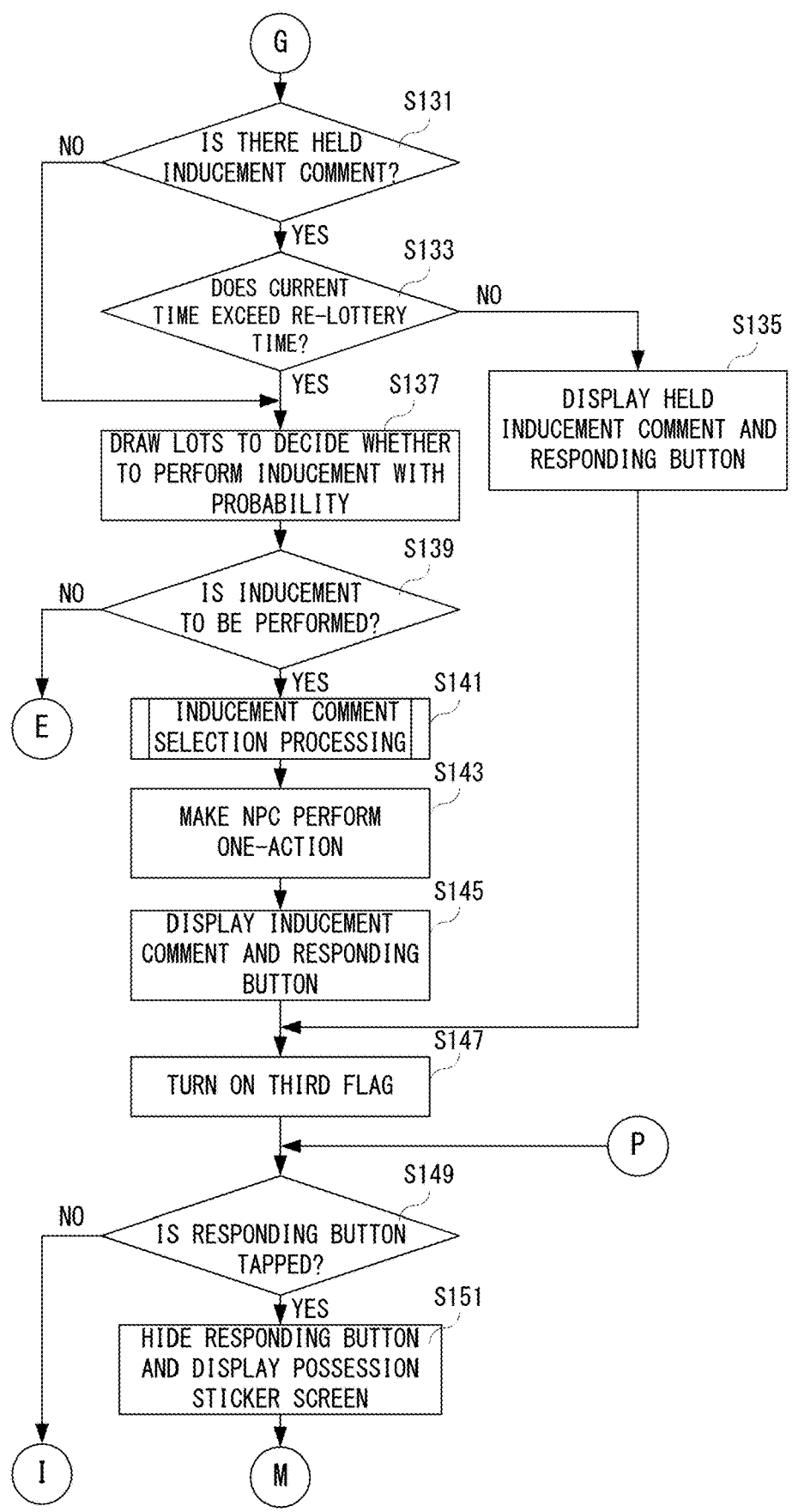
FIG. 33 is a flowchart showing an eighth part of the non-limiting example overall game processing of the CPU incorporated within the game apparatus shown in FIG. 2, following FIG. 28.

As shown in FIG. 28, when one of the inducement sticker frames 1020 and 1022 is vacant, "NO" is determined in the step S31, and it is determined, in a step S131 shown in FIG. 33, whether there is an inducement comment being held. If "NO" is determined in the step S131, the process proceeds to a step S137. On the other hand, if "YES" is determined in the step S131, it is determined, in a step S133, whether the current time is crossing the re-lottery time.

If "NO" is determined in the step S133, in a step S135, the inducement comment being held and the responding button are displayed in the diary screen 200, and the process proceeds to a step S147. On the other hand, if "YES" is determined in the step S133, whether the inducement is to be performed is drawn lots with a probability in a step S137. As described above, if either of the inducement sticker frames 1020 and 1022 of today is vacant, it is drawn lots to perform the inducement with a probability of 20% in the step S137.

In a subsequent step S139, it is determined whether the inducement is to be performed. If "NO" is determined in the step S139, the process proceeds to the step S191. On the other hand, if "YES" is determined in the step S139, inducement comment selection processing described later is performed in a step S141, the NPC is made to perform the one-action in a step S143, and the inducement comment and the responding button are displayed in the diary screen 200 in a step S145.

Subsequently, a third flag is turned on in a step S147. The third flag is a flag indicating that the inducement is performed when either one the inducement sticker frames 1020 and 1022 of today is vacant in a case where the diary screen 200 is opened when the diary function is performed in the game screen 100.

In a next step S149, it is determined whether the responding button, i.e., button 252 is tapped. If "NO" is determined in the step S149, the process proceeds to the step S179. On the other hand, if "YES" is determined in the step S149, in a step S151, the responding button is hidden and the possession sticker screen 300 is displayed in front of the diary screen 200.

Figure 34:
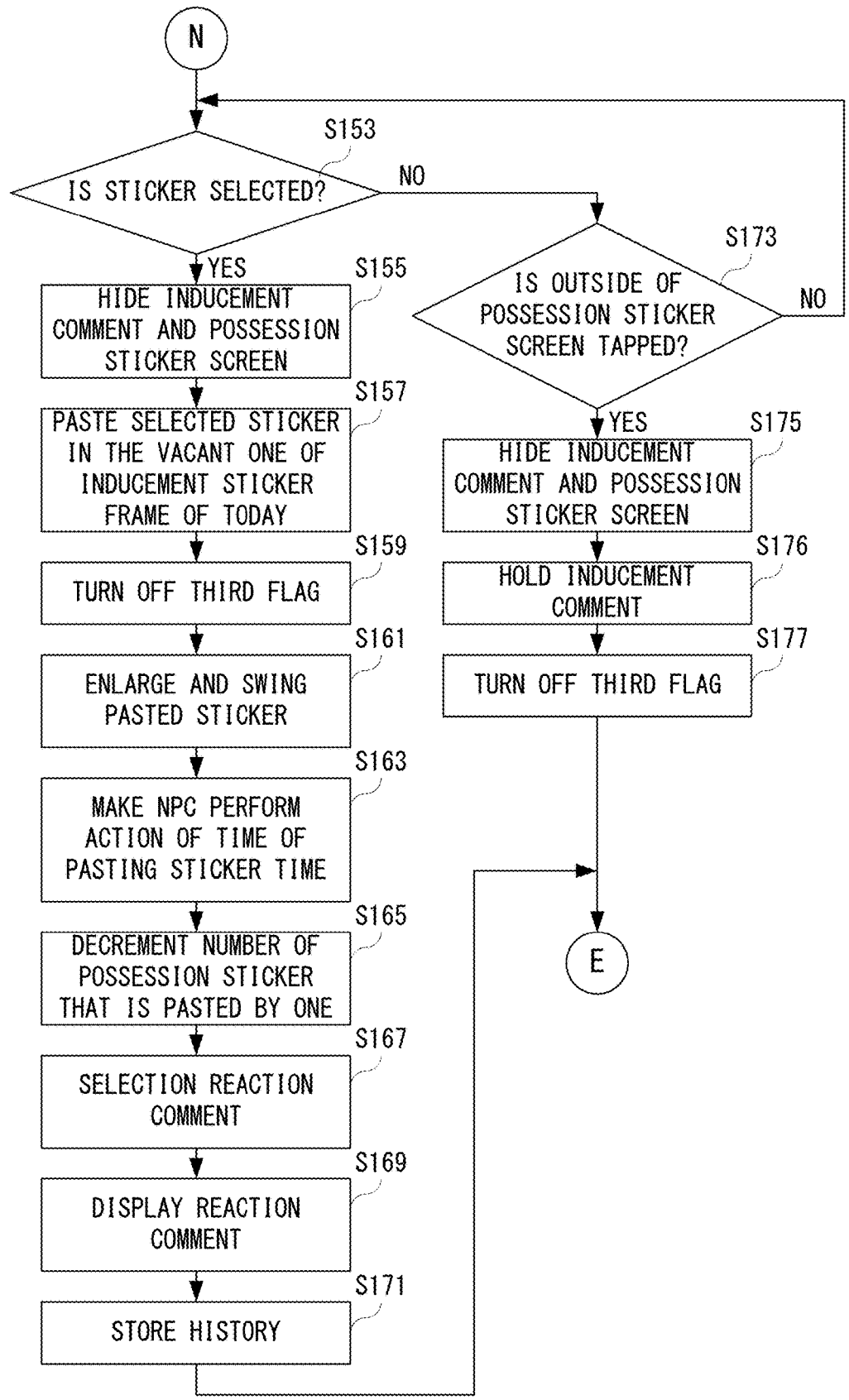
FIG. 34 is a flowchart showing a ninth part of the non-limiting example overall game processing of the CPU incorporated within the game apparatus shown in FIG. 2, following FIG. 33.

As shown in FIG. 34, in a step S153, it is determined whether a sticker is selected in the possession sticker screen 300. If "YES" is determined in the step S153, the inducement comment and the possession sticker screen 300 are hidden in a step S155, the selected sticker is pasted in the vacant one of the inducement sticker frames 1020 and 1022 of today in a step S157, and the third flag is turned off in a step S159.

In a subsequent step S161, the pasted sticker is enlarged and swingably displayed. Moreover, the NPC is made to perform an action at the time of sticker pasting in a step S163. In a next step S165, the possession number of pasted stickers is decremented by one (1).

Subsequently, the reaction comment is selected in a step S167, the selected reaction comment is displayed in a step S169, and the history is stored in a step S171, and then, the process proceeds to the step S191.

Moreover, if "NO" is determined in the above-described step S153, it is determined, in a step S173, whether the outside of the possession sticker screen 300 is tapped. If "NO" is determined in the step S173, the process returns to the step S153. On the other hand, if "YES" is determined in the step S173, the inducement comment and the possession sticker screen 300 are hidden in a step S175, the inducement comment is held in a step S176, and the third flag is turned off in a step S177, and then, the process proceeds to the step S191.

Figure 35:
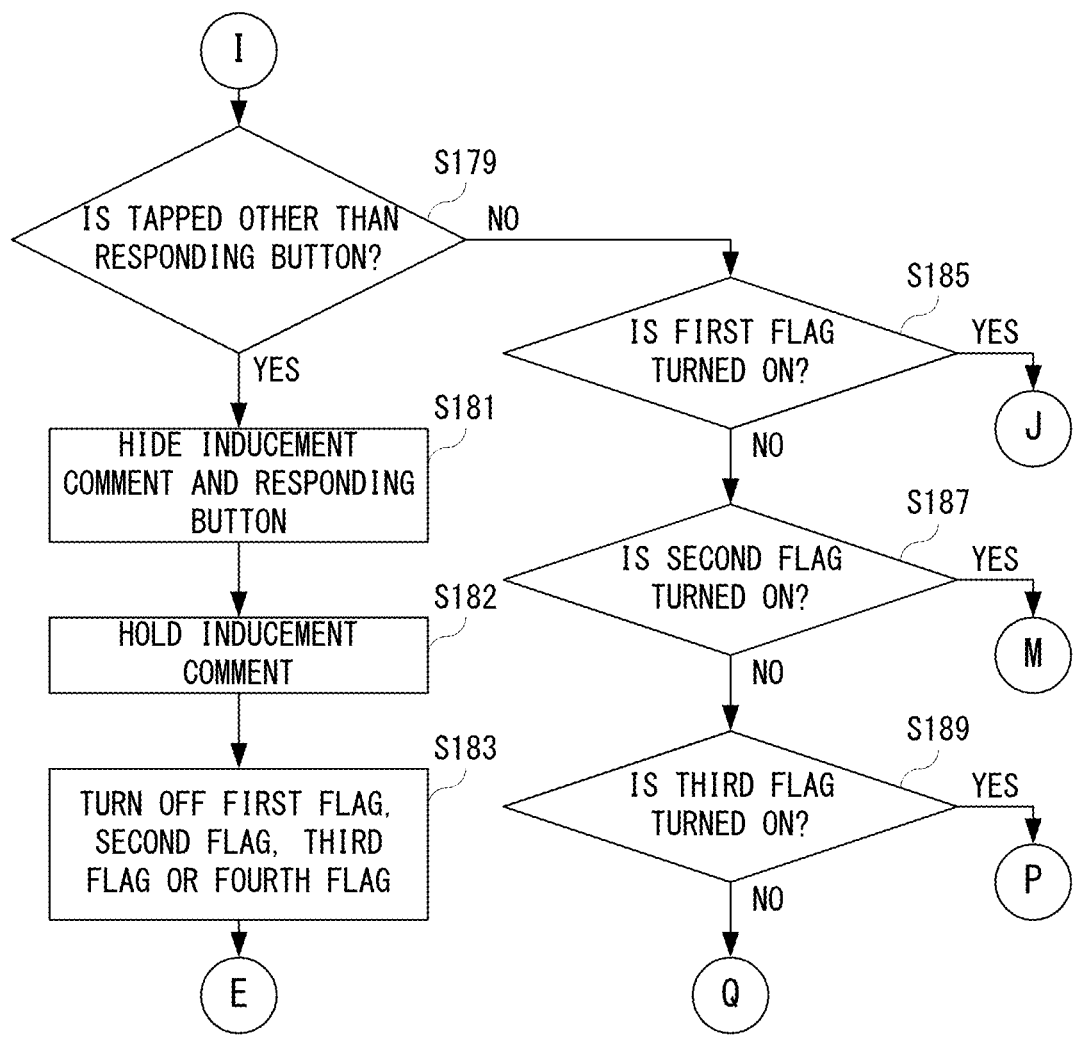
FIG. 35 is a flowchart showing a tenth part of the non-limiting example overall game processing of the CPU incorporated within the game apparatus shown in FIG. 2, following FIG. 29, FIG. 31 and FIG. 33.

As shown in FIG. 35, in the step S179, it is determined whether the outside of the responding button is tapped in the diary screen 200. If "YES" is determined in the step S179, that is, if the outside of the responding button is tapped in the diary screen 200, in a step S181, the inducement comment and the responding button, i.e., the display frame 250, the button 252 and the stickers on the both ends of the button 252 are hidden. Subsequently, in a step S182, the inducement comment is held, and the first flag, the second flag, the third flag or a fourth flag described later is turned off in a step S183, and then, the process proceeds to the step S191. However, in the step S183, the CPU20 turns off a flag being turned on out of the first flag, the second flag, the third flag and the fourth flag.

Moreover, if "NO" is determined in the step S179, that is, if the outside of the responding button is not tapped in the diary screen 200, it is determined, in a step S185, whether the first flag is turned on. If "YES" is determined in the step S185, that is, if the first flag is turned on, the process returns to the step S61 shown in FIG. 29. On the other hand, if "NO" is determined in the step S185, that is, if the first flag is turned off, it is determined, in a step S187, whether the second flag is turned on.

If "YES" is determined in the step S187, that is, if the second flag is turned on, the process returns to the step S103 shown in FIG. 31. On the other hand, if "NO" is determined in the step S187, that is, if the second flag is tuned off, it is determined, in a step S189, whether the third flag is turned on at step S189.

If "YES" is determined in the step S189, that is, if the third flag is turned on, the process returns to the step S149 shown in FIG. 33. On the other hand, if "NO" is determined in the step S189, that is, if the third flag is turned off, the fourth flag is turned on, and thus, the process returns to a step S259 shown in FIG. 39.

In addition, a case where the process proceeds to the step S179 of FIG. 35 is a case where any one of the first flag, the second flag, the third flag and the fourth flag is turned on and the responding button is not tapped, and since "NO" is also determined in the steps S185 and S187 when "NO" is determined in a step S189, that is, the first flag, the second flag and the third flag are all turned off, the fourth flag becomes to be turned on.

Figure 36:
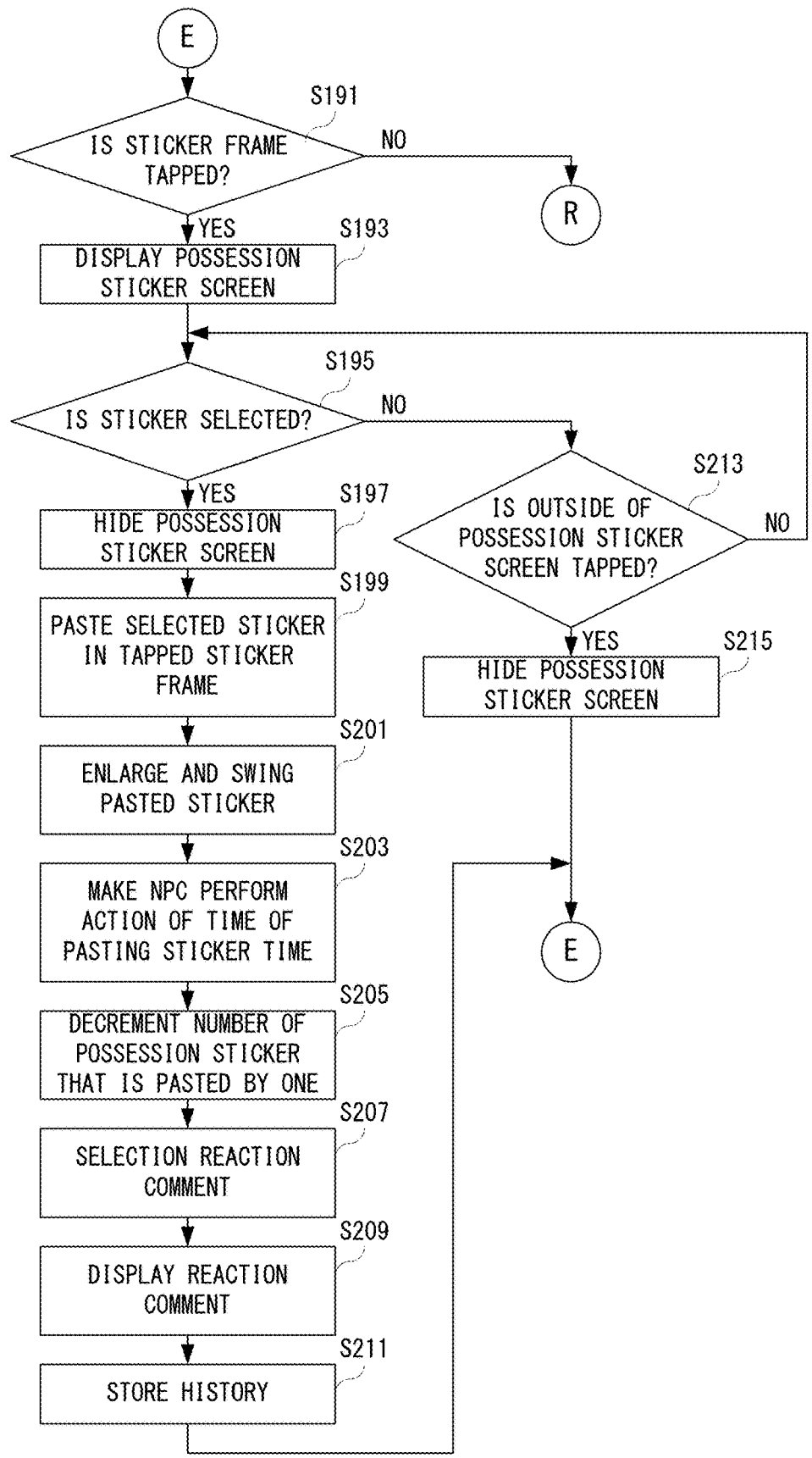
FIG. 36 is a flowchart showing an eleventh part of the non-limiting example overall game processing of the CPU incorporated within the game apparatus shown in FIG. 2, following FIG. 27-FIG. 35.

In the step S191 shown in FIG. 36, it is determined whether the sticker frame is tapped. Here, the CPU 20 determines whether any one of the inducement sticker frames 1020 and 1022 and the decoration sticker frame 1024 provided in the diary screen 200 is tapped.

Figure 37:
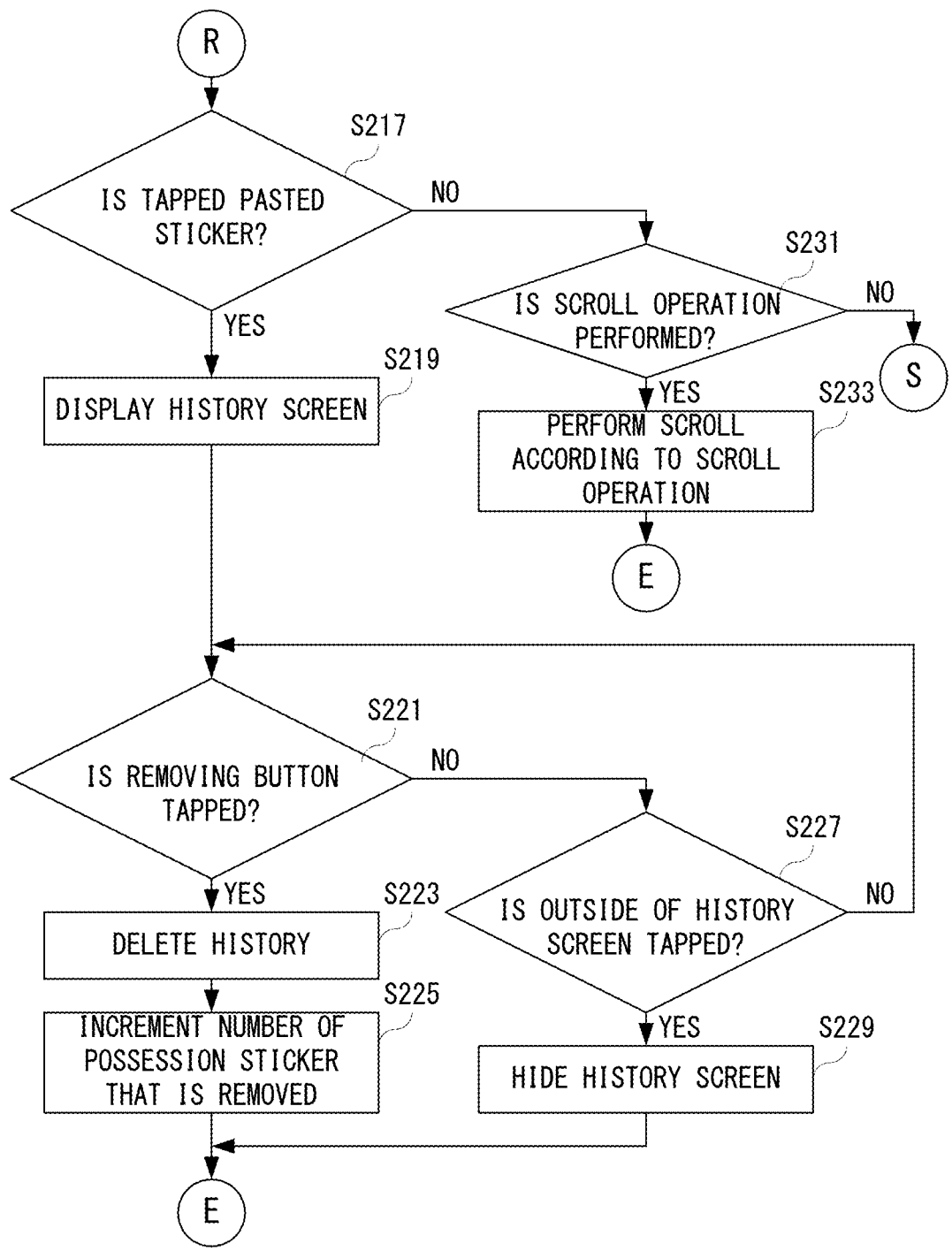
FIG. 37 is a flowchart showing a twelfth part of the non-limiting example overall game processing of the CPU incorporated within the game apparatus shown in FIG. 2, following FIG. 36.

If "NO" is determined in the step S191, that is, if the sticker frame is not tapped, the process proceeds to a step S217 shown in FIG. 37. On the other hand, if "YES" is determined in the step S191, that is, if the sticker frame is tapped, in a step S193, the possession sticker screen 300 is displayed in front of the diary screen 200, as shown in FIG. 9. However, since the inducement is not generated, the display frame 250 is not displayed. In a next step S195, it is determined whether a sticker is selected in the possession sticker screen 300. If "YES" is determined in the step S195, the possession sticker screen 300 is hidden in a step S197, and the sticker selected is pasted in the sticker frame that is tapped in the step S199.

In a subsequent step S201, the pasted sticker is enlarged and swingably displayed. Moreover, the NPC is made to perform an action at the time of sticker pasting in a step S203. In a next step S205, the possession number of the stickers is decremented by one (1).

Subsequently, the reaction comment is selected in a step S207, the selected reaction comment in the step S207 is displayed in a step S209, and the history is stored in a step S211, and then, the process returns to the step S191.

Moreover, if "NO" is determined in the above-described step S195, it is determined, in a step S213, whether the outside of the possession sticker screen 300 is tapped. If "NO" is determined in the step S213, the process returns to the step S195. On the other hand, if "YES" is determined in the step S213, the possession sticker screen 300 is hidden in a step S215, and the process returns to the step S191.

In a step S217 shown in FIG. 37, it is determined whether the pasted sticker is tapped. If "YES" is determined in the step S217, that is, if pasted sticker is tapped, a history screen 400 for the sticker is displayed in a step S219 with reference to the history data 524 associated with the sticker that is tapped is displayed.

In a next step S221, it is determined whether a removing button, i.e., button 410 is tapped. If "YES" is determined in the step S221, that is, if the removing button is tapped, the history is deleted in a step S223. That is, the history data 524 corresponding to the displayed history screen 400 is deleted, the possession number of the stickers is incremented by one (1) in a step S225, and the process returns to the step S191.

On the other hand, if "NO" is determined in the step S221, that is, if the removing button is not tapped, it is determined, in a step S227, whether the outside of the history screen 400 is tapped. If "NO" is determined in the step S227, that is, if the outside of the history screen 400 is not tapped, the process returns to the step S221. On the other hand, if "YES" is determined in the step S227, that is, if the outside of the history screen 400 is tapped, the history screen 400 is hidden in a step S229, and the process returns to the step S191.

In addition, it is although omitted in FIG. 18, if a returning (or closing) button is provided in the history screen 400, it is determined whether this returning button is tapped in the step S227, and the history screen 400 may be hidden in the step S229 when the returning button is tapped. However, the history screen 400 may be hidden when the outside of the history screen 400 is tapped or when the returning button is tapped.

Moreover, if "NO" is determined in the step S217, that is, if the pasted sticker is not tapped, it is determined, in a step S231, whether a scroll operation is performed. If "YES" is determined in the step S231, that is, if the scroll operation is performed, the diary screen 200 is scrolled according to the scroll operation in a step S233, and the process returns to the step S191. On the other hand, if "NO" is determined in the step S231, that is, if the scroll operation is not performed, it is determined, in a step S235 shown in FIG. 38, whether the NPC being displayed in the diary screen 200 is tapped.

Figure 41:
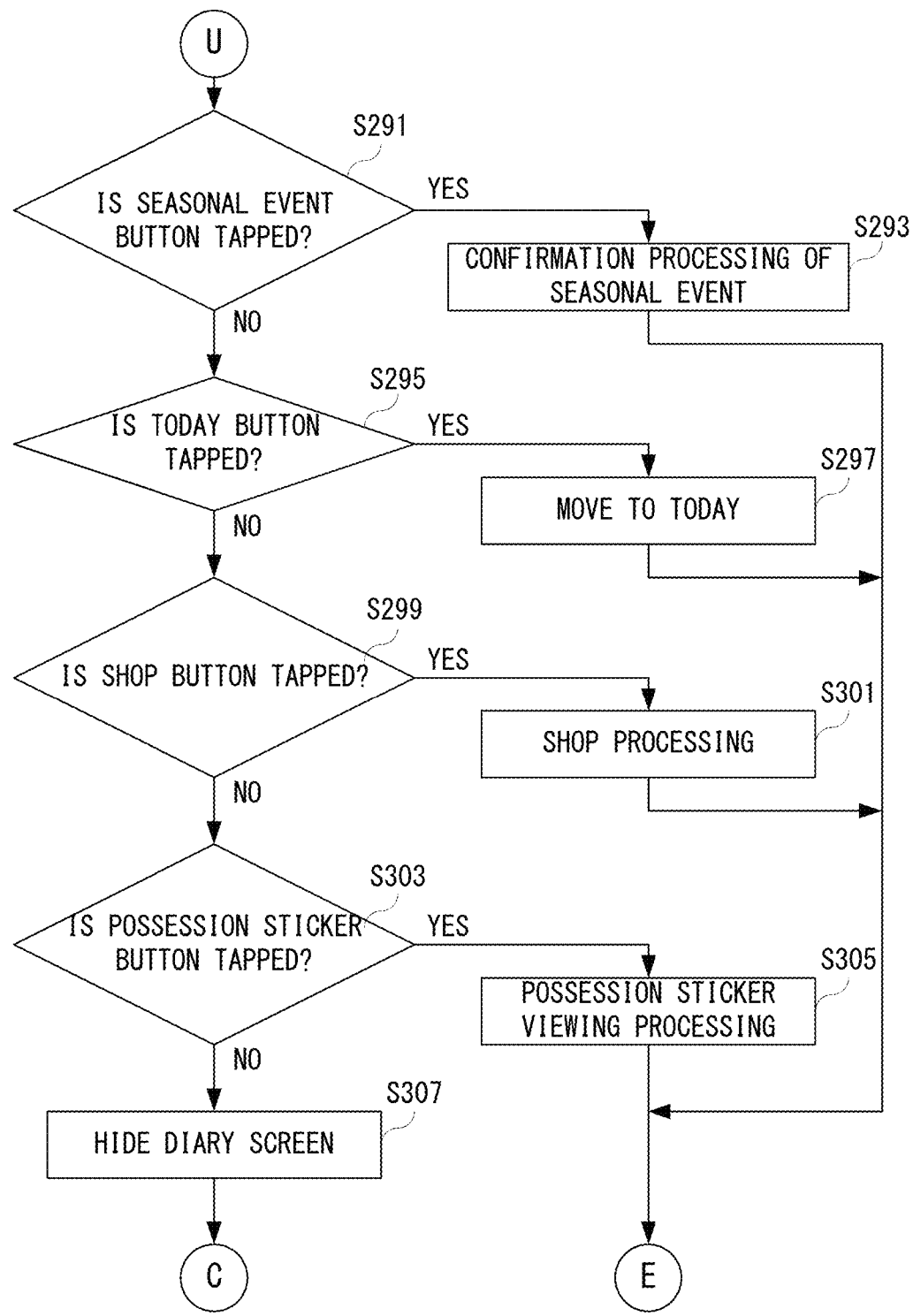
FIG. 41 is a flowchart showing a sixteenth part of the non-limiting example overall game processing of the CPU incorporated within the game apparatus shown in FIG. 2, following FIG. 38.

If "NO" is determined in the step S235, that is, if the NPC being displayed on the diary screen 200 is not tapped, the process proceeds to a step S291 shown in FIG. 41. On the other hand, if "YES" is determined in the step S235, that is, if the NPC being displayed on the diary screen 200 is tapped, it is determined, in a step S237, whether one or more inducement sticker frames 1020 and 1022 of today are vacant. That is, it is determined whether the condition of the inducement at the time of tapping is satisfied.

If "NO" is determined in the step S237, that is, if the inducement sticker frames 1020 and 1022 of today are not vacant, the CPU 20 makes the NPC perform the one-action in a step S239, and the process returns to the step S191.

Figure 39:
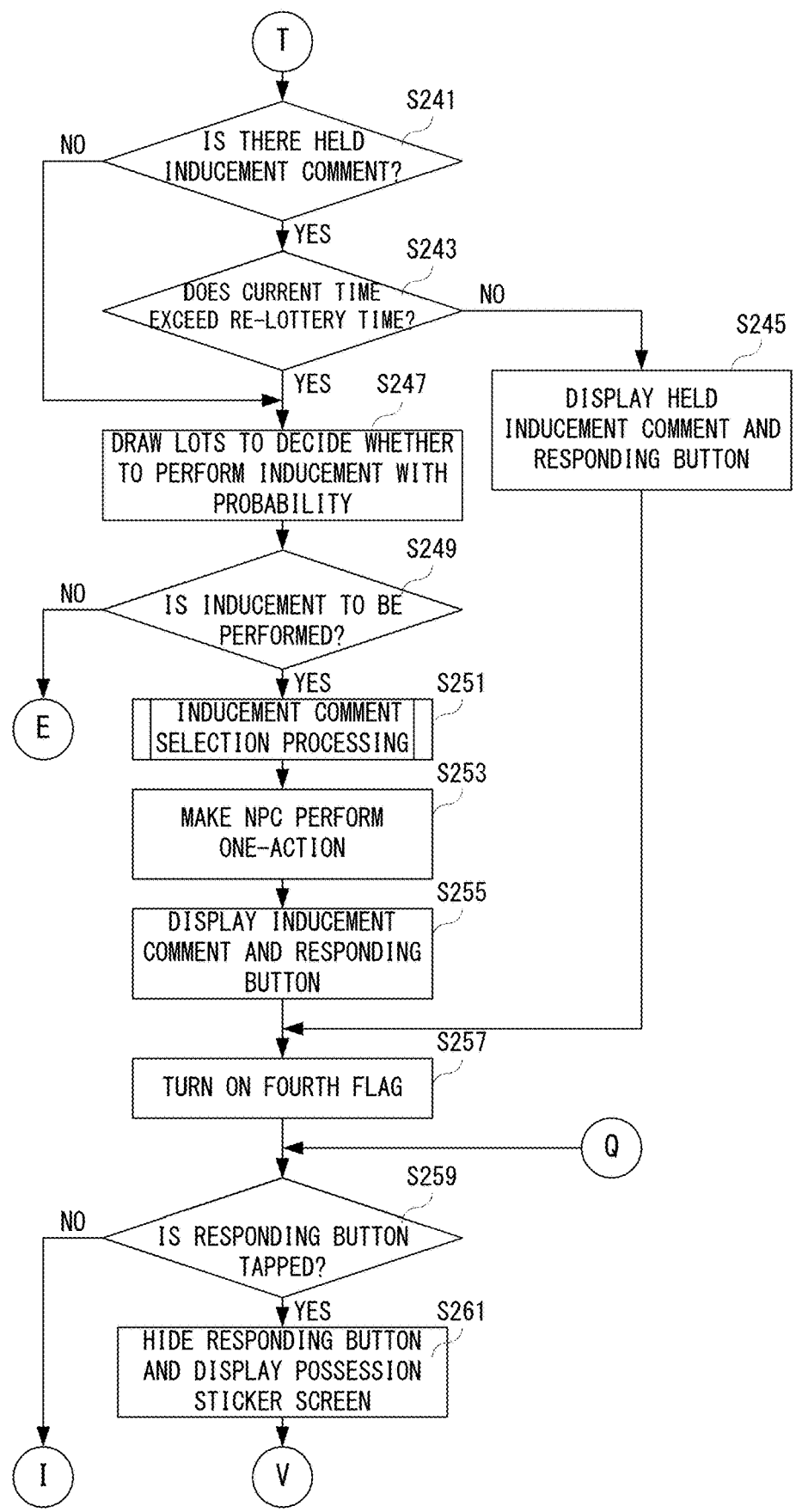
FIG. 39 is a flowchart showing a fourteenth part of the non-limiting example overall game processing of the CPU incorporated within the game apparatus shown in FIG. 2, following FIG. 38.

On the other hand, if "YES" is determined in the step S237, that is, if one or more inducement sticker frames 1020 and 1022 of today are vacant, it is determined, in a step S241 shown in FIG. 39, whether there is any inducement comment being held. If "NO" is determined in the step S241, the process proceeds to a step S247. On the other hand, if "YES" is determined in the step S241, it is determined, in a step S243, whether the current time is crossing the re-lottery time.

If "NO" is determined in the step S243, the inducement comment being held and the responding button are displayed in the diary screen 200 in a step S245, and the process proceeds to a step S257. On the other hand, if "YES" is determined in the step S243, it is drawn lots with a probability on whether the inducement is to be performed in the step S247.

In a subsequent step S249, it is determined whether the inducement is to be performed. If "NO" is determined in the step S249, the process returns to the step S191. On the other hand, if "YES" is determined in the step S249, the inducement comment selection processing described later is performed in a step S251, and the NPC is made to perform the one-action in a step S253, and then, in a step S255, the inducement comment and the responding button are displayed in the diary screen 200.

As described above, when one or more inducement sticker frames 1020 and 1022 of today are vacant, in the step S247, it is drawn lots to perform the inducement is drawn lots with a probability of 100%. Therefore, in the step S249, "YES" is determined. Therefore, it is possible to omit the step S247 and the step S249.

Subsequently, the fourth flag is turned on in a step S257. The fourth flag is a flag indicating that the inducement is performed when the NPC is tapped in the diary screen 200. In a next step S259, it is determined whether the responding button is tapped. If "NO" is determined in the step S259, the process returns to the step S179. On the other hand, if "YES" is determined in the step S259, in a step S261, the responding button is hidden and the possession sticker screen 300 is displayed in front of the diary screen 200.

Figure 40:
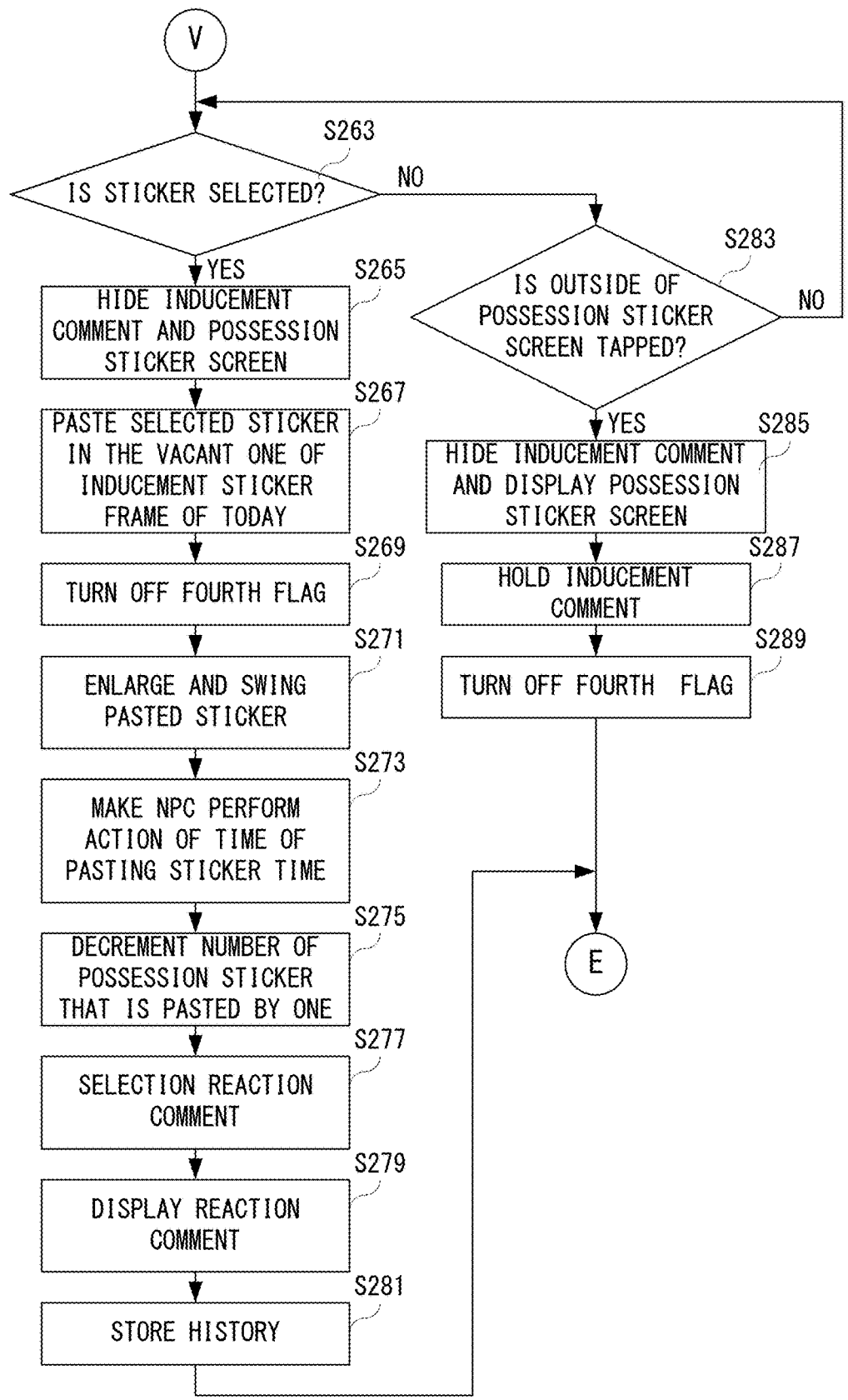
FIG. 40 is a flowchart showing a fifteenth part of the non-limiting example overall game processing of the CPU incorporated within the game apparatus shown in FIG. 2, following FIG. 39.

As shown in FIG. 40, in a step S263, it is determined whether a sticker is selected in the possession sticker screen 300. If "YES" is determined in the step S263, the inducement comment and the possession sticker screen 300 are hidden in a step S265, the selected sticker is pasted in the vacant one of the inducement sticker frames 1020 and 1022 of today in a step S267, and the fourth flag is turned off in a step S269.

However, when both of the inducement sticker frames 1020 and 1022 of today are vacant, the selected sticker is pasted in the inducement sticker frame 1020 of today (may be the inducement sticker frame 1022).

In a subsequent step S271, the pasted sticker is enlarged and swingably displayed. Moreover, in a step S273, the NPC is made to perform an action at the time of sticker pasting. In a next step S275, the possession number of the stickers is decrement by one (1).

Subsequently, the reaction comment is selected in a step S277, the selected reaction comment in the step S277 is displayed in a step S279, and in a step S281, the history is stored, and then, the process proceeds to the step S191.

Moreover, if "NO" is determined in the above-described step S263, it is determined, in a step S283, whether the outside of the possession sticker screen 300 is tapped. If "NO" is determined in the step S283, the process returns to the step S263. On the other hand, if "YES" is determined in the step S283, the inducement comment and the possession sticker screen 300 are hidden in a step S285, the inducement comment is held in a step S287, and the fourth flag is turned off in a step S289, and then, the process proceeds to the step S191.

Figure 38:
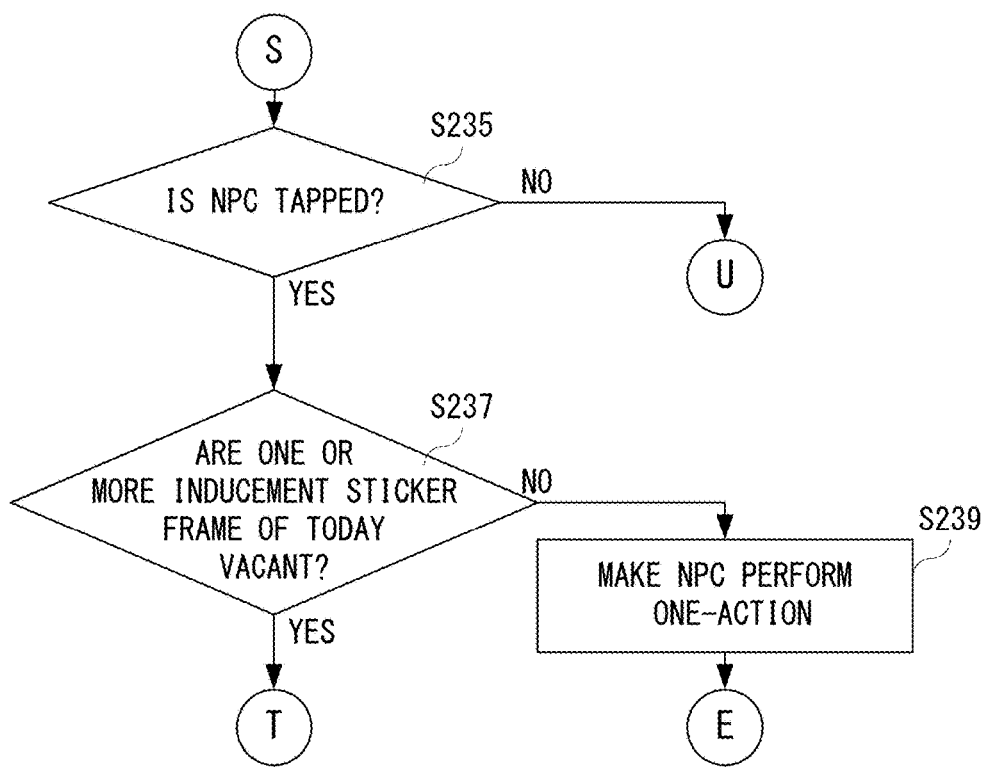
FIG. 38 is a flowchart showing a thirteenth part of the non-limiting example overall game processing of the CPU incorporated within the game apparatus shown in FIG. 2, following FIG. 37.

Moreover, as described above, if "NO" is determined in the step S235 shown in FIG. 38, that is, if the NPC being displayed in the diary screen 200 is not tapped, in a step S291 shown in FIG. 41, it is determined whether a seasonal event button, i.e., button 218 is tapped.

If "YES" is determined in the step S291, that is, if the seasonal event button is tapped, in a step S293, confirmation processing of the seasonal event is performed, and the process returns to the step S191. If "NO" is determined in the step S291, that is, the seasonal event button is not tapped, it is determined, in a step S295, whether a today button, i.e., the button 216 is tapped.

If "YES" is determined in the step S295, that is, if the today button is tapped, in a step S297, a display position is shifted to today, and the process return to the step S191. That is, in the step S297, in the diary screen 200, the display position is moved so that the display areas 204, 206 and 208 corresponding to the date of today become the third area from the bottom. On the other hand, if "NO" is determined in the step S295, that is, if the today button is not tapped, it is determined, in a step S299, whether a shop button, i.e., the button 210 is tapped.

If "YES" is determined in the step S299, that is, if the shop button is tapped, in a step S301, shop processing is performed, and the process returns to the step S191. In the shop processing, a shop screen is displayed and the player can buy a sticker. The shop processing is ended if the buying of a sticker is ended or quit. On the other hand, if "NO" is determined in the step S299, that is, if the shop button is not tapped, it is determined, in a step S303, a possession sticker button, i.e., the button 212 is tapped.

If "YES" is determined in the step S303, that is, if the possession sticker button is tapped, possession sticker viewing processing is performed in a step S305, and the process returns to the step S191. In the possession sticker viewing processing, the possession sticker screen is displayed, whereby a list of the stickers that the player possesses can be viewed. Moreover, when the buying processing of the sticker is performed from the possession sticker screen, a display returns to the possession sticker screen after the end of the buying processing of a sticker. Then, if the outside of the possession sticker screen is tapped, the possession sticker screen is closed and the possession sticker viewing processing is ended.

If "NO" is determined in the step S303, that is, if the possession sticker button is not tapped, a close button, i.e., button 214 is tapped, and in a step S307, the diary screen 200 is hidden, that is, the diary function is ended, and then, the process returns to the step S3 shown in FIG. 26.

Although illustration is omitted, as described above, when the close button is tapped in the middle of the exchange so as to end the diary function, if the information on the sticker that the player pasted is included in the exchange data 504g, this exchange data 504g is stored as the history data 524.

However, as described above, when the close button is tapped in the middle of the exchange so as to end the diary function, irrespective of whether the information on the sticker that the player pasted is included in the exchange data 504g, the exchange data 504g may be eliminated without being stored as the history data 524. In this case, the sticker that is indicated by the information on the sticker included in the exchange data 504g to be eliminated is removed, and is returned to the possession sticker.

Figure 42:
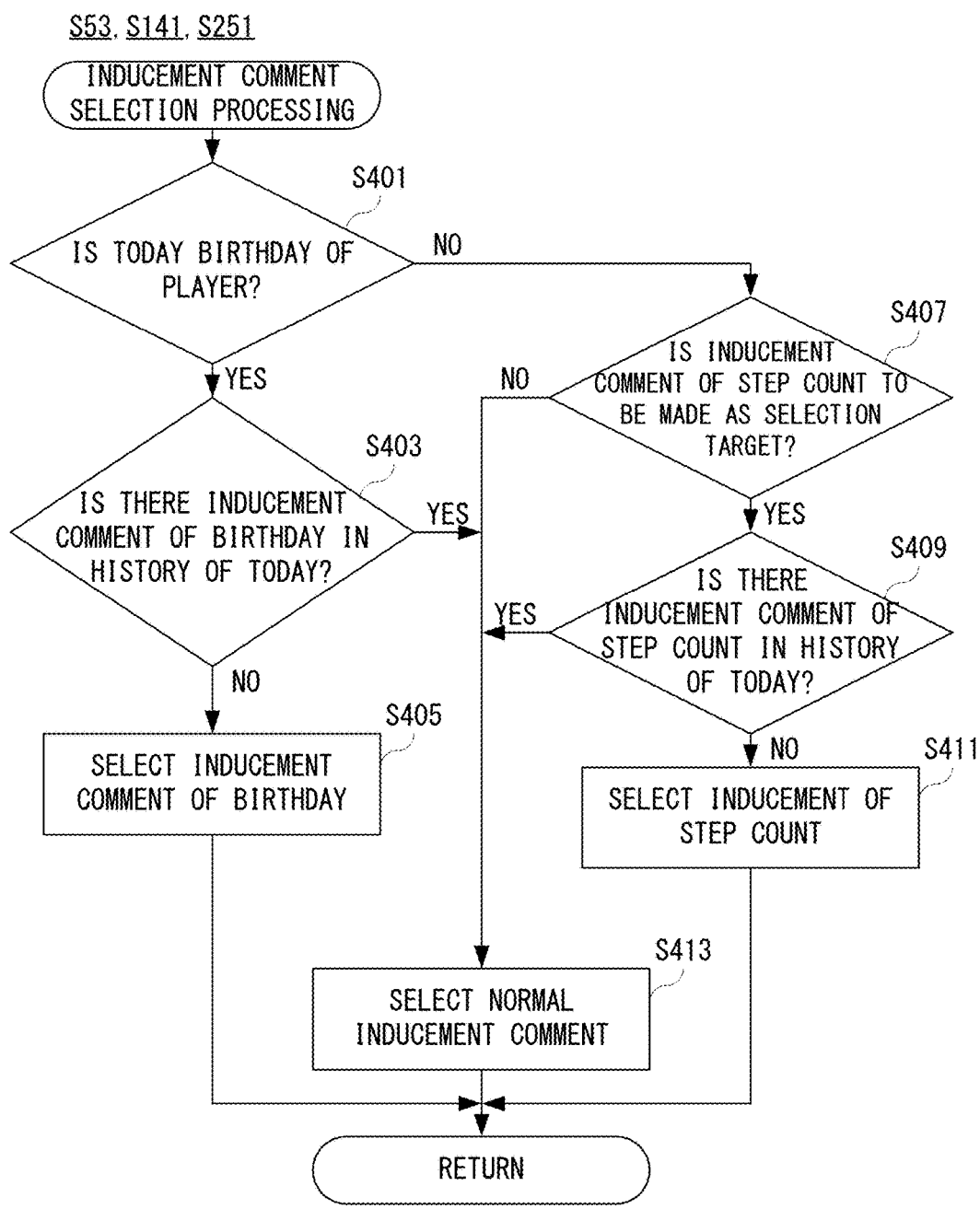
FIG. 42 is a flowchart showing non-limiting example inducement comment selection processing of the CPU incorporated within the game apparatus shown in FIG. 2.

FIG. 42 is a flowchart showing a non-limiting example inducement comment selection processing in the step S53 shown in FIG. 29, in the step S141 shown in FIG. 33 and in the step S251 shown in FIG. 39. As shown in FIG. 42, if the inducement comment selection processing is started, the CPU 20 determines, in a step S401, whether today is the birthday of the player. Here, the CPU 20 determines whether the date of today acquired from the RTC 36 is in agreement with the birthday indicated by the basic information data 510 included in the player data 504c.

If "YES" is determined in the step S401, that is, if today is the birthday of the player, in a step S403, it is determined whether there is the inducement comment of the birthday in the today history with reference to the history data 524.

If "YES" is determined in the step S403, that is, if there is the inducement comment of the birthday in the today history, the process proceeds to a step S413. On the other hand, if "NO" is determined in the step S403, that is, if there is no inducement comment of the birthday in the today history, in a step S405, the inducement comment of the birthday is selected, and the inducement comment selection processing is ended, and then, the process returns to the overall game processing. In the step S405, the CPU 20 selects one inducement comment by drawing lots with a probability from a plurality of inducement comments each of which the selection target condition is "birthday of the player".

Moreover, if "NO" is determined in the step S401, that is, if today is not the birthday of the player, it is determined, in a step S407, whether the number-of-steps inducement comment is to be a selection target. Here, the CPU 20 determines whether the acquired number of steps satisfies the selection target condition for the number of steps in the inducement comment table.

If "NO" is determined in the step S407, that is, if the number-of-steps inducement comment is not made to be a selection target, the process proceeds to a step S413. On the other hand, if "YES" is determined in the step S407, that is, if the number-of-steps inducement comment is made to be a selection target, it is determined, in a step S409, whether there is the number-of-steps inducement comment in the today history.

If "NO" is determined in the step S409, that is, if there is not the number-of-steps inducement comment in the today history, the number-of-steps inducement comment is selected in a step S411, and then, the process returns to the overall game processing. In a step S411, the CPU 20 draws lots with a probability in one inducement comment from a plurality of inducement comments each of which the selection target condition is "satisfying the first number-of-steps condition" or "satisfying the second number-of-steps condition".

On the other hand, if "YES" is determined in the step S409, that is, if there is the number-of-steps inducement comment in the today history, in a step S413, the normal inducement comment is selected, and then, the process returns to the overall game processing. In the step S413, the CPU 20 draws lots with a probability in one inducement comment from a plurality of inducement comments each of which the selection target condition is satisfied.

In addition, as described above, the probability in the cases of selecting an inducement comment in the steps S405, S411 and S413 is set evenly for a plurality of inducement comments to be selected.

According to this embodiment, since the number-of-steps stickers are arranged day by day to be displayed, and the number of steps for each day and the accumulative number of steps of the current month are expressed by the size and color of the number-of-steps sticker, it is possible to improve at-a-glance visibility of the activity amount of activity performed by the player, such as the number of steps.

Moreover, according to this embodiment, if a sticker is pasted according to the inducement comment generated by the NPC, the NPC emits a reaction comment that is differs according to the sticker that is pasted by the NPC, and therefore, it is possible to motivate to use the diary function.

Furthermore, according to this embodiment, even if the player pastes the sticker without responding to the inducement comment by the NPC, a reaction comment that is differs according to the pasted sticker is emitted, and therefore, it is possible to motivate to use the diary function.

Furthermore, according to this embodiment, when the player pastes the sticker even if the NPC does not emit the inducement comment, the NPC emits a reaction comment that is differs according to the pasted sticker, and therefore, it is possible to motivate to use the diary function.

In this embodiment, the attribute is set to each of the stickers, the inducement comments and the reaction comments, and when the sticker of the same attribute as the attribute of the inducement comment is pasted, it is determined that the inducement comment is responded, and then, the reaction comment of the same attribute as the attribute of the pasted sticker is selected; however, should not need to be limited.

In another embodiment, one or more stickers capable of responding to the inducement comment may be assigned to the inducement comment so that a dialogue between the player and the NPC can be established, and one or more reaction comments and one or more continuous inducement comments capable of emitting for each sticker may be assigned. In this case, if a sticker is pasted according to an inducement comment, when the pasted sticker is assigned to the inducement comment, it is determined that this inducement comment is responded. Moreover, the reaction comment or the continuous inducement comment assigned to the pasted sticker is selected. In such a case, it is not necessary to assign an attribute to the stickers, the inducement comments and the reaction comments.

In addition, in this embodiment, the responding button is also displayed when the inducement comment by the NPC is displayed, and when tapping the responding button and thus the sticker capable of establishing a dialog with the inducement comment is pasted, it is determined that the inducement by the NPC is responded; however, it does not need to be limited to this. It may be determined that the inducement by the NPC is responded when the responding button is tapped to paste the sticker.

Moreover, although the responding button is displayed when the inducement comment by the NPC is displayed in this embodiment, the responding button may be dispensed with. In such a case, if the sticker is pasted before a predetermined time period (for example, three (3) seconds) elapses after displaying the inducement comment, it may be determined that the inducement by the NPC is responded. Moreover, if the sticker is pasted before a predetermined time period elapses after displaying the inducement comment, whereby a dialog is established between the inducement comment and the pasted sticker, it may be determined that the inducement by the NPC is responded.

Furthermore, although the NPC emits the inducement comment of the birthday on the birthday of the player in this embodiment, on a memorial days other than the birthday, the inducement comment for memorial days except the birthday may be emitted. For example, as the memorial days other than the birthday, a day that the player becomes friends with another player in the main game, a day that the player started playing the virtual game of this embodiment, etc. correspond.

Although the NPC is always displayed on the diary screen in this embodiment, the NPC may be displayed only when emitting the comment. Moreover, since the name of the NPC is indicated in the display frame that displays the comment emitted by the NPC, it is thought that the player can understand that the NPC is emitting the comment, so the NPC itself does not need to be displayed in the diary screen.

Moreover, although the continuous inducement is generated only once in this embodiment, may be generated twice or more.

Furthermore, although no inducement comment is emitted when the number-of-steps sticker is pasted in this embodiment, the inducement comment may be emitted. In such a case, the process may proceed to the step S29 shown in FIG. 28 after execution of the processing of the step S27 shown in FIG. 27.

Furthermore, in this embodiment, the game apparatus or the player information and the player data are managed by the server, and the authentication processing at the time of the start of the virtual game is performed with using these; however, it does not need to be limited to this. The server receives an operation data from the game apparatus, and performs all or a part of the overall game processing, and then, a processing result may be sent to the game apparatus. In such a case, the player data may be downloaded without saving in the game apparatus. Moreover, the server may be omitted, whereby a game apparatus alone can be made to play a virtual game.

Moreover, the contents of the game, the structure of the game device and the specific numerical values shown in this embodiment are merely examples, and should not be limited, and can be appropriately changed according to the actual product.

Furthermore, when the same effect (result) is acquired, the turn of each step shown in the flowchart may be changed suitably.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system comprising one or more processors:
   the one or more processors execute:
      acquiring an activity amount of activity performed by a user;
      generating a symbol having a first graphical feature that is determined according to the activity amount in a first unit time period and a second graphical feature that is determined according to the activity amount in a second unit time period including the first unit time period and different from the first graphical feature; and
      displaying a plurality of symbols each generated for each first unit time period to be arranged in a time series order, where each symbol has the first graphical feature and the second graphical feature.

2. The information processing system according to claim 1, wherein the one or more processors executes maintaining, after the first graphical feature is determined for a symbol, the determined first graphical feature even if the activity amount in the first unit time period changes.

3. The information processing system according to claim 1, wherein the one or more processors execute maintaining, after the second graphical feature is determined for a symbol, the determined second graphical feature even if the activity amount in the second unit time period changes.

4. The information processing system according to claim 1, wherein each of the first graphical feature and the second graphical feature is at least one of a color, a form, a size and a pattern.

5. The information processing system according to claim 1, wherein the one or more processors execute calculating the activity amount in the second unit time period based on activity amounts in a plurality of first unit time periods.

6. The information processing system according to claim 1, wherein the one or more processors execute: determining the second graphical feature to one candidate from a plurality of candidates; and changing, when the activity amount reaches a predetermined value, the candidate to another candidate in a predetermined order.

7. The information processing system according to claim 6, wherein the predetermined order of changing the candidate of the second graphical feature to another candidate is returned to the first from the last.

8. The information processing system according to claim 1, wherein the one or more processors execute displaying the activity amount with a numeral value in addition to the first graphical feature and the second graphical feature.

9. The information processing system according to claim 1, wherein the activity amount is at least one of a number of steps, a walking distance and a walking time.

10. The information processing system according to claim 1, wherein the first graphical feature is a size and the second graphical feature is a color, and
   the one or more processors execute:
      generating the first graphical feature so that the size is made larger according to a magnitude of the activity amount of one day; and
      generating the second graphical feature so that the color of the second graphical feature is changed according to an accumulative magnitude of the activity amount for each week, month or year.

11. The information processing system according to claim 1, wherein a start time of the second unit time period is fixed.

12. The information processing system according to claim 1, wherein the symbol is a bar graph, and the first graphical feature is a length of the bar graph.

13. The information processing system according to claim 6, wherein an order of changing the candidate of the first graphical feature to another candidate is not returned to the first from the last.

14. An information processing apparatus comprising one or more processors:
   the one or more processors execute:
      acquiring an activity amount of activity performed by a user;
      generating a symbol having a first graphical feature that is determined according to the activity amount in a first unit time period and a second graphical feature that is determined according to the activity amount in a second unit time period including the first unit time period and different from the first graphical feature; and
      displaying a plurality of symbols each generated for each first unit time period to be arranged in a time series order, where each symbol has the first graphical feature and the second graphical feature.

15. A non-transitory computer-readable storage medium storing an information processing program executable by an information processing apparatus comprising one or more processors, wherein the information processing program causes the one or more processors to execute:
   acquiring an activity amount of activity performed by a user;
   generating a symbol having a first graphical feature that is determined according to the activity amount in a first unit time period and a second graphical feature that is determined according to the activity amount in a second unit time period including the first unit time period and different from the first graphical feature; and
   displaying a plurality of symbols each generated for each first unit time period to be arranged in a time series order, where each symbol has the first graphical feature and the second graphical feature.

16. An information processing method including:
   acquiring an activity amount of activity performed by a user,
   generating a symbol having a first graphical feature that is determined according to the activity amount in a first unit time period and a second graphical feature that is determined according to the activity amount in a second unit time period including the first unit time period and different from the first graphical feature; and
   displaying a plurality of symbols each generated for each first unit time period to be arranged in a time series order, where each symbol has the first graphical feature and the second graphical feature.

* * * * *